US010961432B2

(12) United States Patent
Bittner et al.

(10) Patent No.: US 10,961,432 B2
(45) Date of Patent: Mar. 30, 2021

(54) METHOD OF MINERAL OIL PRODUCTION

(71) Applicant: BASF SE, Ludwigshafen am Rhein (DE)

(72) Inventors: Christian Bittner, Ludwigshafen am Rhein (DE); Günter Oetter, Frankenthal (DE); Sebastian Alexander Weiße, Viernheim (DE); Hans-Christian Raths, Monheim (DE); Jack Tinsley, Katy, TX (US); Marcel Kienle, Limburgerhof (DE)

(73) Assignee: BASF SE

( * ) Notice: Subject to any disclaimer, the term of this patent is extended or adjusted under 35 U.S.C. 154(b) by 10 days.

(21) Appl. No.: 16/296,904

(22) Filed: Mar. 8, 2019

(65) Prior Publication Data
US 2019/0203103 A1    Jul. 4, 2019

Related U.S. Application Data

(62) Division of application No. 15/527,249, filed as application No. PCT/EP2015/076832 on Nov. 17, 2015, now Pat. No. 10,266,751.

(60) Provisional application No. 62/081,062, filed on Nov. 18, 2014.

(51) Int. Cl.
| *C09K 8/584* | (2006.01) |
| *B01F 17/00* | (2006.01) |
| *C09K 8/60* | (2006.01) |
| *E21B 43/20* | (2006.01) |
| *C09K 8/524* | (2006.01) |
| *C09K 8/28* | (2006.01) |
| *C09K 8/86* | (2006.01) |

(52) U.S. Cl.
CPC .......... *C09K 8/584* (2013.01); *B01F 17/0085* (2013.01); *C09K 8/602* (2013.01); *C09K 8/86* (2013.01); *E21B 43/20* (2013.01); *C09K 8/524* (2013.01); *C09K 2208/28* (2013.01)

(58) Field of Classification Search
None
See application file for complete search history.

(56) References Cited

U.S. PATENT DOCUMENTS

| 3,639,279 | A | 2/1972 | Gardner |
| 3,992,443 | A | 11/1976 | Springmann |
| 4,276,933 | A | 7/1981 | Kudchadker et al. |
| 4,457,373 | A | 7/1984 | Balzer |
| 4,485,873 | A | 12/1984 | Balzer et al. |
| 4,542,790 | A | 9/1985 | Balzer |
| 4,625,057 | A | 11/1986 | Springmann et al. |
| 4,722,396 | A | 2/1988 | Balzer |
| 4,738,789 | A | 4/1988 | Jones |
| 4,811,788 | A | 3/1989 | Kalpakci et al. |
| 5,378,409 | A | 1/1995 | Ofosu-Asante |
| 5,741,947 | A | 4/1998 | Wolf et al. |
| 6,326,514 | B1 | 12/2001 | Klug et al. |
| 7,700,702 | B2 | 4/2010 | Gaillard et al. |
| 8,080,588 | B2 | 12/2011 | Bittner et al. |
| 8,304,575 | B2 | 11/2012 | Matsunaga et al. |
| 2008/0194435 | A1* | 8/2008 | Huff .................. B01F 17/0028 507/224 |
| 2010/0081716 | A1 | 4/2010 | Matsunaga et al. |
| 2010/0213409 | A1 | 8/2010 | Bittner |
| 2011/0083846 | A1 | 4/2011 | Bittner et al. |
| 2011/0220365 | A1* | 9/2011 | Bittner ............... B01F 17/0057 166/369 |
| 2014/0116689 | A1 | 5/2014 | Bittner et al. |
| 2015/0291875 | A1 | 10/2015 | Morvan et al. |
| 2015/0329660 | A1 | 11/2015 | Bittner et al. |
| 2015/0329669 | A1 | 11/2015 | Bittner et al. |
| 2015/0354332 | A1 | 12/2015 | Kurkal-Siebert et al. |
| 2017/0015894 | A1 | 1/2017 | Bittner et al. |
| 2017/0101576 | A1 | 4/2017 | Langlotz et al. |
| 2017/0355897 | A1 | 12/2017 | Bittner |

FOREIGN PATENT DOCUMENTS

| CA | 2760734 A1 | 11/2010 |
| CA | 2790159 A1 | 9/2011 |
| CA | 2852651 A1 | 5/2013 |
| DE | 2418444 A1 | 10/1975 |
| DE | 4325237 A1 | 2/1995 |

(Continued)

OTHER PUBLICATIONS

International Search Report for PCT/EP2015/076832 dated Feb. 19, 2016.
International Preliminary Examination Report for PCT/EP2015/076832 dated Feb. 21, 2017.
International Preliminary Report on Patentabiity for International Application No. PCT/EP2015/076832, dated May 24, 2017.

*Primary Examiner* — Jeffrey D Washville

(74) *Attorney, Agent, or Firm* — Faegre Drinker Biddle & Reath LLP

(57) ABSTRACT

The present invention relates to a method for producing mineral oil from underground mineral oil deposits, in which an aqueous formulation comprising at least a mixture of alkyl ether carboxylate and corresponding alkyl ether alcohol, where the alkyl ether carboxylate has been prepared from the alkyl ether alcohol and the molar ratio in the mixture of alkyl ether carboxylate:alkyl ether alcohol is from 51:49 to 92:8, is injected through at least one injection well into a mineral oil deposit, where the deposit has a deposit temperature of 55° C. to 150° C., a crude oil having more than 20° API and a deposit water having more than 100 ppm of divalent cations, and crude oil is withdrawn through at least one production well from the deposit. The invention further relates to the preparation of the mixture and to a concentrate comprising the mixture.

26 Claims, No Drawings

(56) References Cited

FOREIGN PATENT DOCUMENTS

| | | |
|---|---|---|
| DE | 10243361 A1 | 4/2004 |
| EP | 0106018 A1 | 4/1984 |
| EP | 0207312 A2 | 1/1987 |
| EP | 1061064 B1 | 6/2003 |
| EP | 2432807 A2 | 3/2012 |
| FR | 2986008 A1 | 7/2013 |
| WO | WO-2009100298 A1 | 8/2009 |
| WO | WO-2009124922 A1 | 10/2009 |
| WO | WO-2010/133527 A2 | 11/2010 |
| WO | WO-2011110502 A1 | 9/2011 |
| WO | WO-2012027757 A1 | 3/2012 |
| WO | WO-2013060670 A1 | 5/2013 |
| WO | WO-2013159027 A1 | 10/2013 |
| WO | WO-2014063933 A1 | 5/2014 |
| WO | WO-2014095608 A2 | 6/2014 |
| WO | WO-2014095621 A1 | 6/2014 |
| WO | WO-2014118084 A1 | 8/2014 |
| WO | WO-2015086468 A1 | 6/2015 |
| WO | WO-2015135708 A1 | 9/2015 |
| WO | WO-2015135851 A1 | 9/2015 |
| WO | WO-2015135855 A1 | 9/2015 |
| WO | WO-2015135860 A1 | 9/2015 |
| WO | WO-2015140102 A1 | 9/2015 |
| WO | WO-2015189060 A1 | 12/2015 |
| WO | WO-2016030341 A1 | 3/2016 |

\* cited by examiner

METHOD OF MINERAL OIL PRODUCTION

CROSS-REFERENCE TO RELATED APPLICATIONS

This application is a divisional application of U.S. application Ser. No. 15/527,249, filed May 16, 2017 which is incorporated by reference in its entirety. U.S. application Ser. No. 15/527,249 is a national stage application (under 35 U.S.C. § 371) of PCT/EP2015/076832, filed Nov. 17, 2015, which claims benefit of U.S. Application No. 62/081,062, filed Nov. 18, 2014, both applications of which are incorporated herein by reference in their entirety.

The present invention relates to a method for producing mineral oil from underground mineral oil deposits, in which an aqueous saline surfactant formulation comprising at least a mixture of alkyl ether carboxylate and alkyl ether alcohol, where the alkyl ether carboxylate has been prepared from the alkyl ether alcohol and the molar ratio in the mixture of alkyl ether carboxylate:alkyl ether alcohol is from 51:49 to 92:8 and the concentration of all the surfactants together is 0.05% to 0.49% by weight based on the total amount of aqueous saline surfactant formulation, is injected through at least one injection well into a mineral oil deposit having a deposit temperature of 55° C. to 150° C., crude oil having more than 20° API and deposit water comprising more than 100 ppm of divalent cations, and crude oil is withdrawn through at least one production well from the deposit. The process serves the purpose of lowering the interfacial tension between oil and water to <0.1 mN/m at deposit temperature. The invention further relates to the preparation of the mixture and to a concentrate comprising the mixture.

In natural mineral oil deposits, mineral oil is present in the cavities of porous reservoir rocks which are sealed toward the surface of the earth by impervious overlying strata. The cavities may be very fine cavities, capillaries, pores or the like. Fine pore necks may have, for example, a diameter of only about 1 μm. As well as mineral oil, including fractions of natural gas, a deposit generally also comprises water with a greater or lesser salt content.

If a mineral oil deposit has a sufficient autogenous pressure, after drilling of the deposit has commenced, mineral oil flows through the well to the surface of its own accord because of the autogenous pressure (primary mineral oil production). Even if a sufficient autogenous pressure is present at first, however, the autogenous pressure of the deposit generally declines relatively rapidly in the course of withdrawal of mineral oil, and so usually only small amounts of the amount of mineral oil present in the deposit can be produced in this manner, according to the deposit type.

Therefore, when primary production declines, a known method is to drill further wells into the mineral oil-bearing formation in addition to the wells which serve for production of the mineral oil, called the production wells. Through these so-called injection wells, water is injected into the deposit in order to maintain the pressure or increase it again. The injection of the water forces the mineral oil through the cavities in the formation, proceeding gradually from the injection well in the direction of the production well. This technique is known as water flooding and is one of the techniques of what is called secondary oil production. In the case of water flooding, however, there is always the risk that the mobile water will not flow homogeneously through the formation and in doing so mobilize oil, but will flow from the injection well to the production well, particularly along paths with a low flow resistance, without mobilizing oil, while there is only little flow, if any, through regions in the formation with high flow resistance. This is discerned from the fact that the proportion of the water which is produced via the production well increases ever further. By means of primary and secondary production, generally not more than about 30% to 35% of the amount of mineral oil present in the deposit can be produced.

A known method is to use techniques for tertiary mineral oil production (also known as "Enhanced Oil Recovery (EOR)") to enhance the oil yield, if economically viable production is impossible or no longer possible by means of primary or secondary mineral oil production. Tertiary mineral oil production includes processes in which suitable chemicals, such as surfactants and/or polymers, are used as auxiliaries for oil production. An overview of tertiary oil production using chemicals can be found, for example, in the article by D. G. Kessel, Journal of Petroleum Science and Engineering, 2 (1989) 81-101.

One of the techniques of tertiary mineral oil production is called "polymer flooding". Polymer flooding involves injecting an aqueous solution of a thickening polymer into die mineral oil deposit through the injection wells, the viscosity of the aqueous polymer solution being matched to the viscosity of the mineral oil. The injection of the polymer solution, as in the case of water flooding, forces the mineral oil through said cavities in the foundation from the injection well proceeding in the direction of the production well, and the mineral oil is produced through the production well. By virtue of the polymer formulation having about the same viscosity as the mineral oil, the risk that the polymer formation will break through to the production well with no effect is reduced. Thus, the mineral oil is mobilized much more homogeneously than when water, which is mobile, is used, and additional mineral oil can be mobilized in the formation. Details of polymer flooding and polymers suitable for this purpose are disclosed, for example, in "Petroleum, Enhanced Oil Recovery, Kirk-Othmer, Encyclopedia of Chemical Technology, Online Edition, John Wiley & Sons, 2010".

Use of hydrophobically associating copolymers for polymer flooding is known. "Hydrophobically associating copolymers" are understood by those skilled in the art to mean water-soluble polymers having lateral or terminal hydrophobic groups, for example relatively long alkyl chains. In an aqueous solution, such hydrophobic groups can associate with themselves or with other substances having hydrophobic groups. This results in formation of an associative network which causes (additional) thickening action. Details of the use of hydrophobically associating copolymers for tertiary mineral oil production are described, for example, in the review article by Taylor, K. C. and Nasr-El-Din, H. A. in J. Petr. Sci. Eng. 1998, 19, 265-280.

A further form of tertiary mineral oil production is surfactant flooding for the purpose of producing the oil trapped in the pores by capillary forces, usually combined with polymer flooding for mobility control (homogeneous flow through the deposit).

Viscous and capillary forces act on the mineral oil which is trapped in the pores of the deposit rock toward the end of the secondary production, the ratio of these two forces relative to one another determining the microscopic oil removal. A dimensionless parameter, called the capillary number, is used to describe the action of these forces. It is the ratio of the viscosity forces (velocity×viscosity of the forcing phase) to the capillary forces (interfacial tension between oil and water×wetting of the rock):

$$N_c = \frac{\mu v}{\sigma \cos \theta}.$$

In this formula, µ is the viscosity of the fluid mobilizing the mineral oil, v is the Darcy velocity (flow per unit area), σ is the interfacial tension between liquid mobilizing mineral oil and mineral oil, and θ is the contact angle between mineral oil and the rock (C. Melrose, C. F. Brandner, J. Canadian Petr. Techn. 58, October-December, 1974). The higher the capillary number, the greater the mobilization of the oil and hence also the degree of oil removal.

It is known that the capillary number toward the end of secondary mineral oil production is in the region of about $10^{-6}$ and that it is necessary for the mobilization of additional mineral oil to increase the capillary number to about $10^{-3}$ to $10^{-2}$.

For this purpose, it is possible to conduct a particular form of the flooding method—what is known as Winsor type III microemulsion flooding. In Winsor type III microemulsion flooding, the injected surfactants are supposed to form a Winsor type III microemulsion with the water phase and oil phase present in the deposit. A Winsor type III microemulsion is not an emulsion with particularly small droplets, but rather a thermodynamically stable, liquid mixture of water, oil and surfactants. The three advantages thereof are that a very low interfacial tension σ between mineral oil and aqueous phase is thus achieved, it generally has a very low viscosity and as a result is not trapped in a porous matrix, it forms with even the smallest energy inputs and can remain stable over an infinitely long period (conventional emulsions, in contrast, require high shear forces which predominantly do not occur in the reservoir, and are merely kinetically stabilized).

The Winsor type III microemulsion is in equilibrium with excess water and excess oil. Under these conditions of microemulsion formation, the surfactants cover the oil-water interface and lower the interfacial tension σ more preferably to values of $<10^{-2}$ mN/m (ultra-low interfacial tension). In order to achieve an optimal result, the proportion of the microemulsion in the water-microemulsion-oil system, for a defined amount of surfactant, should naturally be at a maximum, since this allows lower interfacial tensions to be achieved.

In this manner, it is possible to alter the form of the oil droplets (the interfacial tension between oil and water is lowered to such a degree that the smallest interface state is no longer flavored and the spherical form is no longer preferred), and they can be forced through the capillary openings by the flooding water.

When all oil-water interfaces are covered with surfactant, in the presence of an excess amount of surfactant, the Winsor type III microemulsion forms. It thus constitutes a reservoir for surfactants which cause a very low interfacial tension between oil phase and water phase. By virtue of the Winsor type III microemulsion having a low viscosity, it also migrates through the porous deposit rock in the flooding process. Emulsions, in contrast, may remain suspended in the porous matrix and block deposits. If the Winsor type III microemulsion meets an oil-water interface as yet uncovered with surfactant, the surfactant from the microemulsion can significantly lower the interfacial tension of this new interface and lead to mobilization of the oil (for example by deformation of the oil droplets).

The oil droplets can subsequently combine to give a continuous oil bank. This has two advantages:

Firstly, as the continuous oil bank advances through new porous rock, the oil droplets present there can coalesce with the bank.

Moreover, the combination of the oil droplets to give an oil bank significantly reduces the oil-water interface and hence surfactant no longer required is released again. Thereafter, the surfactant released, as described above, can mobilize oil droplets remaining in the formation.

Winsor type III microemulsion flooding is consequently an exceptionally efficient process, and requires much less surfactant compared to an emulsion flooding process. In microemulsion flooding, the surfactants are typically optionally injected together with cosolvents and/or basic salts (optionally in the presence of chelating agents). Subsequently, a solution of thickening polymer is injected for mobility control. A further variant is the injection of a mixture of thickening polymer and surfactants, cosolvents and or basic salts (optionally with chelating agent), and then a solution of thickening polymer for mobility control. These solutions should generally be clear in order to prevent blockages of the reservoir.

The use parameters, for example type, concentration and mixing ratio of the surfactants used relative to one another, are adjusted by the person skilled in the art to the conditions prevailing in a given oil formation (for example temperature and salt content).

PRIOR ART

U.S. Pat. No. 4,457,373 A1 describes the use of water-oil emulsions of anionic surfactants of the R—$(OCH_2CH_2)_n$—$OCH_2COOM$ type, which are based on an alkyl radical R having 6 to 20 carbon atoms or an alkylated aromatic radical in which the total number of carbon atoms in the alkyl radicals is 3 to 28, in tertiary mineral oil production. In the repeat units, n is a number from 1 to 30. The surfactants are prepared via a reaction of the corresponding alkoxylates with chloroacetic acid sodium salt and sodium hydroxide or aqueous sodium hydroxide solution. The carboxymethylation level may range from 10% to 100% (preferably 90-100%). The examples show only the use of water-oil emulsions comprising carboxymethylated nonylphenol ethoxylate sodium salt with, for example, n=6 (carboxymethylation level 80%) or carboxymethylated fatty alcohol ethoxylate sodium salts with, for example, R=C12C14 and n=4.5 (carboxymethylation level 94%) against crude oil in salt water at temperatures of 46 to 85° C. The surfactant concentration used (>5 percent by weight) was very high in the flooding tests, which were conducted at ≤55° C. A polymer (polysaccharides) was used in the flooding tests.

U.S. Pat. No. 4,485,873 A1 describes the use of anionic surfactants of the R—$(OCH_2CH_2)_n$—$OCH_2COOM$ type, which are based on an alkyl radical R having 4 to 20 carbon atoms or an alkylated aromatic radical in which the total number of carbon atoms in the alkyl radicals is 1 to 28, in tertiary mineral oil production. In the repeat units, n is a number from 1 to 30. The surfactants are prepared via a reaction of the corresponding alkoxylates with chloroacetic acid sodium salt and sodium hydroxide or aqueous sodium hydroxide solution. The carboxymethylation level may range from 10% to 100% (preferably 50-100%). The examples show only the use of carboxymethylated nonylphenol ethoxylate sodium salts with, for example, n=5.5 (carboxymethylation level 70%) or carboxymethylated fatty alcohol ethoxylate sodium salts with, for example, R=C12C14 and n=4.4 (carboxymethylation level 65%) against model oil in salt water at temperatures of 37 to 74° C. The surfactant concentration used (>5 percent by weight) was very high in the flooding tests, which were conducted at ≤60° C. The polymer used in the flooding tests was hydroxyethyl cellulose.

U.S. Pat. No. 4,542,790 A1 describes the use of anionic surfactants of the R—$(OCH_2CH_2)_n$—$OCH_2COOM$ type, which are based on an alkyl radical R having 4 to 20 carbon atoms or an alkylated aromatic radical in which the total number of carbon atoms in the alkyl radicals is 1 to 28, in tertiary mineral oil production. In the repeat units, n is a number from 1 to 30. The surfactants are prepared via a reaction of the corresponding alkoxylates with chloroacetic acid sodium salt and sodium hydroxide or aqueous sodium hydroxide solution. The carboxymethylation level may range from 10% to 100%. The examples show the use of carboxymethylated nonylphenol ethoxylate sodium salts with, for example, n=5.3 (carboxymethylation level 76%) or carboxymethylated C12C14 fatty alcohol ethoxylate sodium salts against low-viscosity crude oil (10 mPas at 20° C.) in salt water at temperatures of 46 to 85° C. The surfactant concentration used (2 percent by weight) was relatively high in the flooding tests, which were conducted at ≤60° C.

U.S. Pat. No. 4,811,788 A1 discloses the use of R—$(OCH_2CH_2)_n$—$OCH_2COOM$ which are based on the alkyl radical 2-hexyldecyl (derived from C16 Guerbet alcohol) and in which ii is the number 0 or 1 in tertiary mineral oil production.

EP 0207312 B1 describes the use of anionic surfactants of the R—$(OCH_2C(CH_3)H)_m(OCH_nCH_2)_n$—$OCH_2COOM$ type, which are based on an alkyl radical R having 6 to 20 carbon atoms or an alkylated aromatic radical in which the total number of carbon atoms in the alkyl radicals is 5 to 40, in a blend with a more hydrophobic surfactant in tertiary mineral oil production. In the repeat units, m is a number from 1 to 20 and n is a number from 3 to 100. The surfactants are prepared via a reaction of the corresponding alkoxylates with chloroacetic acid sodium salt and sodium hydroxide or aqueous sodium hydroxide solution. The carboxymethylation level may range from 10% to 100%. The examples show the use of carboxymethylated dinonylphenol block propoxy ethoxylate sodium salt with m=3 and n=12 (carboxymethylation level 75%) together with alkylbenzenesulfouate or alkanesulfonate against model oil in seawater at temperatures of 20° C. or 90° C. Oil recovery at 90° C. in core flooding tests gave poorer values than at 20° C., and the surfactant concentration used (4 percent by weight) was very high.

WO 2009/100298 A1 describes the use of anionic surfactants of the $R^1$—O—$(CH_2C(CH_3)HO)_m(CH_2CH_2O)_n$—$XY^-$ $M^+$ type, which are based on a branched alkyl radical $R^1$ having 10 to 24 carbon atoms and a branching level of 0.7 to 2.5, in tertiary mineral oil production. $Y^-$ may be a carboxylate group inter alia. In the examples of the alkyl ether carboxylates, $R^1$ is always a branched alkyl radical having 16 to 17 carbon atoms and X is always a $CH_2$ group. For the repeat units, examples with m=0 and n=9 and m=7 and n=2 and m=3.3 and n=6 are detailed. The surfactants are prepared via a reaction of the corresponding alkoxylates with chloroacetic acid sodium salt and aqueous sodium hydroxide solution. The carboxymethylation level is disclosed as 93% for the example with m=7 and n=2. In the examples, the alkyl ether carboxylates are tested as sole surfactants (0.2 percent by weight) in seawater at 72° C. against crude oil. The interfacial tensions attained were always above 0.1 mN/m.

WO 09124922 A1 describes the use of anionic surfactants of the $R^1$—O—$(CH_2C(R^2)HO)_{n'}(CH_2CH_2O)_{m''}$—$R^5$—COOM type, which are based on a branched saturated alkyl radical $R^1$ having 17 carbon atoms and a branching level of 2.8 to 3.7, in tertiary mineral oil production. $R^2$ is a hydrocarbyl radical having 1 to 10 carbon atoms. $R^5$ is a divalent hydrocarbyl radical having 1 to 12 carbon atoms. In addition, n" is a number from 0 to 15 and m" is a number from 1 to 20. These anionic surfactants can be obtained inter alia by oxidation of corresponding alkoxylates, with conversion of a terminal —$CH_2CH_2OH$ group to a terminal —$CH_2CO_2M$ group.

WO 11110502 A1 describes the use of anionic surfactants of the $R^1$—O—$(CH_2C(CH_3)HO)_m(CH_2CH_2O)_n$—XY $M^+$ type, which are based on a linear saturated or unsaturated alkyl radical $R^1$ having 16 to 18 carbon atoms, in tertiary mineral oil production. $Y^-$ may be a carboxylate group inter alia, and X may be an alkyl or alkylene group having up to 10 carbon atoms inter alia. In addition, m is a number from 0 to 99 and preferably 3 to 20, and n is a number from 0 to 99. These anionic surfactants can be obtained inter alia by reaction of appropriate alkoxylates with chloroacetic acid sodium salt.

WO 2012/027757 A1 claims surfactants of the $R^1$—O—$(CH_2C(R^2)HO)_n(CH(R^3)_2$-COOM type and the use thereof in tertiary mineral oil production. $R^1$ represents alkyl radicals or optionally substituted cycloalkyl or optionally substituted aryl radicals each having 8 to 150 carbon atoms. $R^2$ or $R^3$ may be H or alkyl radicals having 1 to 6 carbon atoms. The value n is a number from 2 to 210 and z is a number from 1-6. The only examples are surfactant mixtures at least comprising a sulfonate-containing surfactant (e.g. internal olefinsulfonates or alkylbenzenesulfonates) and an alkyl ether carboxylate in which $R^1$ is a branched saturated alkyl radical having 24 to 32 carbon atoms and derives from Guerbet alcohols having only one branch (in the 2 position). Said alkyl ether carboxylates have at least 25 repeat units in which $R^2$ is $CH_3$, and at least 10 repeat units in which $R^2$ is H, and so n is at least a number greater than 39. In all the examples, $R^3$ is H and z is the number 1. The surfactant mixtures contain at least 0.5 percent by weight of surfactant and are tested at temperatures of 30 to 105° C. against crude oils.

WO 2013/159027 A1 claims surfactants of the $R^1$—O—$(CH_2C(R^2)HO)_n$—X type and the use thereof in tertiary mineral oil production. $R^1$ represents alkyl radicals each having 8 to 20 carbon atoms, or optionally substituted cycloalkyl or optionally substituted aryl radicals, $R^2$ may be H or $CH_3$. The value n is a number from 25 to 115. X is $SO_3M$, $SO_3H$, $CH_2CO_2M$ or $CH_2CO_2H$ ($M^+$ is a cation). Additionally disclosed are structures of the $R^1$—O—$(CH_2C(CH_3)HO)_x$—$(CH_2CH_2O)_y$—X type, where x is a number from 35 to 50 and y is a number from 5 to 35. One example is the surfactant $C_{18}H_{35}$—O—$(CH_2C(CH_3)HO)_{45}$—$(CH_2CH_2O)_{30}$—$CH_2CO_2M$ ($C_{18}H_{35}$ is oleyl) in a blend with an internal $C_{19}$—$C_{28}$ olefinsulfonate and phenyl diethylene glycol. The surfactant mixtures contain at least 1.0 percent by weight of surfactant and are tested at temperatures of 100° C. and total salinity 32500 ppm in the presence of the base sodium metaborate against crude oils.

DE 2418444 A1 discloses the preparation of alkyl ether carboxylic acids by reaction of alcohols or alcohol ethoxylates with chloroacetic acid sodium salt and sodium hydroxide or sodium hydroxide solution at 20-80° C. with subsequent addition of sulfuric acid and phase separation at 90° C.

EP 0106018 A1 discloses the preparation of carboxymethylated alcohols, alkyl ethoxylates or alkylphenol ethoxylates by reaction of alcohols, alkyl ethoxylates or alkylphenol ethoxylates with chloroacetic acid and sodium hydroxide solution (double the molar amount in relation to chloroacetic acid) at 70-95° C. and under reduced pressure, with the proviso that 0.3% to 1.25% water is present in the reaction mixture.

US 2010/0081716 A1 discloses the preparation of carboxymethylated alkyl alkoxylate. This involves base-catalyzed alkoxylation of alcohol, neutralization with a hydroxycarboxylic acid or a dicarboxylic acid or a tricarboxylic acid, and then reaction with chloroacetic acid or chloroacetic salt and alkali metal hydroxide.

U.S. Pat. No. 8,304,575 B2 discloses the preparation of carboxymethylated alkyl alkoxylate. This involves base-catalyzed alkoxylation of alcohol, neutralization with a hydroxycarboxylic acid or a dicarboxylic acid or a tricarboxylic acid, and then conversion with simultaneous addition of aqueous solution of chloroacetic acid or chloroacetic salt and of an aqueous alkali metal hydroxide solution at 50-100° C. and under a reduced pressure of 0.0067 to 266 mbar.

EP 1 061 064 B1 describes a process for preparing ether carboxylic acids having a low residual alcohol content.

S. Chen et al., Int. J. Oil and Coal Technology, vol. 7, no. 1, 2014, pages 52-66 describe the synthesis and suitability of alcohol ether carboxylates for alkali-surfactant polymer flooding at very low temperatures of <30° C.

OBJECT OF THE INVENTION

There is a need for greater oil recovery from deposits having saline deposit water and having deposit temperatures of 55° C. to 150° C. with surfactants or surfactant formulations having the following properties:

hydrolysis stability;

salt tolerance (rater solubility even in the presence of many monovalent ions, but also polyvalent cations: for example saline water having more than 100 ppm of divalent cations such as $Ca^{2+}$ and/or $Mg^{2+}$);

low use concentrations (<0.5 percent by weight) in order to keep costs and material consumption low with a view to sustainability;

simple injection into the porous formation (virtually complete dissolution in a clear solution at reservoir temperature);

low interfacial tensions at deposit temperature with respect to crude oil (<0.1 mN/m, more preferably <0.01 mN/m), even when using only one surfactant (or two very similar surfactants which differ only in a few aspects—for example small differences in the alkoxylation level). This is found to be difficult since the oil-water interface is caused to oscillate with increasing temperature (excursion because of Brownian molecular motion) and increases in size as a result. There is a need for an efficient surfactant in order to adequately cover the interface and nevertheless lower the interfacial tension to a low value (<0.1 mN/m);

low adsorption at the rock surface;

in some cases, base-free formulations, since use of alkali is impossible because of the presence of polyvalent cations (leads to precipitation and hence loss of alkali) or the pores and hence the deposit are blocked because of scale formation;

simple production process, in order to keep the costs of the surfactant low;

supply form as surfactant concentrate which may be liquid at at least 20° C. (this would obviate the need for melting of the concentrate or constant heating on site), and should preferably have a viscosity of <1500 mPas at 40° C. and 200 Hz (this would allow simple pumping) and a high active content (this would keep the transport costs and the energy consumption resulting from transport low; added water and particular cosolvents do lower the melting point and viscosity of the concentrate but also have to be transported, which consumes energy; in addition, relatively large storage vessels would be required on site, which increases infrastructure costs or is not very viable in the field of offshore applications, since it takes up valuable space);

it should not have any environmentally harmful properties (alkylphenol ethoxylates or their degradation products are known to be able to act as endocrine disrupters. If they are used as raw material for other surfactant structures, it should be ensured that they are converted completely).

In this context, particularly the attainment of low interfacial tensions of <0.1 mN/m and especially <0.01 mN/m at temperatures of >55° C. is difficult (especially when it is not possible to use a base such as alkali metal hydroxide or sodium carbonate because of the water hardness, since it could otherwise lead to formation of scale).

With regard to the head group in surfactants, olefinsulfonates, paraffinsulfonates or alkylarylsulfonates are hydrolysis-stable under the conditions outlined above, but have little or barely any salt tolerance as an individual surfactant. Thus, an internal C20C24 olefinsulfonate alone would be insoluble in formation water with, for example, salt content 10% and 2000 ppm of divalent cations and temperatures of up to 150° C.

Alkyl ether sulfates are not hydrolysis-stable above 55° C. unless a basic pH of about 10-11 is maintained. However, this is unachievable in many cases since no alkali can be used because of the water hardness, or the reservoir rock reacts with the base and, as a result, the pH changes in the direction of neutral pH values.

Alkyl ether sulfonates often combine hydrolysis stability and salt tolerance, but their preparation is complex (multistage syntheses or use of reagents that are difficult to handle) and they are usually very expensive.

An alternative approach is that of using the class of the carboxymethylated alkyl alkoxylates, which can be obtained by reaction of alkyl alkoxylate with, for example, chloroacetic acid sodium salt. They are hydrolysis-stable and may be salt-tolerant. However, the mixtures described in the prior art either require high surfactant use concentrations or are based on environmentally harmful raw materials (alkylphenol alkoxylates) or have to be used in combination with other chemically different stufactants (i.e. surfactants which do not serve as starting raw material for the alkyl ether carboxylate: for example organic sultanates such as alkylbenzenesulfonates or olefinsulfonates) to achieve very low interfacial tensions.

The flooding process is an industrial scale process. Although the chemicals used are typically used only as dilute solutions, the volumes injected per day are high and the injection is typically continued over months and up to several years. The chemical requirement for an average oilfield may quite possibly be 5000 to 10 000 t of polymer per annum. For an economically viable process, therefore, a very high efficiency, i.e. effect per unit volume, is of great significance. Even a slight improvement in efficiency can lead to a significant improvement in economic viability. Consequently, lowering of the interfacial tension between oil and water to <0.1 mN/m with a low use concentration of surfactant is desirable (total amount of all surfactants should ideally account for <0.5 percent by weight of the aqueous surfactant-containing solution injected. The injected aqueous surfactant-containing solution is understood to mean what is called the injected surfactant slug. The surfactant slug fills a portion of the pore volume and may, as well as the surfactant, optionally comprise further additives, for example a thickening polymer. The desired portion of the pore volume may, for example, be between 2% and 60%, preferably between 3% and 25%).

There is therefore a need for surfactant mixtures comprising carboxymethylated alkyl alkoxylates and the starting material thereof, which, in oil production under the abovementioned conditions, do not have at least some of the disadvantages detailed in the prior art and/or fulfill a maximum number of the abovementioned properties.

GENERAL DESCRIPTION OF THE INVENTION

For the achievement of the above object, it has therefore been found that, surprisingly, the demands are met by a method for producing mineral oil from underground mineral oil deposits (optionally by means of Winsor type III microemulsion flooding), in which an aqueous saline surfactant formulation comprising a surfactant mixture, for the purpose of lowering the interfacial tension between oil and water to <0.1 mN/m at deposit temperature, is injected through at least one injection well into a mineral oil deposit and crude oil is withdrawn through at least one production well from the deposit, wherein a) the mineral oil deposit has a deposit temperature of 55° C. to 150° C., a crude oil having more than 20° API and a deposit water having more than 100 ppm of divalent cations;
and
b) the surfactant mixture comprises at least one anionic surfactant (A) of the general formula (I)

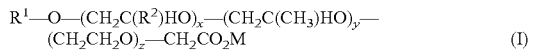

and at least one nonionic surfactant (B) of the general formula (II)

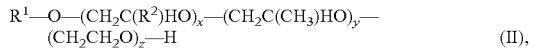

where a molar ratio of anionic surfactant (A) to nonionic surfactant (B) of 51:49 to 92:8 is present in the surfactant mixture on injection and the nonionic surfactant (B) serves as starting material for the anionic surfactant (A), where $R^1$ is a primary linear or branched, saturated or unsaturated, aliphatic hydrocarbyl radical having 10 to 36 carbon atoms;

$R^2$ is a linear saturated aliphatic hydrocarbyl radical having 2 to 14 carbon atoms;

M is H, Na, K or $NH_4$;

x is a number from 0 to 10;

y is a timber from 0 to 50;

z is a number from 1 to 35;

where the sum total of x+y+z is a number from 3 to 80 and the alkoxylate groups may be arranged m random distribution, in alternation or in blocks;
and
c) the concentration of all the surfactants together is 0.05% to 0.49% by weight, based on the total amount of the aqueous saline surfactant formulation.

The aqueous saline surfactant formulation is understood to mean a surfactant mixture which is dissolved in saline water (for example during the injection operation). The saline water may, inter alia, be river water, seawater, water from an aquifer close to the deposit, so-called injection water, deposit water, so-called production water which is being reinjected again, or mixtures of the above-described waters. However, the saline water may also be that which has been obtained from a more saline water: for example partial desalination, depletion of the polyvalent cations or by dilution with fresh water or drinking water. The surfactant mixture can preferably be provided as a concentrate which, as a result of the preparation, may also comprise salt. This is detailed further in the paragraphs which follow.

In the context of this invention, alkyl ether alcohol is understood to mean the alkyl alkoxylates or polyethers which arise from the reaction of alcohols with alkylene oxides: i.e. compounds of the $R^1$—O—$(CH_2C(R^2)HO)_x$—$(CH_2C(CH_3)HO)_y$—$(CH_2CH_2O)_z$—H type. These nonionic compounds may be alkyl ether alcohols or alkenyl ether alcohols. Since the compounds are preferably alkyl ether alcohols, they are referred to hereinafter simply as alkyl ether alcohols. The situation is similar for the group of the alkyl ether carboxylates $R^1$—O—$(CH_2C(R^2)HO)_x$—$(CH_2C(CH_3)HO)_y$—$(CH_2CH_2O)_z$—$CH_2CO_2M$. These are alkenyl ether carboxylates or preferably alkyl ether carboxylates. The alkyl ether carboxylatelalkyl ether alcohol mixture is preferably prepared by carboxymethylation of the corresponding alkyl alkoxylate using chloroacetic salt or chloroacetic acid, in each case in the presence of an alkali metal hydroxide.

Therefore, the term "starting material" in the context of the present invention means that, for every surfactant of the formula (I) in the surfactant mixture, there is a surfactant of the formula (II) having the same definition of the variables $R^1$, $R^2$, x, y, z. This can advantageously be achieved by virtue of surfactants of the formula (II) serving as reactant for the preparation of the products of the formula (I). Accordingly, the methods of the invention for production of mineral oil preferably also comprise upstream method steps for the inventive preparation of the surfactant mixtures.

Accordingly the present invention also relates to methods for production of mineral oil, wherein the surfactant mixture of anionic surfactant (A) of the general formula (I) and nonionic surfactant (B) of the general formula (II) is obtained by at least one of the following reaction conditions:

the anionic surfactant (A) of the general formula (I) is prepared in a reactor by reacting the nonionic surfactant (B) of the general formula (II), preferably while stirring, with chloroacetic acid or chloroacetic acid sodium salt in the presence of alkali metal hydroxide or aqueous alkali metal hydroxide, with removal of water of reaction such that the water content in the reactor is kept at a value of 0.2% to 1.7% during the carboxymethylation by applying reduced pressure and/or by passing nitrogen through;

aqueous NaOH (preferably 40-80% strength) as alkali metal hydroxide and aqueous chloroacetic acid (preferably 75-85% strength) are used in a carboxymethylation, using NaOH in relation to the chloroacetic acid in a ratio of 2 eq:1 eq to 2.2 eq:1 eq;
and
the nonionic surfactant (B) is prepared either via a base-catalyzed alkoxylation (preferably <5 mol % of base as alkoxylation catalyst) using KOH or NaOH or CsOH or via an alkoxylation using a double metal cyanide catalyst, and the alkoxylation catalyst is not neutralized and is not removed after the alkoxylation has ended;
and
the nonionic surfactant (B) of the general formula (II) is initially charged in the reactor in the carboxymethylation and the sodium hydroxide and chloroacetic acid are metered in in parallel at a temperature of 60-110° C. over a period of 1-7 h, the metered addition over the entire period being effected continuously or in equal portions every hour, and the stoichiometric ratio of nonionic surfactant (B) of the general formula (II) to the chloroacetic acid being 1 eq:1 eq to 1 eq:1.9 eq (preferably 1 eq:1 eq to 1 eq:1.5 eq);
and
the water content in the reactor is kept predominantly at an average value of 0.2% to 1.7% during the carboxymethylation by applying reduced pressure and/or by passing nitrogen through; and/or
NaOH as alkali metal hydroxide and chloroacetic acid sodium salt are used in the carboxymethylation, using NaOH in relation to the chloroacetic acid sodium salt in a ratio of 1 eq:1 eq to 1 eq:1.9 eq;
and
the nonionic surfactant (B) has been prepared via a base-catalyzed alkoxylation (preferably <5 mol % of base as alkoxylation catalyst) using KOH or NaOH or CsOH and is preferably used in unneutralized form in the carboxymethylation;
and
the nonionic surfactant (B) of the general formula (II) is initially charged in a reactor in the carboxymethylation together with NaOH or aqueous NaOH (preferably 40-80% strength), where the stoichiometric ratio of nonionic surfactant (B) of the general formula (II) to NaOH is 1 eq:1 eq to 1 eq:1.5 eq (preferably 1 eq:1 eq to 1 eq:1.35 eq), a temperature of 60-110° C. is set, and the nonionic surfactant (B) of the general formula (II) is converted to the corresponding sodium salt $R^1$—O—$(CH_2C(R^2)HO)_x$—$(CH_2C(CH_3)HO)_y$—$(CH_2CH_2O)_z$—Na by applying reduced pressure and/or passing nitrogen through and, at a temperature of 60-110° C., the chloroacetic acid sodium salt is metered in completely or preferably over a period of 4-12 h, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq) and where the metered addition over the entire period is effected continuously or in equal portions every hour;
and
the water content in the reactor is kept at a value of 0.2% to 1.7% during the carboxymethylation by applying reduced pressure and/or by passing nitrogen through;
solid NaOH as alkali metal hydroxide and chloroacetic acid sodium salt are used in the carboxymethylation, using NaOH in relation to the chloroacetic acid sodium salt in a ratio of 1 eq:1 eq to 1.1 eq:1 eq;
and
the nonionic surfactant (B) has been prepared via a base-catalyzed alkoxylation using KOH or NaOH or CsOH and then neutralized with acetic acid and is used in the carboxymethylation together with initially 0.5-1.5% water;
and
chloroacetic acid sodium salt and the nonionic surfactant (B) of the general formula (II) are initially charged together in a reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq), and the sodium hydroxide is metered in at a temperature of 20-70° C. over a period of 4-12 h, the metered addition being effected continuously over the entire period or in equal portions every hour;
and
the water content in the reactor is kept at a value of 0.2% to 1.7% during the carboxymethylation by applying reduced pressure and/or by passing nitrogen through;
Solid NaOH as alkali metal hydroxide and chloroacetic acid sodium salt are used in the carboxymethylation, using NaOH or, in the case of a basic alkoxylate, the sum total of NaOH and $R^1$—O—$(CH_2C(R^2)HO)_x$—$(CH_2C(CH_3)HO)_y$—$(CH_2CH_2O)_z$—K or the sum total in the case of a basic alkoxylate of NaOH and $R^1$—O—$(CH_2C(R^2)HO)_x$—$(CH_2C(CH_3)HO)_y$—$(CH_2CH_2O)_z$—Na or, in the case of a basic alkoxylate, the sum total of NaOH and $R^1$—O—$(CH_2C(R^2)HO)_x$—$(CH_2C(CH_3)HO)_y$—$(CH_2CH_2O)_z$—Cs in relation to the chloroacetic acid sodium salt in a ratio of 1.1 eq:1 eq to 1 eq:1.5 eq (preferably 1 eq:1 eq to 1.1 eq:1 eq), where the ratio of nonionic surfactant (B) of the general formula (II):NaOH is from 1 eq:1 eq to 1 eq:1.5 eq;
and
the nonionic surfactant (B) is prepared via a base-catalyzed alkoxylation using KOH or NaOH or CsOH or a mixture of NaOH and KOH, an is used in the carboxymethylation either in neutralized and filtered (i.e. salt-free) form or in the form of an unneutralized basic alkoxylate (preferably <5 mol % of base as alkoxylation catalyst);
and
chloroacetic acid sodium salt and the nonionic surfactant (B) of the general formula (II) are initially charged together in the reactor in the carboxymethylation, were the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq, more preferably 1 eq:1 eq to 1 eq:1.35 eq), and the sodium hydroxide is metered in at a temperature of 20-70° C. over a period of 4-12 h, the metered addition being effected continuously over the entire period or in equal portions every hour;
and
the water content in the reactor is kept at a value of 0.2% to 1.7% during the carboxymethylation by applying reduced pressure and/or by passing nitrogen through;
solid NaOH as alkali metal hydroxide and chloroacetic acid sodium salt are used in the carboxymethylation, using NaOH in relation to the chloroacetic acid sodium salt in a ratio of 1 eq:1 eq to 1.1 eq:1 eq;
and
the nonionic surfactant (B) has been prepared via an alkoxylation using double metal cyanide catalysis;
and
chloroacetic acid sodium salt and the nonionic surfactant (B) of the general formula (II) are initially charged together in the reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq), and the sodium hydroxide is metered in at a temperature of 20-70'C over a period of 4-12 h, the addition being effected continuously over the entire period or in equal portions every hour;

and the water content in the reactor is kept at a value of 0.2% to 1.7% during the carboxymethylation by applying reduced pressure and/or by passing nitrogen through.

A further aspect of the present invention relates to a concentrate composed of anionic surfactant (A) of the general formula (I) and nonionic surfactant (B) of the general formula (II), comprising 20% by weight to 70% by weight of the surfactant mixture, 10% by weight to 40% by weight of water and 10% by weight to 40% by weight of a cosolvent, based on the total amount of the concentrate, where preferably a) the cosolvent is selected from the group of the aliphatic alcohols having 3 to 8 carbon atoms or from the group of the alkyl monoethylene glycols, the alkyl diethylene glycols or the alkyl triethylene glycols, where the alkyl radical is an aliphatic hydrocarbyl radical having 3 to 6 carbon atoms;

and/or b) the concentrate is free-flowing at 20° C. and has a viscosity at 40° C. of <1500 mPas at 200 Hz, where a molar ratio of anionic surfactant (A) to nonionic surfactant (B) of 51:49 to 92:8, preferably of 70:30 to 92:8, is present in the concentrate.

The concentrate may comprise, for example, as well as the alkyl ether carboxylate/alkyl alkoxylate mixture, also alkali metal chloride and diglycolic acid dialkali metal salt. Optionally, it also comprises chloroacetic acid alkali metal salt, glycolic acid alkali metal salt, water and/or a cosolvent. The cosolvent is, for example, butyl ethylene glycol, butyl diethylene glycol or butyl triethylene glycol.

The concentrate preferably comprises 0.5% to 15% by weight of a mixture comprising NaCl and diglycolic acid disodium salt, where NaCl is present in excess relative to diglycolic acid disodium salt.

Further preferably, the concentrate comprises butyl diethylene glycol as cosolvent.

A further aspect of the present invention relates to a production process for the surfactant mixture.

Accordingly, the present invention also relates to a method for producing a surfactant mixture of anionic surfactant (A) of the general formula (I) and nonionic surfactant (B) of the general formula (II) as described hereinafter, wherein a molar ratio of anionic surfactant (A) to nonionic surfactant (B) of 51:49 to 92:8 (preferably 70:30 to 92:8) is present in the surfactant mixture at the end of the reaction.

More particularly, the production may be effected as follows:

The anionic surfactant (A) of the general formula (I) is prepared by reacting the nonionic surfactant (B) of the general formula (II), preferably while stirring, with chloroacetic acid or chloroacetic acid sodium salt in the presence of alkali metal hydroxide or aqueous alkali metal hydroxide, with removal of water of reaction such that the water content in the reactor is kept at a value of 0.2% to 1.7% during the carboxymethylation by applying reduced pressure and/or by passing nitrogen through; and/or Aqueous NaOH (preferably 40-80% strength) as alkali metal hydroxide and aqueous chloroacetic acid (preferably 75-85% strength) are used in the carboxymethylation, using NaOH in relation to the chloroacetic acid in a ratio of 2 eq:1 eq to 2.2 eq:1 eq;

and the nonionic surfactant (B) is prepared either via a base-catalyzed alkoxylation (preferably <5 mol % of base as alkoxylation catalyst) using KOH or NaOH or CsOH or via an alkoxylation using a double metal cyanide catalyst, and the alkoxylation catalyst is not neutralized and is not removed after the alkoxylation has ended;

and the nonionic surfactant (B) of the general formula (II) is initially charged in the reactor in the carboxymethylation and the sodium hydroxide and chloroacetic acid are metered in in parallel at a temperature of 60-110° C. over a period of 1-7 h, the metered addition over the entire period being effected continuously or in equal portions every hour, and the stoichiometric ratio of nonionic surfactant (B) of the general formula (II) to the chloroacetic acid being 1 eq:1 eq to 1 eq:1.9 eq (preferably 1 eq:1 eq to 1 eq:1.5 eq);

and the water content in the reactor is kept predominantly at an average value of 0.2% to 1.7% during the carboxymethylation by applying reduced pressure and/or by passing nitrogen through; and/or NaOH as alkali metal hydroxide and chloroacetic acid sodium salt are used in the carboxymethylation, using NaOH in relation to the chloroacetic acid sodium salt in a ratio of 1 eq:1 eq to 1 eq:1.9 eq;

and the nonionic surfactant (B) has been prepared via a base-catalyzed alkoxylation (preferably <5 mol % of base as alkoxylation catalyst) using KOH or NaOH or CsOH and is preferably used in unneutralized form in the carboxymethylation;

and the nonionic surfactant (B) of the general formula (II) is initially charged in the reactor in the carboxymethylation together with NaOH or aqueous NaOH (preferably 40-80% strength), where the stoichiometric ratio of nonionic surfactant (B) of the general formula (II) to NaOH is 1 eq:1 eq to 1 eq:1.5 eq (preferably 1 eq:1 eq to 1 eq:1.35 eq), a temperature of 60-110° C. is set, and the nonionic surfactant (B) of the general formula (II) is converted to the corresponding sodium salt $R^1$—O—$(CH_2C(R^2)HO)_x$—$(CH_2C(CH_3)HO)_y$—$(CH_2CH_2O)_z$—Na by applying reduced pressure and/or passing nitrogen through and, at a temperature of 60-110° C., the chloroacetic acid sodium salt is metered in completely or preferably over a period of 4-12 h, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq) and where the metered addition over the entire period is effected continuously or in equal portions every hour;

and the water content in the reactor is kept at a value of 0.2% to 1.7% during the carboxymethylation by applying reduced pressure and/or by passing nitrogen through; and/or solid NaOH as alkali metal hydroxide and chloroacetic acid sodium salt are used in the carboxymethylation, using NaOH in relation to the chloroacetic acid sodium salt in a ratio of 1 eq:1 eq to 1.1 eq:1 eq;

and the nonionic surfactant (B) has been prepared via a base-catalyzed alkoxylation using KOH or NaOH or CsOH and then neutralized with acetic acid and is used in the carboxymethylation together with initially 0.5-1.5% water;
and
chloroacetic acid sodium salt and the nonionic surfactant (B) of the general formula (II) are initially charged together in the reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq), and the sodium hydroxide is metered in at a temperature of 20-70° C. over a period of 4-12 h, the metered addition being effected continuously over the entire period or in equal portions every hour;
and
the water content in the reactor is kept at a value of 0.2% to 1.7% during the carboxymethylation by applying reduced pressure and/or by passing nitrogen through; and/or
Solid NaOH as alkali metal hydroxide and chloroacetic acid sodium salt are used in the carboxymethylation, using NaOH or, in the case of a basic alkoxylate, the sum total of NaOH and $R^1$—O—$(CH_2C(R^2)HO)_x$—$(CH_2C(CH_3)HO)_y$—$(CH_2CH_2O)_z$—K or the sum total in the case of a basic alkoxylate of NaOH and $R^1$—O—$(CH_2C(R^2)HO)_x$—$(CH_2C(CH_3)HO)_y$—$(CH_2CH_2O)_z$—Na or, in the case of a basic alkoxylate, the sum total of NaOH and $R^1$—O—$(CH_2C(R^2)HO)_x$—$(CH_2C(CH_3)HO)_y$—$(CH_2CH_2O)_z$—Cs in relation to the chloroacetic acid sodium salt in a ratio of 1.1 eq:1 eq to 1 eq:1.5 eq (preferably 1 eq:1 eq to 1.1 eq:1 eq), where the ratio of nonionic surfactant (B) of the general formula (II):NaOH is from 1 eq:1 eq to 1 eq:1.5 eq;
and
the nonionic surfactant (B) is prepared via a base-catalyzed alkoxylation using KOH or NaOH or CsOH or a mixture of NaOH and KOH, and is used in the carboxymethylation either in neutralized and filtered (i.e. salt-free) form or in the form of an unneutralized basic alkoxylate (preferably <5 mol % of base as alkoxylation catalyst);
and
chloroacetic acid sodium salt and the nonionic surfactant (B) of the general formula (II) are initially charged together in the reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq, more preferably 1 eq:1 eq to 1 eq:1.35 eq), and the sodium hydroxide is metered in at a temperature of 20-70° C. over a period of 4-12 h, the metered addition being effected continuously over the entire period or in equal portions every hour;
and
the water content in the reactor is kept at a value of 0.2% to 1.7% during the carboxymethylation by applying reduced pressure and/or by passing nitrogen through; and/or
solid NaOH as alkali metal hydroxide and chloroacetic acid sodium salt are used in the carboxymethylation, using NaOH in relation to the chloroacetic acid sodium salt in a ratio of 1 eq:1 eq to 1.1 eq:1 eq;
and
the nonionic surfactant (B) has been prepared via an alkoxylation using double metal cyanide catalysis;
and
chloroacetic acid sodium salt and the nonionic surfactant (B) of the general formula (II) are initially charged together in the reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq), and the sodium hydroxide is metered in at a temperature of 20-70° C. over a period of 4-12 h, the metered addition being effected continuously over the entire period or in equal portions every hour;
and
the water content in the reactor is kept at a value of 0.2% to 1.7% during the carboxymethylation by applying reduced pressure and/or by passing nitrogen through.

Accordingly, a further aspect of the present invention is a method for producing a surfactant mixture by carboxymethylation comprising at least one anionic surfactant (A) of the general formula (I)

$R^1$—O—$(CH_2C(R^2)HO)_x$—$(CH_2C(CH_3)HO)_y$—$(CH_2CH_2O)_z$—$CH_2CO_2M$ (I)

and at least one nonionic surfactant (B) of the general formula (II)

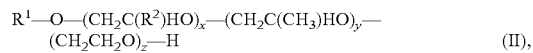
$R^1$—O—$(CH_2C(R^2)HO)_x$—$(CH_2C(CH_3)HO)_y$—$(CH_2CH_2O)_z$—H (II), where a molar ratio of anionic surfactant (A) to nonionic surfactant (B) of 51:49 to 92:8 (preferably 60:40 to 92:8, more preferably 70:30 to 92:8, more preferably 70:30 to 89:11) is present in the surfactant mixture on injection and the nonionic surfactant (B) serves as starting material for the anionic surfactant (A),
where
$R^1$ is a primary linear or branched, saturated or unsaturated, aliphatic hydrocarbyl radical having 10 to 36 carbon atoms; and
$R^2$ is a linear saturated aliphatic hydrocarbyl radical having 2 to 14 carbon atoms; and
M is H, Na, K or $NH_4$; and
x is a number from 0 to 10; and
y is a number from 0 to 50; and
z is a number from 1 to 35;
where the sum total of x+y+z is a number from 3 to 80 and the x+y+z alkoxylate groups may be arranged in random distribution, in alternation or in blocks; and
where the sum total of x+y is a number >0 if $R^1$ is a primary linear, saturated or unsaturated, aliphatic hydrocarbyl radical having 10 to 36 carbon atoms, wherein at least one of the following reaction conditions is used:
the anionic surfactant (A) of the general formula (I) is prepared in a reactor by reacting the nonionic surfactant (B) of the general formula (II), preferably while stirring, with chloroacetic acid or chloroacetic acid sodium salt in the presence of alkali metal hydroxide or aqueous alkali metal hydroxide, with removal of water of reaction such that the water content in the reactor is kept at a value of 0.2% to 1.7% during the carboxymethylation by applying reduced pressure and/or by passing nitrogen through;
aqueous NaOH (preferably 40-80% strength) as alkali metal hydroxide and aqueous chloroacetic acid (preferably 75-85% strength) are used in a carboxymethylation, using NaOH in relation to the chloroacetic acid in a ratio of 2 eq:1 eq to 2.2 eq:1 eq;
and
the nonionic surfactant (B) is prepared either via a base-catalyzed alkoxylation (preferably <5 mol % of base as alkoxylation catalyst) using KOH or NaOH or CsOH or via an alkoxylation using a double metal cyanide catalyst, and the alkoxylation catalyst is not neutralized and is not removed after the alkoxylation has ended;

and the nonionic surfactant (B) of the general formula (II) is initially charged in the reactor in the carboxymethylation and the sodium hydroxide and chloroacetic acid are metered in in parallel at a temperature of 60-110° C. over a period of 1-7 h, the metered addition over the entire period being effected continuously or in equal portions every hour, and the stoichiometric ratio of nonionic surfactant (B) of the general formula (II) to the chloroacetic acid being 1 eq:1 eq to 1 eq:1.9 eq (preferably 1 eq:1 eq to 1 eq:1.5 eq);

and the water content in the reactor is kept predominantly at an average value of 0.2% to 1.7% during the carboxymethylation by applying reduced pressure and/or by passing nitrogen through;

NaOH as alkali metal hydroxide and chloroacetic acid sodium salt are used in the carboxymethylation, using NaOH in relation to the chloroacetic acid sodium salt in a ratio of 1 eq:1 eq to 1 eq:1.9 eq;

and the nonionic surfactant (B) has been prepared via a base-catalyzed alkoxylation (preferably <5 mol % of base as alkoxylation catalyst) using KOH or NaOH or CsOH and is preferably used in unneutralized form in the carboxymethylation;

and the nonionic surfactant (B) of the general formula (II) is initially charged in a reactor in the carboxymethylation together with NaOH or aqueous NaOH (preferably 40-80% strength), where the stoichiometric ratio of nonionic surfactant (B) of the general formula (II) to NaOH is 1 eq:1 eq to 1 eq:1.5 eq (preferably 1 eq:1 eq to 1 eq:1.35 eq), a temperature of 60-110° C. is set, and the nonionic surfactant (B) of the general formula (II) is converted to the corresponding sodium salt $R^1$—O—$(CH_2C(R^2)HO)_x$—$(CH_2C(CH_3)HO)_y$—$(CH_2CH_2O)_z$—Na by applying reduced pressure and/or passing nitrogen through and, at a temperature of 60-110° C., the chloroacetic acid sodium salt is metered in completely or preferably over a period of 4-12 h, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq) and where the metered addition over the entire period is effected continuously or in equal portions every hour;

and the water content in the reactor is kept at a value of 0.2% to 1.7% during the carboxymethylation by applying reduced pressure and/or by passing nitrogen through;

solid NaOH as alkali metal hydroxide and chloroacetic acid sodium salt are used in the carboxymethylation, using NaOH in relation to the chloroacetic acid sodium salt in a ratio of 1 eq:1 eq to 1.1 eq:1 eq;

and the nonionic surfactant (B) has been prepared via a base-catalyzed alkoxylation using KOH or NaOH or CsOH and then neutralized with acetic acid and is used in the carboxymethylation together with initially 0.5-1.5% water;

and chloroacetic acid sodium salt and the nonionic surfactant (B) of the genera formula (II) are initially charged together in a reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq), and the sodium hydroxide is metered in at a temperature of 20-70° C. over a period of 4-12 h, the metered addition being effected continuously over the entire period or in equal portions every hour;

and the water content in the reactor is kept at a value of 0.2% to 1.7% during the carboxymethylation by applying reduced pressure and/or by passing nitrogen through;

Solid NaOH as alkali metal hydroxide and chloroacetic acid sodium salt are used in the carboxymethylation, using NaOH or, in the case of a basic alkoxylate, the sum total of NaOH and $R^1$—O—$(CH_2C(R^2)HO)_x$—$(CH_2C(CH_3)HO)_y$—$(CH_2CH_2O)_z$—K or the sum total in the case of a basic alkoxylate of NaOH and $R^1$—O—$(CH_2C(R^2)HO)_x$—$(CH_2C(CH_3)HO)_y$—$(CH_2CH_2O)_z$—Na or, in the case of a basic alkoxylate, the sum total of NaOH and $R^1$—O—$(CH_2C(R^2)HO)_x$—$(CH_2C(CH_3)HO)_y$—$(CH_2CH_2O)_z$—Cs in relation to the chloroacetic acid sodium salt in a ratio of 1.1 eq:1 eq to 1 eq:15 eq (preferably 1 eq:1 eq to 1.1 eq:1 eq), where the ratio of nonionic surfactant (B) of the general formula (II):NaOH is from 1 eq:1 eq to 1 eq:1.5 eq;

and the nonionic surfactant (B) is prepared via a base-catalyzed alkoxylation using KOH or NaOH or CsOH or a mixture of NaOH and KOH, and is used in the carboxymethylation either in neutralized and filtered (i.e. salt-free) form or in the form of an unneutralized basic alkoxylate (preferably <5 mol % of base as alkoxylation catalyst);

and chloroacetic acid sodium salt and the nonionic surfactant (B) of the general formula (II) are initially charged together in the reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq, more preferably 1 eq:1 eq to 1 eq:1.35 eq), and the sodium hydroxide is metered in at a temperature of 20-70° C. over a period of 4-12 h, the metered addition being effected continuously over the entire period or in equal portions every hour;

and the water content in the reactor is kept at a value of 0.2% to 1.7% during the carboxymethylation by applying reduced pressure and/or by passing nitrogen through;

solid NaOH as alkali metal hydroxide and chloroacetic acid sodium salt are used in the carboxymethylation, using NaOH in relation to the chloroacetic acid sodium salt in a ratio of 1 eq:1 eq to 1.1 eq:1 eq; and the nonionic surfactant (B) has been prepared via an alkoxylation using double metal cyanide catalysis; and chloroacetic acid sodium salt and the nonionic surfactant (B) of the general formula (II) are initially charged together in the reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq), and the sodium hydroxide is metered in at a temperature of 20-70° C., over a period of 4-12 h, the metered addition being effected continuously over the entire period or in equal portions every hour; and the water content in the reactor is kept at a value of 0.2% to 1.7% during the carboxymethylation by applying reduced pressure and/or by passing nitrogen through.

It has been found that, surprisingly, a surfactant mixture having a molar ratio of anionic surfactant (A) to nonionic surfactant (B) of 51:49 to 92:8 leads to interfacial tensions of <0.1 mN/m at ≥55° C. and surfactant concentrations of <0.5% by weight. The aim is normally virtually quantitative anionization levels of alkyl alkoxylates, in order to achieve a good effect. The values dictated by technical viability are usually >92% or ≥95%. Accordingly, the competent person of average skill in the art understands the aforementioned values to be the range that is sometimes typical for the anionic modification. In the case of the alkyl ether carboxylates, this may, for example, be a carboxymethylation level of 95%. As explained in detail hereinafter, a sometimes much lower carboxymethylation level is surprisingly found to have better suitability. This is also of great significance, for example, for the preparation of the alkyl ether carboxylates for tertiary mineral oil production, since less complex, less energy-intensive and hence less expensive processes can be used in order to arrive at corresponding carboxymethylation levels. Of particular interest in this context is a surfactant mixture having a molar ratio of anionic surfactant (A) to nonionic surfactant (B) of 70:30 to 89:11—especially if the surfactants are based on a mixture of primary linear saturated alkyl radicals having 16 and 18 carbon atoms, and have propyleneoxy and ethyleneoxy units in the manner described later, and especially in the presence of a cosolvent, for example butyl diethylene glycol. It is thus surprisingly possible to achieve interfacial tensions of <0.01 mN/m at >55° C., even though no base or a very different surfactant, for example an internal olefinsulfonate, has been added.

Accordingly, it is preferable that the surfactant formulation in the method of the invention for mineral oil production or the concentrate of the invention does not include any base and/or any olefinsulfonate or any alkylbenzenesulfonate (or any other organic sulfonate).

Further Details of the Invention

The present invention relates to a method for producing mineral oil from underground mineral oil deposits, in which an aqueous saline surfactant formulation comprising a surfactant mixture, for the purpose of lowering the interfacial tension between oil and water to <0.1 mN/m at deposit temperature, is injected through at least one injection well into a mineral oil deposit and crude oil is withdrawn through at least one production well from the deposit, wherein a) the mineral oil deposit has a deposit temperature of 55° C. to 150° C., a crude oil having more than 20° API and a deposit water having more than 100 ppm of divalent cations; and b) the surfactant mixture comprises at least one anionic surfactant (A) of the general formula (I)

and at least one nonionic surfactant (B) of the general formula (II)

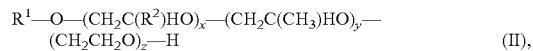

where a molar ratio of anionic surfactant (A) to nonionic surfactant (B) of 51:49 to 92:8 is present in the surfactant mixture on injection and the nonionic surfactant (B) serves as starting material for the anionic surfactant (A), where $R^1$ is a primary linear or branched, saturated or unsaturated, aliphatic hydrocarbyl radical having 10 to 36 carbon atoms; and $R^2$ is a linear saturated aliphatic hydrocarbyl radical having 2 to 14 carbon atoms; and M is H, Na, K or $NH_4$; and x is a number from 0 to 10; and y is a number from 0 to 50; and z is a number from 1 to 35;

where the sum total of x+y+z is a number from 3 to 80; and where the sum total of x+y is a number >0 if $R^1$ is a primary linear, saturated or unsaturated, aliphatic hydrocarbyl radical having 10 to 36 carbon atoms; and c) the concentration of all the surfactants together is 0.05% to 0.49% by weight, based on the total amount of the aqueous saline surfactant formulation.

$R^1$ is a primary linear or branched, saturated or unsaturated, aliphatic hydrocarbyl radical having 10 to 36 carbon atoms (preferably 10 to 28, more preferably 13 to 20, especially preferably 16 to 18 carbon atoms). In a particular embodiment, saturated hydrocarbyl radicals are used. In a particularly preferred embodiment, primary linear saturated hydrocarbyl radicals having 16 to 18 carbon atoms are used. In another preferred embodiment, primary linear unsaturated hydrocarbyl radicals having 18 carbon atoms are used. Accordingly, $R^1$ is an acyclic radical.

In the case of branched $R^1$ radicals, the branching level is preferably in the range of 011-5 (preferably of 0.1-2.5, more preferably 0.5 to 2.2). In this context, the term "branching level" is defined in a manner known in principle as the number of methyl groups in one molecule of the alcohol minus 1. The mean branching level is the statistical mean of the branching levels of all molecules in a sample.

In a preferred embodiment, the branched $R^1$ radical is 2-propylheptyl, isodecyl, isoundecyl, isotridecyl, an alkyl radical having 12 to 15 carbon atoms and a branching level of 0.1-0.5, an alkyl radical having 13 to 15 carbon atoms and a branching level of 0.1-0.5 or an alkyl radical having 16 to 17 carbon atoms and a branching level of 1.1 to 1.9.

In a further preferred embodiment of the invention, $R^1$ is a primary branched saturated aliphatic hydrocarbyl radical having 16 to 20 carbon atoms, being 2-hexyldodecyl, 2-octyldodecyl, or a mixture of the hydrocarbyl radicals mentioned. This is especially true when x is the number 0.

In a further preferred embodiment of the invention, $R^1$ is a primary branched saturated aliphatic hydrocarbyl radical having 24 to 28 carbon atoms, being 2-decyltetradecyl, 2-dodecylhexadecyl, 2-decylhexadecyl or 2-dodecyltetradecyl or a mixture of the hydrocarbyl radicals mentioned. This is especially true when x is the number 0.

In the above-defined general formulae, x, y and z are each natural numbers including 0, i.e. 0, 1, 2 etc. However, it is clear to the person skilled in the art in the field of polyalkoxylates that this definition is the definition of a single surfactant in each case. In the case of the presence of surfactant mixtures or surfactant formulations comprising a plurality of surfactants of the general formula, the numbers x, y and z are each mean values over all molecules of the surfactants, since the alkoxylation of alcohol with ethylene oxide or propylene oxide or higher alkylene oxides (e.g. butylene oxide to hexadecene oxide) in each case affords a certain distribution of chain lengths. This distribution can be described in a manner known in principle by what is called the polydispersity D. $D=M_w/M_n$ is the ratio of the weight-average molar mass and the number-average molar mass. The polydispersity can be determined by methods known to those skilled in the art, for example by means of gel permeation chromatography.

The alkyleneoxy groups may be arranged in random distribution, alternately or in blocks, i.e. in two, three, four or more blocks.

Preferably, the x (higher alkylene)oxy, y propyleneoxy and z ethyleneoxy groups are at least partly arranged in blocks (in numerical terms, preferably to an extent of at least 50%, more preferably to an extent of at least 60%, even more preferably to an extent of at least 70%, more preferably to an extent of at least 80%, more preferably to an extent of at least 90%, especially completely).

In the context of the present invention, "arranged in blocks" means that at least one alkyleneoxy has a neighboring alkyleneoxy group which is chemically identical, such that these at least two alkyleneoxy units form a block.

More preferably, there then occurs, on the $R^1$—O radical in formula (I) or (II), a (higher alkylene)oxy block with x (higher alkylene)oxy groups, followed by a propyleneoxy block with y propyleneoxy groups and finally an ethyleneoxy block with z ethyleneoxy groups.

Preferably, x is an integer from 0 to 10 (preferably 0 to 7, more preferably 0 to 1 and most preferably the number 0; x may also be an integer from 1 to 10) and/or y is an integer from 0 to 50 (preferably 0 to 40, more preferably 3 to 25, especially preferably 3 to 10 or 5 to 15 and even more preferably 5 to 9) and/or z is an integer from 1 to 35 (preferably 1 to 30 or 3 to 30, more preferably 1 to 25, especially preferably 3 to 24 and even more preferably 4 to 15 and especially 5 to 15), where the sum total of x+y+z is a number from 3 to 80, preferably from 3 to 49 and especially preferably from 7 to 24, where the sum total of x+y is a number >0 if $R^1$ is a primary linear, saturated or unsaturated, aliphatic hydrocarbyl radical having 10 to 36 carbon atoms.

In a farther particular embodiment of the invention,
$R^1$ is a primary linear or branched, saturated or unsaturated, aliphatic hydrocarbyl radical having 10 to 36 carbon atoms; and
x is the number 0; and
y is a number from 3 to 25 (more preferably 3 to 10); and
z is a number from 3 to 30 (more preferably 4 to 15); and
the sum total of x+y+z is a number from 6 to 55 (more preferably 7 to 25).

In a further particular embodiment of the invention, the sum total of x+y+z is a number from 7 to 24.

In a further embodiment of the invention, the method has the characteristic feature that
$R^1$ is a primary linear or branched, saturated or unsaturated, aliphatic hydrocarbyl radical having 10 to 36 carbon atoms; and
$R^2$ is a linear saturated aliphatic hydrocarbyl radical having 2 to 14 carbon atoms (more preferably 2); and
M is H, Na, K or $NH_4$; and
x is a number from 1 to 10 (more preferably 1 to 5); and
y is a number from 0 to 50 (more preferably 1 to 9); and
z is a number from 3 to 35;
where sum total of x+y+z is a number from 4 to 80 (more preferably 5 to 35).

In a further embodiment of the invention, the method has the characteristic feature that
$R^1$ is a primary branched saturated aliphatic hydrocarbyl radical having 10 to 36 carbon atoms; and
$R^2$ is a linear saturated aliphatic hydrocarbyl radical having 10 to 14 carbon atoms; and
M is H, Na, K or $NH_4$; and
x is a number of 1; and
y is the number 0 to 20; and
z is a number from 3 to 35;
where sum total of x+y+z is a number from 4 to 45.

In a further preferred embodiment, the method has the characteristic feature that
$R^1$ is a primary branched saturated aliphatic hydrocarbyl radical having 10 to 36 carbon atoms; and
$R^2$ is a linear saturated aliphatic hydrocarbyl radical having 2 to 14 carbon atoms; and
M is H, Na, K or $NH_4$; and
x is a number from 0 to 10 (preferably 0); and
y is the number 0; and
z is a number from 3 to 35;
where the sum, total of x+y+z is; a number from 3 to 45.

In a further embodiment of the invention, the method has the characteristic feature that
$R^1$ is a primary branched saturated aliphatic hydrocarbyl radical having 16 to 20 carbon atoms, being 2-hexyldecyl, 2-octyldecyl, 2-hexyldodecyl or 2-octyldodecyl, or a mixture of the hydrocarbyl radicals mentioned; and
x is the number 0.

In a further embodiment of the invention, the method has the characteristic feature that
$R^1$ is a primary branched saturated aliphatic hydrocarbyl radical having 24 to 28 carbon atoms, being 2-decyltetradecyl, 2-dodecylhexadecyl, 2-decylhexadecyl or 2-dodecyltetradecyl or a mixture of the hydrocarbyl radicals mentioned; and
x is the'number 0.

In another particularly preferred embodiment of the invention, the method has the characteristic feature that
$R^1$ is a primary linear saturated aliphatic hydrocarbyl radical having 16 or 18 carbon atoms; and
$R^2$ is a linear saturated aliphatic hydrocarbyl radical having 10 to 14 carbon atoms; and
M is H, Na, K or $NH_4$; and
x is the number 0; and
y is the number 3 to 15 (preferably 3 to 10, more preferably 5 to 9); and
z is a number from 3 to 35 (preferably 3 to 25, more preferably 8 to 20);
where sum total of x+y+z is a number from 6 to 45.

In the above formula (I), $M^+$ may also be a cation selected from the group of $Na^+$; $K^+$, $Li^+$, $NH_4^+$, $H^+$, ½ $Mg^{2+}$ and ½ $Ca^{2+}$. However, the preferred embodiment for $M^+$ is $Na^+$, $K^+$ or $NH_4^+$.

It is a characteristic feature of the invention that a molar ratio of anionic surfactant (A) of the general formula (I) to nonionic surfactant (B) of the general formula (II) of 51:49 to 92:8 is present in the surfactant mixture or in the concentrate on injection and the nonionic surfactant (B) serves as starting material for anionic surfactant (A). In a preferred execution of the invention, the ratio is 60:40 to 92:8, more preferably 70:30 to 92:8, especially preferably 70:30 to 89:11 and very especially preferably 71:29 to 85:15.

In the context of the process according to the invention for tertiary mineral oil production, the use of the inventive surfactant mixture lowers the interfacial tension between oil and water to values of <0.1 mN/m, preferably to <0.05 mN/m, more preferably to <0.01 mN/m. Thus, the interfacial tension between oil and water is lowered to values in the range from 0.1 mN/m to 0.0001 mN/m, preferably to values in the range from 0.05 mN/m to 0.0001 mN/m, more preferably to values in the range from 0.01 mN/m to 0.0001 mN/m. The stated values relate to the prevailing deposit temperature.

A particularly preferred execution is a Winsor type III microemulsion flooding operation.

In a further preferred execution of the invention, a thickening polymer from the group of the biopolymers or from the group of the copolymers based on acrylamide is added to the aqueous surfactant formulation. The copolymer may consist, for example, of the following units inter alia:

acrylamide and acrylic acid sodium salt acrylamide and acrylic acid sodium salt and N-vinylpyrrolidone acrylamide and acrylic acid sodium salt and AMPS (2-acrylamido-2-methylpropanesulfonic acid sodium salt)

acrylamide and acrylic acid sodium salt and AMPS (2-acrylamido-2-methylpropanesulfonic acid sodium salt) and N-vinylpyrrolidone.

The copolymer may also additionally comprise associative groups. Preferred copolymers are described in EP 2432807 or in WO 2014095621. Further preferred copolymers are described in U.S. Pat. No. 7,700,702.

A particularly preferred execution is a Winsor type 111 microemulsion/polymer flooding operation.

In a preferred execution of the invention, it is a characteristic feature of the process that the production of mineral oil from underground mineral oil deposits is a surfactant flooding method or a surfactant/polymer flooding method and not an alkali/surfactant/polymer flooding method and not a flooding method in which $Na_2CO_3$ is injected as well.

In a particularly preferred execution of the invention, it is a characteristic feature of the process that the production of mineral oil from underground mineral oil deposits is a Winsor type III microemulsion flooding method or a Winsor type III microemulsion/polymer flooding method and not an alkali/Winsor type III microemulsion/polymer flooding method and not a flooding method in which $Na_2CO_3$ is injected as well.

The deposit rock may be sandstone or carbonate.

In a preferred embodiment of the invention, the deposit is a sandstone deposit, wherein more than 70 percent by weight of sand (quartz and/or feldspar) is present and up to 25 percent by weight of other minerals selected from kaolinite, smectite, illite, chlorite and/or pyrite may be present. It is preferable that more than 75 percent by weight of sand (quartz and/or feldspar) is present and up to 20 percent by weight of other minerals selected from kaolinite, smectite, illite, chlorite and/or pyrite may be present. It is especially preferable that more than 80 percent by weight of sand (quartz and/or feldspar) is present and up to 15 percent by weight of other minerals selected from kaolinite, smectite, illite, chlorite and/or pyrite may be present.

The API gravity (American Petroleum Institute gravity) is a conventional unit of density commonly used in the USA for crude oils. It is used globally for characterization and as a quality standard for crude oil. The API gravity is calculated from the relative density $p_{rel}$ of the crude oil at 60° F. (15.56° C.), based on water, using API gravity=$(141.5/P_{rel})-131.5$, According to the invention, the crude oil from the deposit should have at least 20° API. Preference is given to at least 22° API. Particular preference is given to at least 25° API. Very particular preference is given to at least 30° API.

The deposit temperature in the mineral oil deposit in which the method of the invention is employed is, in accordance with the invention, 55 to 150° C., especially 55° C. to 140° C., preferably 60° C. to 130° C., more preferably 60° C. to 120° C. and, for example, 65° C. to 110° C.

The salts in the deposit water may especially be alkali metal salts and alkaline earth metal salts. Examples of typical cations include $Na^+$, $K^+$, $Mg^{2+}$+ and/or $Ca^{2+}$, and examples of typical anions include chloride, bromide, hydrogencarbonate, sulfate or borate. According to the invention, the deposit water should include at least 100 ppm of divalent cations. The amount of alkaline earth metal ions may preferably be 100 to 53,000 ppm, more preferably 120 ppm to 20,000 ppm and even more preferably 150 to 6000 ppm.

In general, at least one or more than one alkali metal ion is present, especially at least $Na^+$. In addition, alkaline earth metal ions can also be present, in which case the weight ratio of alkali metal ions/alkaline earth metal ions is generally ≥2, preferably ≥3. Anions present are generally at least one or mere than one halide ion(s), especially at least Cl –. In general, the amount of Cl – is at least 50% by weight, preferably at least 80% by weight, based on the sum total of all the anions.

The total amount of all the salts in the deposit water may be up to 350,000 ppm (parts by weight), based on the sum total of all the components in the formulation, for example 2000 ppm to 350,000 ppm, especially 5000 ppm to 250,000 ppm. If seawater is used for injection, the salt content may be 2000 ppm to 40,000 ppm, and, if formation water is used, the salt content may be 5000 ppm to 250,000 ppm, for example 10,000 ppm to 200,000 ppm.

The concentration of all the surfactants together is 0.05% to 0.49% by weight, based on the total amount of the aqueous formulation injected. The total surfactant concentration is preferably 0.06% to 0.39% by weight, more preferably 0.08% to 0.29% by weight.

In a further preferred embodiment of the invention, at least one organic cosolvent can be added to the surfactant mixture claimed. These are preferably completely water-miscible solvents, but it is also possible to use solvents having only partial water miscibility. In general, the solubility should be at least 50 g/l, preferably at least 100 g/l. Examples include aliphatic C3 to C8 alcohols, preferably C4 to C6 alcohols, farther preferably C3 to C6 alcohols, which may be substituted by 1 to 5, preferably 1 to 3, ethyleneoxy units to achieve sufficient water solubility, Further examples include aliphatic dials having 2 to 8 carbon atoms, which may optionally also have further substitution. For example, the cosolvent may be at least one selected from the group of 2-butanol, 2-methyl-1-propanol, butyl ethylene glycol, butyl diethylene glycol or butyl triethylene glycol.

Accordingly, it is preferable that the aqueous saline surfactant formulation comprises, as well as the anionic surfactant (A) of the general formula (I) and the nonionic surfactant (B) of the general formula (II), also a cosolvent selected from the group of the aliphatic alcohols having 3 to 8 carbon atoms or from the group of the alkyl monoethylene glycols, the alkyl diethylene glycols or the alkyl triethylene glycols, where the alkyl radical is an aliphatic hydrocarbyl radical having 3 to 6 carbon atoms.

Particular preference is given to a method wherein the mixture of anionic surfactant (A) of the general formula (I) and nonionic surfactant (B) of the general formula (II) is provided in the form of a concentrate comprising 20% by weight to 70% by weight of the surfactant mixture, 10% by weight to 40% by weight of water and 10% by weight to 40% by weight of a cosolvent, based on the total amount of the concentrate, where the cosolvent is selected from the group of the aliphatic alcohols having 3 to 8 carbon atoms or from the group of the alkyl monoethylene glycols, the alkyl diethylene glycols or the alkyl triethylene glycols, where the alkyl radical is an aliphatic hydrocarbyl radical having 3 to 6 carbon atoms, and the concentrate is free-flowing at 20° C. and has a viscosity at 40° C. of <1500 mPas at 200 Hz.

It is additionally preferable that the concentrate comprises 0.5% to 20% by weight (preferably 1% to 15%, more preferably 2% to 10%, by weight) of a mixture comprising NaCl and diglycolic acid disodium salt, where NaCl is present in excess relative to diglycolic acid disodium salt.

It is most preferable that the concentrate comprises butyl diethylene glycol as cosolvent.

A further execution of the invention is a method wherein aqueous saline surfactant formulation comprises, as well as the anionic surfactant (A) of the general formula (I) and the nonionic surfactant (B) of the general formula (II), also further surfactants (C) which are not identical to the surfactants (A) or (B), and
- are from the group of the alkylbenzenesulfonates, alpha-olefinsulfonates, internal olefinsulfonates, paraffin-sulfonates, where the surfactants have 14 to 28 carbon atoms;

and/or
- are selected from the group of the alkyl ethoxylates and alkyl polyglucosides, where the particular alkyl radical has 8 to 18 carbon atoms.

For the surfactants (C), particular preference is given to alkyl polyglucosides which have been formed from primary linear fatty alcohols having 8 to 14 carbon atoms and have a glucosidation level of 1 to 2, and alkyl ethoxylates which have been formed from primary alcohols having 10 to 18 carbon atoms and have an ethoxylation level of 3 to 25.

The nonionic surfactants (B) of the general formula (II) can be formed as follows. First of all, it requires the preparation of a corresponding alcohol which can be prepared as follows by way of example:
- primary linear aliphatic alcohols are prepared by hydrogenating fatty acids (prepared from natural vegetable or animal fats and oils) or by hydrogenating fatty acid methyl esters. Alternatively, they can be prepared by the Ziegler process by oligomerizing ethylene over an aluminum catalyst and then releasing the alcohol by adding water.
- primary branched aliphatic alcohols can be prepared by hydroformylation (reaction with carbon monoxide and hydrogen) of alkenes (oxo process alcohols). The alkenes may be oligomers of ethylene, propylene and/or butylene. The oligomerization may give rise to alpha-olefins, and also olefins having an internal double bond. Through olefin metathesis of the alkenes, further variations are possible. A further access route to alkenes is the dehydrogenation of alkanes and paraffins.
- primary branched aliphatic alcohols can be prepared by Guerbet reaction (dimerization of alcohols with elimination of water in the presence of base and at elevated temperature) of primary alcohols (Guerbet alcohols). Further details can be found, for example, in WO2013060670.

Subsequently, the primary alcohols $R^1OH$ are alkoxylated to give the corresponding nonionic surfactants (B) of the general formula (II). The performance of such alkoxylations is known in principle to those skilled in the art. It is likewise known to those skilled in the art that the reaction conditions, especially the selection of the catalyst, can influence the molecular weight distribution of the alkoxylates.

The surfactants according to the general formula can preferably be prepared by base-catalyzed alkoxylation. In this case, the alcohol $R^1OH$ can be admixed in a pressure reactor with alkali metal hydroxides (e.g. NaOH, KOH, CsOH), preferably potassium hydroxide, or with alkali metal alkoxides, for example sodium methoxide or potassium methoxide. Water (or MeOH) still present in the mixture can be drawn off by means of reduced pressure (for example <100 mbar) and/or increasing the temperature (30 to 150° C.) Thereafter, the alcohol is present in the form of the corresponding alkoxide. This is followed by inertization with inert gas (for example nitrogen) and stepwise addition of the alkylene oxide(s) at temperatures of 60 to 180° C. up to a pressure of not more than 20 bar (preferably not more than 10 bar). In a preferred embodiment, the alkylene oxide is metered in initially at 120° C. In the course of the reaction, the heat of reaction released causes the temperature to rise up to 170° C. In a further preferred embodiment of the invention, the higher alkylene oxide (e.g. butylene oxide or hexadecene oxide) is first added at a temperature in the range from 100 to 145° C., then the propylene oxide is added at a temperature in the range from 100 to 145° C., and subsequently the ethylene oxide is added at a temperature in the range from 120 to 165° C. At the end of the reaction, the catalyst can, for example, be neutralized by adding acid (for example acetic acid or phosphoric acid) and be filtered off if required. However, the material may also remain unneutralized.

The alkoxylation of the alcohols $R^1OH$ can also be undertaken by means of other methods, for example by acid-catalyzed alkoxylation. In addition, it is possible to use, for example, double hydroxide clays, as described in DE 4325237 A1, or it is possible to use double metal cyanide catalysts (DMC catalysts). Suitable DMC catalysts are disclosed, for example, in DE 10243361 A1, especially in paragraphs [0029] to [0041] and the literature cited therein. For example, it is possible to use catalysts of the Zn—Co type. To perform the reaction, the alcohol $R^1OH$ can be admixed with the catalyst, and the mixture dewatered as described above and reacted with the alkylene oxides as described. Typically not more than 1000 ppm of catalyst based on the mixture are used, and the catalyst can remain in the product owing to this small amount. The amount of catalyst may generally be less than 1000 ppm, for example 250 ppm or less.

The anionic surfactants (A) of the general formula (I) can be prepared from the nonionic surfactants (B) of the general formula (II).

In this case, the invention preferably relates to a method wherein the anionic surfactant (A) of the general formula (I) is prepared by reacting the nonionic surfactant (B) of the general formula (II), while stirring, with chloroacetic acid or chloroacetic acid sodium salt in the presence of alkali metal hydroxide or aqueous alkali metal hydroxide, with removal of water of reaction such that the water content in the reactor is kept at a value of 0.2% to 1.7% (preferably 0.3% to 1.5%) during the carboxymethylation by applying reduced pressure and/or by passing nitrogen through. Particular preference is given to the method for surfactants comprising propyleneoxy units. It is even more preferable when the surfactants are additionally those based on linear C16C18 fatty alcohol.

A further preferred embodiment of the invention relates to a method wherein aqueous NaOH (preferably 40-80% strength, more preferably 45-55% strength) as alkali metal hydroxide and aqueous chloroacetic acid (preferably 75-85% strength) are used in the carboxymethylation, using NaOH in relation to the chloroacetic acid in a ratio of 2 eq (molar equivalent):1 eq to 2.2 eq:1 eq;
and
the nonionic surfactant (B) has been prepared either via a base-catalyzed alkoxylation (preferably <5 mol % of base as alkoxylation catalyst) using KOH or NaOH or CsOH or via an alkoxylation using a double metal cyanide catalyst, and the alkoxylation catalyst has not been neutralized and not been removed after the alkoxylation has ended;
and
the nonionic surfactant (B) of the general formula (II) is initially charged together in the reactor in the carboxymethylation and the sodium hydroxide and chloroacetic acid are metered in in parallel at a temperature of 60-110° C. (preferably 70-100° C.) over a period of 1-7 h (preferably 1-6 h), the metered addition over the entire period being effected continuously or in equal portions every hour, and the stoichiometric ratio of nonionic surfactant (B) of the general formula (II) to the chloroacetic acid being 1 eq:1 eq to 1 eq:1.9 eq (preferably 1 eq:1 eq to 1 eq:1.5 eq, more preferably 1 eq:1 eq to 1 eq 1.35 eq);
and
the water content in the reactor is kept predominantly at an average value of 0.2% to 1.7% during the carboxymethylation by applying reduced pressure and/or by passing nitrogen through.

A further preferred embodiment of the invention rebates to a method wherein

NaOH as alkali metal hydroxide and chloroacetic acid sodium salt are used in the carboxymethylation, using NaOH in relation to the chloroacetic acid sodium salt in a ratio of 1 eq (molar equivalent):1 eq to 1 eq:1.9 eq;
and
the nonionic surfactant (B) has been prepared via a base-catalyzed alkoxylation (preferably <5 mol % of base as alkoxylation catalyst) using KOH or NaOH or CsOH and is preferably used in unneutralized form in the carboxymethylation;
and
the nonionic surfactant (B) of the general formula (II) is initially charged in the reactor in the carboxymethylation together with NaOH or aqueous NaOH (preferably 40-80% strength), where the stoichiometric ratio of nonionic surfactant (B) of the general formula (II) to NaOH is 1 eq:1 eq to 1 eq:1.5 eq (preferably 1 eq:1 eq to 1 eq:1.35 eq), a temperature of 60-110° C. is set, and the nonionic surfactant (B) of the general formula (II) is converted to the corresponding sodium salt $R^1$—O—$(CH_2C(R^2)HO)_x$—$(CH_2C(CH_3)HO)_y$—$(CH_2CH_2O)_z$—Na by applying reduced pressure and/or passing nitrogen through and, at a temperature of 60-110° C., the chloroacetic acid sodium salt is metered in in completely or preferably over a period of 4-12 h, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq) and where the metered addition over the entire period is effected continuously or in equal portions every hour;
and
the water content in the reactor is kept at a value of 0.2% to 1.7% during the carboxymethylation by applying reduced pressure and/or by passing nitrogen through.

A further preferred embodiment of the invention relates to a method wherein solid NaOH as alkali metal hydroxide and chloroacetic acid sodium salt are used in the carboxymethylation, using NaOH in relation to the chloroacetic acid sodium salt in a ratio of 1 eq (molar equivalent):1 eq to 1.1 eq:1 eq;
and
the nonionic surfactant (B) has been prepared via a base-catalyzed alkoxylation using KOH or NaOH or CsOH and then neutralized with acetic acid and is used in the carboxymethylation together with initially 0.5-1.5% water;
and
chloroacetic acid sodium salt and the nonionic surfactant (B) of the general formula (II) are initially charged together in the reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq, especially preferably 1 eq:1 eq to 1 eq:1.35 eq), and the sodium hydroxide is metered in at a temperature of 20-70° C. over a period of 4-12 h, the metered addition being effected continuously over the entire period or in equal portions every hour;
and
the water content in the reactor is kept at a value of 0.2% to 1.7% (preferably 0.3% to 1.5%) during the carboxymethylation by applying reduced pressure and/or by passing nitrogen through.

Another preferred embodiment of the invention relates to a method wherein solid NaOH as alkali metal hydroxide and chloroacetic acid sodium salt are used in the carboxymethylation, using NaOH or, in the case of a basic alkoxylate, the sum total of NaOH and $R^1$—O—$(CH_2C(R^2)HO)_x$—$(CH_2C(CH_3)HO)_y$—$(CH_2CH_2O)_z$—K or the sum total in the case of a basic alkoxylate of NaOH and $R^1$—O—$(CH_2C(R^2)HO)_x$—$(CH_2C(CH_3)HO)_y$—$(CH_2CH_2O)_z$—Na or, in the case of a basic alkoxylate, the sum total of NaOH and $R^1$—O—$(CH_2C(R^2)HO)_z$—$(CH_2C(CH_3)HO)_y$—$(CH_2CH_2O)_z$—Cs in relation to the chloroacetic acid sodium salt in a ratio of 1.1 eq (molar equivalent):1 eq to 1 eq:1.5 eq (preferably 1 eq:1 eq to 1.1 eq:1 eq), where the ratio of nonionic surfactant (B) of the general formula (II):NaOH is 1 eq:1 eq to 1 eq:1.5 eq;

and the nonionic surfactant (B) has been prepared via a base-catalyzed alkoxylation using KOH or NaOH or CsOH or a mixture of NaOH and KOH, and is used in the carboxymethylation either in neutralized and filtered (i.e. salt-free) form or in the form of an unneutralized basic alkoxylate (preferably <5 mol % of base as alkoxylation catalyst);

and chloroacetic acid sodium salt and the nonionic surfactant (B) of the general formula (II) are initially charged together in the reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq: 1.5 eq, especially preferably 1 eq:1 eq to 1 eq:1.35 eq), and the sodium hydroxide is metered in at a temperature of 20-70° C. (preferably 40 to 60° C.) over a period of 4-12 h, the metered addition being effected continuously over the entire period or in equal portions every hour;

and the water content in the reactor is kept at a value of 0.2% to 1.7% (preferably 0.3% to 1.5%) during the carboxymethylation by applying reduced pressure and/or by passing nitrogen through.

Another preferred embodiment of the invention relates to a method wherein solid NaOH as alkali metal hydroxide and chloroacetic acid sodium salt are used in the carboxymethylation, using NaOH in relation to the chloroacetic acid sodium salt in a ratio of 1 eq (molar equivalent):1 eq to 1.1 eq:1 eq;

and the nonionic surfactant (B) has been prepared via an alkoxylation using double metal cyanide catalysis;

and chloroacetic acid sodium salt and the nonionic surfactant (B) of the general formula (II) are initially charged together in the reactor in the carboxymethylation, where the stoichiometric ratio of nonionic surfactant (B) of the general formula (II) to the chloroacetic acid sodium salt is 1 eq:1 eq to 1 eq:1.9 eq (preferably 1 eq:1 eq to 1 eq:1.5 eq, especially preferably 1 eq:1 eq to 1 eq:1.35 eq), and the sodium hydroxide is metered in at a temperature of 20-70° C. over a period of 4-12 h, the metered addition being effected continuously over the entire period or in equal portions every hour;

and the water content in the reactor is kept at a value of 0.2% to 1.7% (preferably 0.3% to 1.5%) during the carboxymethylation by applying reduced pressure, and/or by passing nitrogen through.

A preferred embodiment of the invention is a production method according to the above-specified executions for production, in order to prepare a surfactant mixture of anionic surfactant (A) of the general formula (I) and nonionic surfactant (B) of the general formula (II), wherein a molar ratio of anionic surfactant (A) to nonionic surfactant (B) of 51:49 to 92:8 (preferably 70:30 to 89:11) is present in the surfactant mixture at the end of the reaction.

Additionally preferably, the methods of the invention for mineral oil production comprise the method steps of the production methods of the invention that are upstream of the injection step.

A particularly preferred embodiment of the invention is a production method according to the above-specified executions for production, in order to prepare a surfactant mixture of anionic surfactant (A) of the general formula (I) and nonionic surfactant (B) of the general formula (II), wherein a molar ratio of anionic surfactant (A) to nonionic surfactant (B) of 51:49 to 92:8 (preferably 70:30 to 89:11) is present in the surfactant mixture at the end of the reaction, and the surfactants comprise propyleneoxy units. It is even more preferable when the surfactants are additionally those based on linear C16C18 fatty alcohol.

Likewise in accordance with the invention is a concentrate as already specified above, composed of anionic surfactant (A) of the general formula (I) and nonionic surfactant (B) of the general formula (II), wherein a molar ratio of anionic surfactant (A) to nonionic surfactant (B) of 51:49 to 92:8 (preferably 70:30 to 89:11) is present in the concentrate.

Method of Mineral Oil Production

The above-described method of mineral oil production with the aid of the claimed surfactant mixture of anionic surfactant (A) of the general formula (I) and the nonionic surfactant (B) of the general formula (II) can optionally be conducted with the addition of further methods. For instance, it is optionally possible to add a polymer or a foam for mobility control. The polymer can optionally be injected into the deposit together with the surfactant formulation, followed by the surfactant formulation. It can also be injected only with the surfactant formulation or only after surfactant formulation. The polymers may be copolymers based on acrylamide or a biopolymer. The copolymer may consist, for example, of the following units inter alia:

acrylamide and acrylic acid sodium salt acrylamide and acrylic acid sodium salt and N-vinylpyrrolidone acrylamide and acrylic acid sodium salt and AMPS (2-acrylamido-2-methylpropanesulfonic acid sodium salt)

acrylamide and acrylic acid sodium salt and AMPS (2-acrylamido-2-methylpropanesulfonic acid sodium salt) and N-vinylpyrrolidone.

The copolymer may also additionally comprise associative groups. Usable copolymers are described in EP 2432807 or in WO 2014095621. Further usable copolymers are described in U.S. Pat. No. 7,700,702.

The polymers can be stabilized by addition of further additives such as biocides, stabilizers, free radical scavengers and inhibitors.

The foam can be produced at the deposit surface or in situ in the deposit by injection of gases such as nitrogen or gaseous hydrocarbons such as methane, ethane or propane. The foam can be produced and stabilized by adding the surfactant mixture claimed or else further surfactants.

Optionally, it is also possible to add a base such as alkali metal hydroxide or alkali metal carbonate to the surfactant formulation, in which case it is combined with complexing agents or polyacrylates in order to prevent precipitation as a result of the presence of polyvalent cations. In addition, it is also possible to add a cosolvent to the formulation.

This gives rise to the following (combined) methods:

surfactant flooding

Winsor type III microemulsion flooding surfactant/polymer flooding

Winsor type III microemulsion/polymer flooding
alkali/surfactant/polymer flooding
alkali/Winsor type III microemulsion/polymer flooding
surfactant/foam flooding
Winsor type III microemulsion/foam flooding
alkali/surfactant/foam flooding
alkali/Winsor type Ill microemulsion/foam flooding In a preferred embodiment of the invention, one of the first four methods is employed (surfactant flooding, Winsor type III microemulsion flooding, surfactant/polymer flooding or Winsor type III microemulsion/polymer flooding). Particular preference is given to Winsor type III microemulsion/polymer flooding.

In Winsor type III microemulsion/polymer flooding, in the first step, a surfactant formulation is injected with or without polymer. The surfactant formulation, on contact with crude oil, results in the formation of a Winsor type III microemulsion. In the second step, only polymer is injected. In the first step in each case, it is possible to use aqueous formulations having higher salinity than in the second step. Alternatively, both steps can also be conducted with water of equal salinity.

In one embodiment, the methods can of course also be combined with water flooding. In the case of water flooding, water is injected into a mineral oil, deposit through at least one injection well, and crude oil is withdrawn from the deposit through at least one production well. The water may be freshwater or saline water such as seawater or deposit water. After the water flooding, the method of the invention may be employed.

To execute the method of the invention, at least one production well and at least one injection well are sunk into the mineral oil deposit. In general, a deposit is provided with several injection wells and with several production wells. An aqueous formulation of the water-soluble components described is injected through the at least one injection well into the mineral oil deposit, and crude oil is withdrawn from the deposit through at least one production well. As a result of the pressure generated by the aqueous formulation injected, called the "flood", the mineral oil flows in the direction of the production well and is produced via the production well. The term "mineral oil" in this context of course does not just mean single-phase oil; instead, the term also encompasses the usual crude oil-water emulsions. It will be clear to the person skilled in the art that a mineral oil deposit may also have a certain temperature distribution. Said deposit temperature is based on the region of the deposit between the injection and production wells which is covered by the flooding with aqueous solutions. Methods of determining the temperature distribution of a mineral oil deposit are known in principle to those skilled in the art. The temperature distribution is generally determined from temperature measurements at particular sites in the formation in combination with simulation calculations; the simulation calculations also take account of the amounts of heat introduced into the formation and the amounts of heat removed from the formation.

The method of the invention can especially be employed in mineral oil deposits having an average porosity of 5 mD to 4 D, preferably 50 mD to 2 D and more preferably 200 mD to 1 D. The permeability of a mineral oil formation is reported by the person skilled in the art in the unit "darcy" (abbreviated to "D" or "mD" for "millidarcies"), and can be determined from the flow rate of a liquid phase in the mineral oil formation as a function of the pressure differential applied. The flow rate can be determined in core flooding tests with drill cores taken from the formation. Details of this can be found, for example, in K. Weggen, G. Pusch, H. Rischmüller in "Oil and Gas", pages 37 ff, Ullmann's Encyclopedia of Industrial Chemistry, Online Edition, Wiley-VCH, Weinheim 2010. It will be clear to the person skilled in the art that the permeability in a mineral oil deposit need not be homogeneous, but generally has a certain distribution, and the permeability reported for a mineral oil deposit is accordingly an average permeability.

To execute the method, an aqueous formulation is used, comprising, as well as water, at least the described surfactant mixture of anionic surfactant (A) of the general formula (I) and the nonionic surfactant (B) of the general formula (II).

The formulation is made up in water comprising salts. Of course, there may also be mixtures of different salts. For example, it is possible to use seawater to make up the aqueous formulation, or it is possible to use produced formation water, which is reused in this way. In the case of offshore production platforms, the formulation is generally made up in seawater. In the case of onshore production facilities, the polymer can advantageously first be dissolved in fresh water and the solution obtained can be diluted to the desired use concentration with formation water. The deposit water or seawater should include at least 100 ppm of divalent cations.

The salts may especially be alkali metal salts and alkaline earth metal salts. Examples of typical anions include $Na^+$, $K^+$, $Mg^{2+}$ and/or $Ca^{2+}$, and examples of typical cations include chloride, bromide, hydrogencarbonate, sulfate or borate.

In general, at least one or more than one alkali metal ion is present, especially at least $Na^+$. In addition, alkaline earth metal ions are also be present, in which case the weight ratio of alkali metal ions/alkaline earth metal ions is generally ≥2, preferably ≥3. Anions present are generally at least one or more than one halide ion(s), especially at least $Cl^-$. In general, the amount of $Cl^-$ is at least 50% by weight, preferably at least 80% by weight, based on the sum total of all the anions.

The total amount of all the salts in the aqueous formulation may be up to 350,000 ppm (parts by weight), based on the sum total of all the components in the formulation, for example 2000 ppm to 350,000 ppm, especially 5000 ppm to 250,000 ppm. If seawater is used to make up the formulation, the salt content may be 2000 ppm to 40,000 ppm, and, if formation water is used, the salt content may be 5000 ppm to 250,000 ppm, for example 10,000 ppm to 200,000 ppm. The amount of alkaline earth metal ions may preferably be 100 to 53,000 ppm, more preferably 120 ppm to 20,000 ppm and even more preferably 150 to 6000 ppm.

Additives can be used, for example, in order to prevent unwanted side effects, for example the unwanted precipitation of salts, or in order to stabilize the polymer used. The polymer-containing formulations injected into the formation in the flooding process flow only very gradually in the direction of the production well, meaning that they remain under formation conditions in the formation for a prolonged period. Degradation of the polymer results in a decrease in the viscosity. This either has to be taken into account through the use of a higher amount of polymer, or else it has to be accepted that the efficiency of the method will worsen. In each case, the economic viability of the method worsens. A multitude of mechanisms may be responsible for the degradation of the polymer. By means of suitable additives, the polymer degradation can be prevented or at least delayed according to the conditions.

In one embodiment of the invention, the aqueous formulation used comprises at least one oxygen scavenger. Oxygen scavengers react with oxygen which may possibly be present in the aqueous formulation and thus prevent the oxygen from being able to attack the polymer or polyether groups. Examples of oxygen scavengers comprise sulfites, for example $Na_2SO_3$, bisulfites, phosphites, hypophosphites or dithionites.

In a further embodiment of the invention, the aqueous formulation used comprises at least one free radical scavenger. Free radical scavengers can be used to counteract the degradation of the polymer by free radicals. Compounds of this kind can form stable compounds with free radicals. Free radical scavengers are known in principle to those skilled in the art. For example, they may be stabilizers selected from the group of sulfur compounds, secondary amines, sterically hindered amines, N-oxides, nitroso compounds, aromatic hydroxyl compounds or ketones. Examples of sulfur compounds include thiourea, substituted thioureas such as N,N'-dimethylthiourea, N,N'-diethylthiourea, N,N'-diphenylthiourea, thiocyanates, for example ammonium thiocyanate or potassium thiocyanate, tetramethylthiuram disulfide, and mercaptans such as 2-mercaptobenzothiazole or 2-mercaptobenzimidazole or salts thereof, for example the sodium salts, sodium dimethyldithiocarbamate, 2,2'-dithiobis(benzothiazole), 4,4'-thiobis(6-t-butyl-m-cresol). Further examples include phenoxazine, salts of carboxylated phenoxazine, carboxylated phenoxazine, methylene blue, dicyandiamide, guanidine, cyanamide, paramethoxyphenol, sodium salt of paramethoxyphenol, 2-methylhydroquinone, salts of 2-methylhydroquinone, 2,6-di-t-butyl-4-methylphenol, butylhydroxyanisole, 8-hydroxyquinoline, 2,5-di(t-amyl)-hydroquinone, 5-hydroxy-1,4-naphthoquinone, 2,5-di(t-amyl)hydroquinone, dimedone, propyl 3,4,5-trihydroxybenzoate, ammonium N-nitrosophenylhydroxylamine, 4-hydroxy-2,2,6,6tetramethyloxypiperidine, N-(1,3-dimethylbutyl)-N'-phenyl-p-phenylenediamine and 1,2,2,6,6-pentamethyl-4-piperidinol. Preference is given to sterically hindered amines such as 1,2,2,6,6-pentamethyl-4-piperidinol and sulfur compounds, mercapto compounds, especially 2-mercaptobenzothiazole or 2-mercaptobenzimidazole or salts thereof, for example the sodium salts, and particular preference is given to 2-mercaptobenzothiazole or salts thereof.

In a further embodiment of the invention, the aqueous formulation used comprises at least one sacrificial reagent. Sacrificial reagents can react with free radicals and thus render them harmless. Examples include especially alcohols. Alcohols can be oxidized by free radicals, for example to ketones. Examples include monoalcohols and polyalcohols, for example 1-propanol, 2-propanol, propylene glycol, glycerol, butanediol or pentaerythritol.

In a further embodiment of the invention, the aqueous formulation used comprises at least one complexing agent. It is of course possible to use mixtures of various complexing agents, Complexing agents are generally anionic compounds which can complex especially divalent and higher-valency metal ions, for example $Mg^{2+}$ or $Ca^{2+}$. In this way, it is possible, for example, to prevent any unwanted precipitation. In addition, it is possible to prevent any polyvalent metal ions present from crosslinking the polymer by means of acidic groups present, especially COOH group. The complexing agents may especially be carboxylic acid or phosphonic acid derivatives. Examples of complexing agents include ethylenediaminetetraacetic acid (EDTA), ethylenediaminesuccinic acid (EDDS), diethylenetriaminepentamethylenephosphonic acid (DTPMP), methylglycinediacetic acid (MGDA) and nitrilotriacetic acid (NTA). Of course, the corresponding salts of each may also be involved, for example the corresponding sodium salts. In a particularly preferred embodiment of the invention, MGDA is used as complexing agent As an alternative to or in addition to the abovementioned chelating agents, it is also possible to use polyacrylates.

In a further embodiment of the invention, the formulation comprises at least one organic cosolvent. These are preferably completely water-miscible solvents, but it is also possible to use solvents having only partial water miscibility. In general, the solubility should be at least 50 g/l, preferably at least 100 g/l. Examples include aliphatic $C_4$ to $C_8$ alcohols, preferably $C_4$ to $C_6$ alcohols, which may be substituted by 1 to 5, preferably 1 to 3, ethyleneoxy units to achieve sufficient water solubility. Further examples include aliphatic dials having 2 to 8 carbon atoms, which may optionally also have further substitution. For example, the cosolvent may be at least one selected from the group of 2-butanol, 2 methyl-1-propanol, butylglycol, butyldiglycol and butyltriglycol.

The concentration of the polymer in the aqueous formulation is fixed such that the aqueous formulation has the desired viscosity for the end use. The viscosity of the formulation should generally be at least 5 mPas (measured at 25° C. and a shear rate of 7 $s^{-1}$), preferably at least 10 mPas.

According to the invention, the concentration of the polymer in the formulation is 0.02% to 0% by weight, based on the sum total of all the components of the aqueous formulation. The amount is preferably 0.05% to 0.5% by weight, more preferably 0.1% to 0.3% by weight and, for example, 0.1% to 0.2% by weight.

The aqueous polymer-comprising formulation can be prepared by initially charging the water, sprinkling the polymer in as a powder and mixing it with the water. Apparatus for dissolving polymers and injecting the aqueous solutions into underground formations is known in principle to those skilled in the art.

The injecting of the aqueous formulation can be undertaken by means of customary apparatuses. The formulation can be injected into one or more injection wells by means of customary pumps. The injection wells are typically lined with steel tubes cemented in place, and the steel tubes are perforated at the desired point. The formulation enters the mineral oil formation from the injection well through the perforation. The pressure applied by means of the pumps, in a manner known in principle, is used to fix the flow rate of the formulation and hence also the shear stress with which the aqueous formulation enters the formation. The shear stress on entry into the formation can be calculated by the person skilled in the art in a manner known in principle on the basis of the Hagen-Poiseuille law, using the area through which the flow passes on entry into the formation, the mean pore radius and the volume flow rate. The average permeability of the formation can be found as described in a manner known in principle. Naturally, the greater the volume flow rate of aqueous polymer formulation injected into the formation, the greater the shear stress.

The rate of injection can be fixed by the person skilled in the art according to the conditions in the formation. Preferably, the shear rate on entry of the aqueous polymer formulation into the formation is at least 30,000 $s^{-1}$, preferably at least 60,000 $s^{-1}$ and more preferably at least 90,000 $s^{-1}$.

In one embodiment of the invention, the method of the invention is a flooding method in which a base and typically a complexing agent or a polyacrylate is used. This is typically the case when the proportion of polyvalent cations in the deposit water is low (100-400 ppm). An exception is sodium metaborate, which can be used as a base in the presence of significant amounts of polyvalent cations even without complexing agent.

The pH of the aqueous formulation is generally at least 8, preferably at least 9, especially 9 to 13, preferably 10 to 12 and, for example, 10.5 to 11.

In principle, it is possible to use any kind of base with which the desired pH can be attained, and the person skilled in the art will make a suitable selection. Examples of suitable bases include alkali metal hydroxides, for example NaOH or KOH, or alkali metal carbonates, for example $Na_2CO_3$. In addition, the bases may be basic salts, for example alkali metal salts of carboxylic acids, phosphoric acid, or especially complexing agents comprising acidic groups in the base form, such as $EDTANa_4$.

Mineral oil typically also comprises various carboxylic acids, for example naphthenic acids, which are converted to the corresponding salts by the basic formulation. The salts act as naturally occurring surfactants and thus support the process of oil removal.

With complexing agents, it is advantageously possible to prevent unwanted precipitation of sparingly soluble salts, especially Ca and Mg salts, when the alkaline aqueous formulation comes into contact with the corresponding metal ions and/or aqueous formulations for the process comprising corresponding salts are used. The amount of complexing agents is selected by the person skilled in the art. It may, for example, be 0.1% to 4% by weight, based on the sum total of all the components of the aqueous formulation.

In a particularly preferred embodiment of the invention, however, a method of mineral oil production is employed in which no base (e.g. alkali metal hydroxides or alkali metal carbonates) is used.

The following examples are intended to illustrate the invention and its advantages in detail:

Preparation of the Alkyl Ether Alcohols (B):

Abbreviations Used:

EO ethyteneoxy
PO propyleneoxy
BuO 1,2-butyleneoxy

For the synthesis, the following alcohols were used:

| Alcohol | Description |
|---|---|
| $C_{16}C_{18}$ | Commercially available tallow fatty alcohol mixture consisting of linear saturated primary $C_{16}H_{33}$—OH and $C_{18}H_{37}$—OH |
| $C_{16}C_{18}C_{20}$ Guerbet | Mixture of alcohols obtained from a Guerbet reaction of n-octanol and n-decanol: 2-hexyldecan-1-ol, 2-octyldecan-1-ol, 2-hexyldodecan-1-ol or 2-octyldodecan-1-ol |
| 2PH | Commerically available Guerbet alcohol 2-propylheptan-1-ol $C_{10}H_{21}$—OH |

Alkyl Ether Alcohol 1: C16C18—3 PO—10 EO—H by KOH Catalysis, Desalinated

Corresponds to surfactant of the general formula (II) R1-O—(CH2C(R2)HO)$_x$—(CH2C(CH3)HO)y—(CH2CH2O)z-H with R1=C16H33/C18H37, x=0, y=3 and z=10

A 2 L pressure autoclave with anchor stirrer was initially charged with 384 g (1.5 mol) of C16C18 alcohol and the stirrer was switched on. Thereafter, 51 g of 50% aqueous KOH solution (0.046 mol of KOH, 2.6 g of KOH) were added, a reduced pressure of 25 mbar was applied, and the mixture was heated to 100° C. and kept there for 120 min, in order to distill off the water. The mixture was purged three times with N2. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 262 g (4.5 mol) of propylene oxide were metered in at 130° C. within 2 h; pmax was 4.0 bar absolute. The mixture was stirred at 130° C. for a further 2 h. 661 g (15 mol) of ethylene oxide were metered in at 130° C. within 5 h; pmax was 6.0 bar absolute. The mixture was left to react for 1 h until the pressure was constant, cooled down to 100° C. and decompressed to 1.0 bar absolute. A vacuum of <10 mbar was applied and residual oxide was drawn off for 2 h. The vacuum was broken with N2 and the product was decanted at 80° C. under N2. 3 percent by weight of Ambosol (silicate for neutralization) were added, and the mixture was stirred at 100° C. and <10 mbar for 3 h. The vacuum was broken with N2 and the reaction mixture was pressure-filtered through a Seitz K900 filter. Analysis (mass spectrum, GPC, 1H NMR in CDCl3, 1H NMR in MeOD) confirmed the mean composition C16C18-3 PO—10 EO—H.

Alkyl ether alcohol 2: C16C18-3 PO-10 EO—H by KOH catalysis, neutralized with acetic acid A 2 L pressure autoclave with anchor stirrer was initially charged with 384 g (1.5 mol) of C16C18 alcohol and the stirrer was switched on. Thereafter, 5.2 g of 50% aqueous KOH solution (0.046 mol of KOH, 2.6 g of KOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 262 g (4.5 mol) of propylene oxide were metered in at 130° C. within 2 h; $P_{max}$ was 4.0 bar absolute. The mixture was stirred at 130° C. for a further 2 h. 661 g (15 mol) of ethylene oxide were metered in at 130° C. within 5 h; $P_{max}$ was 6.0 bar absolute. The mixture was left to react for 1 h until the pressure was constant, cooled down to 100° C. and decompressed to 1.0 bar absolute. A vacuum of <10 mbar was applied and residual oxide was drawn off for 2 h. The vacuum was broken with $N_2$, the product was cooled to 80° C. and 2.8 g of acetic acid (0.046 mol) were added. The product was then decanted at 80° C. under $N_2$. Analysis (mass spectrum, GPC, 1H NMR in $CDCl_3$, 1H NMR in MeOD) confirmed the mean composition C16C18—3 PO—10 EO—H.

Alkyl Ether Alcohol 3: C16C18-3 PO-10 EO—H by KOH Catalysis, Basic

A 2 L pressure autoclave with anchor stirrer was initially charged with 384 g (1.5 mol) of C16C18 alcohol and the stirrer was switched on. Thereafter, 5.2 g of 50% aqueous KOH solution (0.046 mol of KOH, 2.6 g of KOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 262 g (4.5 mol) of propylene oxide were metered in at 130° C. Within 2 h; $P_{max}$ was 4.0 bar absolute. The mixture was stirred at 130° C. for a further 2 h. 661 g (15 mol) of ethylene oxide were metered in at 130° C. within 5 h; $P_{max}$ was 6.0 bar absolute. The mixture was left to react for 1 h until the pressure was constant, cooled down to 100° C. and decompressed to 1.0 bar absolute. A vacuum of <10 mbar was applied and residual oxide was drawn off for 2 h. The vacuum was broken with $N_2$ and the product was decanted at 80° C. under $N_2$. Analysis (mass spectrum, GPC, 1H NMR in $CDCl_3$, 1H NMR in MeOD) confirmed the mean composition C16C18-3 PO-10 EO—H.

Alkyl Ether Alcohol 4: C16C18-3 PO-10 EO—H by NaOH Catalysis, Basic

A 2 L pressure autoclave with anchor stirrer was initially charged with 384 g (1.5 mol) of C16C18 alcohol and the stirrer was switched on. Thereafter, 5.2 g of 50% aqueous NaOH solution (0.065 mol of NaOH, 2.6 g of NaOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 262 g (4.5 mol) of propylene oxide were metered in at 130° C. within 2 h; $P_{max}$ was 5.0 bar absolute. The mixture was stirred at 130° C. for a further 2 h. 661 g (15 mol) of ethylene oxide were metered in at 130° C. within 5 h; was 6.0 bar absolute. The mixture was left to react for 1 h until the pressure was constant, cooled down to 100° C. and decompressed to 1.0 bar absolute. A vacuum of <10 mbar was applied and residual oxide was drawn off for 2 h. The vacuum was broken with $N_2$ and the product was decanted at 80° C. under $N_2$. Analysis (mass spectrum, GPC, 1H NMR in $CDCl_3$, 1H NMR in MeOD) confirmed the mean composition C16C18-3 PO-10 EO—H.

Alkyl Ether Alcohol 5: C16C18-7 PO-10 EO—H by KOH Catalysis, Desalinated

Corresponds to surfactant of the general formula (II) $R^1$—O—$(CH_2C(R^2)HO)_x$—$(CH_2C(CH_3)HO)_y$—$(CH_2CH_2O)_z$—H with $R^1=C_{16}H_{33}/C_{18}H_{37}$, x=0, y=7 and z=10.

A 2 L pressure autoclave with anchor stirrer was initially charged with 256 g (1.0 mol) of C16C18 alcohol and the stirrer was switched on. Thereafter, 2.2 g of 50% aqueous KOH solution (0.020 mol of KOH, 1.1 g of KOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 140° C. and then the pressure was set to 2.0 bar absolute. At 150 revelations per minute, 407 g (7 mol) of propylene oxide were metered in at 140° C. within 5 h; $P_{max}$ was 6.0 bar absolute. The mixture was stirred at 140° C. for a further 2 h. 441 g (10 mol) of ethylene oxide were metered in at 140° C. within 10 h; $P_{max}$ was 5.0 bar absolute. The mixture was left to react for 1 h until the pressure was constant, cooled down to 100° C. and decompressed to 1.0 bar absolute, A vacuum of <10 mbar was applied and residual oxide was drawn off for 2 h. The vacuum was broken with $N_2$ and the product was decanted at 80° C. under $N_2$. 3 percent by weight of Ambosol (silicate for neutralization) were added, and the mixture was stirred at 100° C. and <10 Mbar for 3 h. The vacuum was broken with $N_2$ and the reaction mixture was pressure-filtered through a Seitz K900 filter. Analysis (mass spectrum, GPC, 1H NMR in $CDCl_3$, 1H NMR in MeOD) confirmed the mean composition C16C18-7 PO-10 EO—H.

Alkyl Ether Alcohol 6: C16C18-7 PO-4 EO—H by KOH Catalysis, Desalinated

Corresponds to surfactant of the general formula (II) $R^1$—O—$(CH_2C(R^2)HO)_x$—$(CH_2C(CH_3)HO)_y$—$(CH_2CH_2O)_z$—H with $R^1=C_{16}H_{33}/C_{18}H_{37}$, x=0, y=7 and z=4

A 2 L pressure autoclave with anchor stirrer was initially charged with 308.7 g (1.21 mol) of C16C18 alcohol and the stirrer was switched on. Thereafter, 4.0 g of 50% aqueous KOH solution (0.046 mol of KOH, 2.0 g of KOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 487 g (8.44 mol) of propylene oxide were metered in at 130° C. within 6 h; $P_{max}$ was 6.0 bar absolute. The mixture was stirred at 130° C. for a further 2 h. 211 g (4.8 mol) of ethylene oxide were metered in at 130° C. within 4 h; $P_{max}$ was 5.0 bar absolute. The mixture was left to react for 1 h until the pressure was constant, cooled down to 100° C. and decompressed to 1.0 bar absolute. A vacuum of <10 mbar was applied and residual oxide was drawn off for 2 h. The vacuum was broken with $N_2$ and the product was decanted at 80° C. under $N_2$. 3 percent by weight of Ambosol (silicate for neutralization) were added, and the mixture was stirred at 100° C. and <10 mbar for 3 h. The vacuum was broken with $N_2$ and the reaction mixture was pressure-filtered through a Seitz K900 filter. Analysis (mass spectrum, GPC, 1H NMR in $CDCl_3$, 1H NMR in MeOD) confirmed the mean composition C16C18-7 PO-4 EO—H.

Alkyl Ether Alcohol 7; C16C18C20 Guerbet-18 EO—H by KOH Catalysis, Desalinated

Corresponds to surfactant of the general formula (II) $R^1$—O—$(CH_2C(R^2)HO)_x$—$(CH_2C(CH_3)HO)_y$—$(CH_2CH_2O)_z$—H with $R^1=C_{16}H_{33}/C_{18}H_{37}/C_{20}H_{41}$, x=0, y=0 and z=18

A 2 L pressure autoclave with anchor stirrer was initially charged with 261 g (1.01 mol) of C16C18C20 Guerbet alcohol and the stirrer was switched on. Thereafter, 4.2 g of 50% aqueous KOH solution (0.038 mol of KOH, 2.1 g of KOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 799 g (18.2 mol) of ethylene oxide were metered in at 130° C. within 14 h; $P_{max}$ was 5.0 bar absolute. The mixture was left to react for 1 h until the pressure was constant, cooled down to 100° C. and decompressed to 1.0 bar absolute. A vacuum of <10 mbar was applied and residual oxide was drawn off for 2 h. The vacuum was broken with $N_2$ and the product was decanted at 80° C. under $N_2$. 3 percent by weight of Ambosol (silicate for neutralization) were added, and the mixture was stirred at 100° C. and <10 mbar for 3 h. The vacuum was broken with $N_2$ and the reaction mixture was pressure-filtered through a Seitz K900 filter. Analysis (mass spectrum, GPC, 1H NMR in $CDCl_3$, 1H NMR in MeOD) confirmed the mean composition C16C18C20 Guerbet-18 EO—H.

Alkyl Ether Alcohol 8: C16C18C20 Guerbet-10 EO—H by KOH Catalysis, Desalinated

Corresponds to surfactant of the general formula (II) $R^1$—O—$(CH_2C(R^2)HO)_x$—$(CH_2C(CH_3)HO)_y$—$(CH_2CH_2O)_z$—H with $R^1$=$C_{16}H_{33}/C_{18}H_{37}/C_{20}H_{41}$, x=0, y=0 and z=10

A 2 L pressure autoclave with anchor stirrer was initially charged with 396 g (1.53 mol) of C16C18C20 Guerbet alcohol and the stirrer was switched on. Thereafter, 4.17 g of 50% aqueous KOH solution (0.037 mol of KOH, 2.1 g of KOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 140° C. and then the pressure was set to 2.0 bar absolute. At 150 revolutions per minute, 675 g (15.3 mol) of ethylene oxide were metered in at 140° C. within 14 h; $P_{max}$ was 5.0 bar absolute. The mixture was left to react for 1 h until the pressure was constant, cooled down to 100° C. and decompressed to 1.0 bar absolute. A vacuum of <10 mbar was applied and residual oxide was drawn off for 2 h. The vacuum was broken with $N_2$ and the product was decanted at 80° C. under $N_2$. 3 percent by weight of Ambosol (silicate for neutralization) were added, and the mixture was stirred at 100° C. and <10 mbar for 3 h. The vacuum was broken with $N_2$ and the reaction mixture was pressure-filtered through a Seitz K900 filter. Analysis (mass spectrum, GPC, 1H NMR an $CDCl_3$, 1H NMR in MeOD) confirmed the mean composition C16C18C20 Guerbet-10 EO—H.

Alkyl Ether Alcohol 9: 2PH—14 EO—H by KOH Catalysis, Desalinated

Corresponds to surfactant of the general formula (II) $R^1$—O—$(CH_2C(R^2)HO)_x$—$(CH_2C(CH_3)HO)_y$—$(CH_2CH_2O)_z$—H with $R^1$=$C_{10}H_{21}$, x=0, y=0 and z=14

A 2 L pressure autoclave with anchor stirrer was initially charged with 234 g (1.5 mol) of 2-propylheptanol and the stirrer was switched on. Thereafter, 4.6 g of 50% aqueous KOH solution (0.041 mol of KOH, 2.3 g of KOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 924 g (21 mol) of ethylene oxide were metered in at 130° C. within 16 h; $P_{max}$ was 6.0 bar absolute. The mixture was left to react fir 1 h until the pressure was constant, cooled down to 100° C. and decompressed to 1.0 bar absolute. A vacuum of <10 mbar was applied and residual oxide was drawn off for 2 h. The vacuum was broken with $N_2$ and the product was decanted at 80° C. under $N_2$. 3 percent by weight of Ambosol (silicate for neutralization) were added, and the mixture was stirred at 100° C. and <10 mbar for 3 h. The vacuum was broken with $N_2$ and the reaction mixture was pressure-filtered through a Seitz K900 filter. Analysis (mass spectrum, GPC, 1H NMR in $CDCl_3$, 1H NMR in MeOD) confirmed the mean composition 2PH-14 EO—H.

Alkyl Ether Alcohol 10: C16C18-7 PO-10 EO—H by KOH Catalysis, Basic

Corresponds to surfactant of the general formula (II) $R^1$—O—$(CH_2C(R^2)HO)_x$—$(CH_2C(CH_3)HO)_y$—$(CH_2CH_2O)_z$—H with $R^1$=$C_{16}H_{33}/C_{18}H_{37}$, x=0, y=7 and z=10

A 2 L pressure autoclave with anchor stirrer was initially charged with 304 g (1.19 mol) of C16C18 alcohol and the stirrer was switched on. Thereafter, 4.13 g of 50% aqueous KOH solution (0.037 mol of KOH, 2.07 g of KOH) were added, a reduced pressure of 25 mbar was applied, and the mixture was heated to 100° C. and kept there for 120 min, in order to distill off the water. The mixture was purged three times with $N_2$. Thereafter, the vessel was tested for pressure retention, 1.0 bar gauge (2.0 bar absolute) was set, the mixture was heated to 130° C. and then the pressure was set to 2.0 bar absolute. At 150 revolutions per minute, 482 g (8.31 mol) of propylene oxide were metered in at 130° C. within 6 h; $P_{max}$ was 6.0 bar absolute. The mixture was stirred at 130° C. for a further 2 h. 522 g (11.9 mol) of ethylene oxide were metered in at 130° C. within 10 h; $P_{max}$ was 5.0 bar absolute. The mixture was left to react for 1 h until the pressure was constant, cooled down to 100° C. and decompressed to 1.0 bar absolute. A vacuum of <10 mbar was applied and residual oxide was drawn off for 2 h. The vacuum was broken with $N_2$ and the product was decanted at 80° C. under $N_2$. Analysis (mass spectrum, GPC, 1H NMR in $CDCl_3$, 1H NMR in MeOD) confirmed the mean composition C16C18—7 PO—10 EO—H.

Preparation of the alkyl ether carboxylate (A)/alkyl ether alcohol (B) mixtures:

Abbreviations used:

EO ethyleneoxy
PO propyleneoxy
BuO 1,2-butyleneoxy

Alkyl Ether Carboxylate/Alkyl Ether Alcohol Mixture 1 a): C16C18-3PO-10EO—$CH_2CO_2$Na/C16C18-3 PO-10 EO—H by KOH Catalysis, Desalinated Corresponds to surfactant mixture of surfactant of the general formula (I) $R^1$—O—$(CH_2C(R^2)HO)_x$—$(CH_2C(CH_3)HO)_y$—$(CH_2CH_2O)_z$—$CH_2CO_2M$ and surfactant of the general formula (II) $R^1$—O—$(CH_2C(R^2)HO)_x$—$(CH_2C(CH_3)HO)_y$—$(CH_2CH_2O)_z$—H with $R^1$=$C_{16}H_{33}/C_{18}H_{37}$, x=0, y=3 and z=10, M=Na.

A 250 mL flange reactor with a three-level beam stirrer was charged with 152.3 g (0.175 mol, 1.0 eq) of C16C18-3 PO-10 EO—H (from alkyl alkoxylate 1 preparation example, KOH-catalyzed, desalinated) and 22.9 g (0.193 mol, 1.1 eq) of chloroacetic acid sodium salt, and the mixture was stirred at 60° C. wider standard pressure at 400 revolutions per minute for 15 min. Thereafter, the following procedure was conducted eight times: 0.96 g (0.0240 mol, 0.1375 eq) of NaOH microprills (diameter 0.5-1.5 mm) was introduced, a vacuum of 30 mbar was applied to remove the water of reaction, the mixture was stirred for 50 min, and then the vacuum was broken with $N_2$. A total of 7.7 g (0.193 mol, 1.1 eq) of NaOH microprills were added over a period of about 6.5 h. Over the first hour of this period, the speed of rotation was increased to about 1000 revolutions per minute. Thereafter, stirring was continued at 60° C. and 30 mbar for 4 h. The vacuum was broken with $N_2$ and the experiment was decanted out (yield >95%).

This gave a liquid which was white-yellowish and viscous at 20° C. The pH (5% in water) was 8.0. The water content was 0.9% at the end of the reaction (during the reaction the water content was: 0.8% before the second addition of NaOH, 0.9% before the third addition of NaOH, 1.3% before the fourth addition of NaOH, 1.1% before the fifth addition of NaOH, 0.7% before the sixth addition of NaOH and 0.9% before the seventh addition of NaOH). The NaCl content was determined via chloride analysis or 1H NMR with regard to the conversion rate of the chloroacetic acid sodium salt. By means of $^1$H NMR in MeOD, the molar proportion of chloroacetic acid sodium salt is determined (using the isolated signal at 3.92 to 3.94 ppm). It corresponds to about 0.01 eq of chloroacetic acid sodium salt. The proportion of NaCl is about 6.1% by weight (corresponding to ~99 mol % of conversion of the organically bound chlorine to inorganic chloride). By NMR spectroscopy ($^1$H and $^{13}$C), the presence of the desired surfactant mixture was continued and the proportion of secondary compounds was determined. Direct determination of the carboxymethylation level from the $^1$H NMR in MeOD is regrettably not unambiguously possible since the alkyl ether carboxylate signal at about 3.65-3.80 ppm overlaps with the signal for the diglycolic acid disodium salt (protons on carbon atom directly adjacent to the carboxylate group and to the oxygen atom in the ether function). The carboxymethylation level was therefore determined as follows. By means of $^1$H NMR in MeOD, the molar proportion of glycolic acid sodium salt is determined (using the isolated signal at 3.82 to 3.84 ppm: protons on carbon atom directly adjacent to the carboxylate group and to the oxygen atom in the ether function or the alcohol function). It corresponds to about 0.05 eq of glycolic acid sodium salt. As the next step, the OH number of the reaction mixture is determined. It is 15.4 mg KOH/g. The proportion that results from the OH group in the glycolic acid sodium salt has to be subtracted from this (about 2.7 mg KOH/g). This gives 12.7 mg KOH/g as the corrected OH number. If the alkyl alkoxylate were still present to an extent of 100%, the corrected OH number would be 54.8 mg KOH/g (the alkyl alkoxylate—if it had not been depleted—would have a proportion by weight of 85% in the reaction mixture). 12.7 is about 23% of 54.8. Thus, the molar proportion of C16C18-3PO-10EO—H is about 23 mol % (and the proportion of alkyl ether carboxylate about 77 mol %). The carboxymethylation level is therefore about 77%. This is additionally confirmed by a $^{13}$C NMR in MeOD. The signals therein for diglycolic acid disodium salt and alkyl ether carboxylate are separated from one another (signals for the carbon atoms of the carboxylate groups at 177-178 ppm—signals can be distinguished from one another by spiking experiments). Determination of the proportion of C16C18-3PO-10EO—H by $^1$H TAI NMR in CDCl$_3$ (TAI is a shift reagent and stands for trichloroacetyl isocyanate) is possible only to a limited degree, since the anionic alkyl ether carboxylate has poorer solubility in CDCl$_3$ than the nonionic alkyl alkoxylate.

Alkyl Ether Carboxylate/Alkyl Ether Alcohol Mixture 1 b): C16C18-3PO-10EO—CH$_2$CO$_2$Na/C16C18-3 PO-10 EO—H by KOH Catalysis, Desalinated An alternative preparation method to example 1a) is the use of a one-level toothed disk stirrer rather than a three-level beam stirrer and the use of a vacuum of about 150 mbar in combination with a nitrogen stream (rather than vacuum of 30 mbar). Otherwise, the reaction is effected analogously to the manner described in 1a). A carboxymethylation level of about 80% and a very similar spectrum of secondary components were achieved.

Alkyl Ether Carboxylate/Alkyl Ether Alcohol Mixture 2: C16C18-3PO-10EO—CH$_2$CO$_2$Na/C16C18-3 PO-10 EO—H Comprising Potassium Acetate and Water A 250 mL flange reactor with a three-level beam stirrer was charged with 174.0 g (0.20 mol, 1.0 eq) of C16C18-3 PO-10 EO—H mixed with 0.35 g of potassium acetate, 2.0 g of water and 26.2 g (0.220 mol, 1.1 eq) of chloroacetic acid sodium salt, and the mixture was stirred at 60° C. under standard pressure at 400 revolutions per minute for 15 min. Thereafter, the following procedure was conducted eight times: 1.1 g (0.0275 mol, 0.1375 eq) of NaOH microprills (diameter 0.5-1.5 mm) were introduced, a vacuum of 30 mbar was applied to remove the water of reaction, the mixture was stirred for 50 min, and then the vacuum was broken with N$_2$. A total of 8.8 g (0.220 mol, 1.1 eq) of NaOH microprills were added over a period of about 6.5 h. Over the first hour of this period, the speed of rotation was increased to about 1000 revolutions per minute. Thereafter, stirring was continued at 60° C. and 30 mbar for 4 h. The vacuum was broken with N$_2$ and the experiment was decanted out (yield >95%).

This gave a liquid which was white-yellowish and viscous at 20° C. The pH (5% in water) was 8.5. The water content was 1.2%. Analysis was effected analogously to the previous example. The molar proportion of chloroacetic acid sodium salt is about 2 mol %. The NaCl content is about 6.1% by weight. The OH number of the reaction mixture is 21.0 mg KOH/g. The molar proportion of glycolic acid sodium salt is about 5 mol %. The carboxymethylation level is 72%.

Alkyl Ether Carboxylate/Alkyl Ether Alcohol Mixture 3: C16C18-3PO-10EO—CH$_2$CO$_2$Na/C16C18-3 PO-10 EO—H by KOH Catalysis, Basic A 250 mL flange reactor with a three-level beam stirrer was charged with 112.8 g (0.13 mol, 1.0 eq) of C16C18-3 PO— 10 EO—H comprising 0.004 mol of C16C18-3 PO-10 EO—K (from Alkyl ether alcohol 3 preparation example, KOH-catalyzed, basic) and 17 g (0.143 mol, 1.1 eq) of chloroacetic acid sodium salt, and the mixture was stirred at 60° C. under standard pressure at 400 revolutions per minute for 15 min. Thereafter, the following procedure was conducted eight times: 0.70 g (0.0174 mol, 0.1338 eq) of NaOH microprills (diameter 0.5-1.5 mm) was introduced, a vacuum of 30 mbar was applied to remove the water of reaction, the mixture was stirred for 50 min, and then the vacuum was broken with N$_2$. A total of 5.56 g (0.139 mol, 1.07 eq) of NaOH microprills were added over a period of about 6.5 h. Over the first hour of this period, the speed of rotation was increased to about 1000 revolutions per minute. Thereafter, stirring was continued at 60° C. and 30 mbar for 4 h. The vacuum was broken with N$_2$ and the experiment was decanted out (yield >95%).

This gave a liquid which was white-yellowish and viscous at 20° C. The pH (5% in water) was 7. The water content was 1.0%. Analysis was effected analogously to the previous example. The molar proportion of chloroacetic acid sodium salt is about 1 mol %. The NaCl content is about 6.1% by weight. The OH number of the reaction mixture is 16.7 mg KOH/g. The molar proportion of glycolic acid sodium salt is about 4 mol %. The carboxymethylation level is 74%.

Alkyl Ether Carboxylate/Alkyl Ether Alcohol Mixture 4: C16C18-3PO-10EO—CH$_2$CO$_2$Na/C16C18-3 PO-10 EO—H by NaOH Catalysis, Basic A 250 mL flange reactor with a three-level beam stirrer was charged with 161.8 g (0.186 mol, 1.0 eq) of C16C18-3 PO-10 EO—H comprising 0.008 mol of C16C18-3 PO-10 EO—Na (from Alkyl alkoxylate 4 preparation example, NaOH-catalyzed, basic) and 24.4 g (0.205 mol, 1.1 eq) of chloroacetic acid sodium salt, and the mixture was stirred at 60° C. under standard pressure at 400 revolutions per minute for 15 min. Thereafter, the following procedure was conducted eight times: 0.99 g (0.0246 mol, 0.1324 eq) of NaOH microprills (diameter 0.5-1.5 mm) was introduced, a vacuum of 30 mbar was applied to remove the water of reaction, the mixture was stirred for 50 min, and then the vacuum was broken with N$_2$. A total of 7.88 g (0.197 mol, 1.06 eq) of NaOH microprills were added over a period of about 6.5 h. Over the first hour of this period, the speed of rotation was increased to about 1000 revolutions per minute.

Thereafter, stirring was continued at 60° C. and 30 mbar for 4 h. The vacuum was broken with $N_2$ and the experiment was decanted out (yield >95%).

This gave a liquid which was white-yellowish and viscous at 20° C. The pH (5% in water) was 7. The war content was 0.9%. Analysis was effected analogously to the previous example. The molar proportion of chloroacetic acid sodium salt is about 1 mol %. The NaCl content is about 6.1% by weight. The OH number of the reaction mixture is 15.4 mg KOH/g. The molar proportion of glycolic acid sodium salt is about 3 mol %. The carboxymethylation level is 75%.

Alkyl Ether Carboxylate/Alkyl Ether Alcohol Mixture 5: C16C18-7PO-10EO—$CH_2CO_2Na$/C16C18-7 PO-10 EO—H by KOH Catalysis, Desalinated Corresponds to surfactant mixture of surfactant of the general formula (I) $R^1$—O—$(CH_2C(R^2)HO)_x$—$(CH_2C(CH_3)HO)_y$—$(CH_2CH_2O)_z$—$CH_2CO_2M$ and surfactant of the general formula (II) $R^1$—O—$(CH_2C(R^2)HO)_x$—$(CH_2C(CH_3)HO)_y$—$(CH_2CH_2O)_z$—H with $R^1$=$C_{16}H_{33}$/$C_{18}H_{37}$, x=0, y=7 and z=10, M=Na.

A 250 mL flange reactor with a three-level beam stirrer was charged with 143.3 g (0.130 mol, 1.0 eq) of C16C18-7 PO-10 EO—H (from Alkyl alkoxylate 5 preparation example, KOH-catalyzed, desalinated) and 17.0 g (0.143 mol, 1.1 eq) of chloroacetic acid sodium salt, and the mixture was stirred at 45° C. under standard pressure at 400 revolutions per minute for 15 min. Thereafter, the following procedure was conducted eight times: 0.72 g (0.0179 mol, 0.1375 eq) of NaOH microprills (diameter 0.5-1.5 mm) was introduced, a vacuum of 30 mbar was applied to remove the water of reaction, the mixture was stirred for 50 min, and then the vacuum was broken with $N_2$. A total of 5.72 g (0.143 mol, 1.1 eq) of NaOH microprills were added over a period of about 6.5 h. Over the first hour of this period, the speed of rotation was increased to about 1000 revolutions per minute. Thereafter, stirring was continued at 45° C. and 30 mbar for 4 h. The vacuum was broken with $N_2$ and the experiment was decanted out (yield >95%).

This gave a liquid which was white-yellowish and viscous at 20° C. The pH (5% in water) was 8.5. The water content was 1.5%. Analysis was effected analogously to the previous example (taking account of the higher molecular weight, at 0% conversion, there would be an OH number of 44.6 mg KOH/g for the reaction mixture). The molar proportion of chloroacetic acid sodium salt is about 5 mol %. The NaCl content is about 4.8% by weight. The OH number of the reaction mixture is 16.2 mg KOH/g. The molar proportion of glycolic acid sodium salt is about 5 mol %. The carboxymethylation level is 70%.

Alkyl Ether Carboxylate/Alkyl Ether Alcohol mixture 6: C16C18-7PO-4EO—$CH_2CO_2Na$/C16C18-7 PO-4 EO—H by KOH Catalysis, Desalinated Corresponds to surfactant mixture of surfactant of the general formula (I) $R^1$—O—$(CH_2C(R^2)HO)_x$—$(CH_2C(CH_3)HO)_y$—$(CH_2CH_2O)_z$—$CH_2CO_2M$ and surfactant of the general formula (II) $R^1$—O—$(CH_2C(R^2)HO)_x$—$(CH_2C(CH_3)HO)_y$—$(CH_2CH_2O)_z$—H with $R_1$=$C_{16}H_{33}$/$C_{18}H_{37}$, x=0, y=7 and z=4, M=Na.

A 250 mL flange reactor with a three-level beam stirrer was charged with 127.5 g (0.15 mol, 1.0 eq) of C16C18-7 PO—H (from Alkyl alkoxylate 6 preparation example, KOH-catalyzed, desalinated) and 19.6 g (0.165 mol, 1.1 eq) of chloroacetic acid sodium salt, and the mixture was stirred at 60° C. under standard pressure at 400 revolutions per minute for 15 min. Thereafter, the following procedure was conducted eight times: 0.83 g (0.0206 mol, 0.1375 eq) of NaOH microprills (diameter 0.5-1.5 mm) was introduced, a vacuum of 30 mbar was applied to remove the water of reaction, the mixture was stirred for 50 mm, and then the vacuum was broken with $N_2$. A total of 6.6 g (0.165 mol, 1.1 eq) of NaOH microprills were added over a period of about 6.5 h. Over the first hour of this period, the speed of rotation was increased to about 1000 revolutions per minute. Thereafter, stirring was continued at 60° C. and 30 mbar for 4 h. The vacuum was broken with $N_2$ and the experiment was decanted out (yield >95%).

This gave a liquid which was white-yellowish and viscous at 20° C. The pH (5% in water) was 8.5. The water content was 0.9%. Analysis was effected analogously to the previous example (taking account of the higher molecular weight, at 0% conversion, there would be an OH number of 56.5 mg KOH/g for the reaction mixture). The molar proportion of chloroacetic acid sodium salt is about 1 mol %. The NaCl content is about 6.4% by weight. The OH number of the reaction mixture is 23.2 mg KOH/g. The molar proportion of glycolic acid sodium salt is about 2 mol %. The carboxymethylation level is 61%.

Alkyl Ether Carboxylate/Alkyl Ether Alcohol Mixture 7: C16C18C20-Guerbet-18EO—$CH_2CO_2Na$/C16C18C20-Guerbet-18 EO—H by KOH Catalysis, Basic Corresponds to surfactant mixture of surfactant of the general formula (I) $R^1$—O—$(CH_2C(R^2)HO)_x$—$(CH_2C(CH_3)HO)_y$—$(CH_2CH_2O)_z$—$CH_2CO_2M$ and surfactant of the general formula (II) $R^1$—O—$(CH_2C(R^2)HO)_x$—$(CH_2C(CH_3)HO)_y$—$(CH_2CH_2O)_z$—H with $R^1$=$C_{16}H_{33}$/$C_{18}H_{37}$/$C_{20}H_{41}$, x=0, y=0 and z=18, M=Na.

A 250 mL flange reactor with a three-level beam stirrer was charged with 159.3 g (0.150 mol, 1.0 eq) of C16C18C20-Guerbet-18 EO—H comprising 0.006 mol of C16C18C20-Guerbet-18 EO—K (analogous to Alkyl alkoxylate 7 preparation example, except that no desalination was undertaken and the alkoxylate remained basic) and 19.6 g (0.165 mol, 1.1 eq) of chloroacetic acid sodium salt, and the mixture was stirred at 45° C. Under standard pressure at 400 revolutions per minute for 15 min. Thereafter, the following procedure was conducted eight times: 0.80 g (0.0199 mol, 0.1325 eq) of NaOH microprills (diameter 0.5-1.5 mm) was introduced, a vacuum of 30 mbar was applied to remove the water of reaction, the mixture was stirred for 50 min, and then the vacuum was broken with $N_2$. A total of 6.36 g (0.159 mol, 1.06 eq) of NaOH microprills were added over a period of about 6.5 h. Over the first hour of this period, the speed of rotation was increased to about 1000 revolutions per minute. Thereafter, stirring was continued at 45° C. and 30 mbar for 4 h. The vacuum was broken with $N_2$ and the experiment was decanted out (yield >95%).

This gave a solid which was white-yellowish at 20° C. The pH (5% in water) was 7. The water content was 1.4%. Analysis was effected analogously to the previous example (taking account of the higher molecular weight, at 0% conversion, there would be an OH number of 46.2 mg KOH/g for the reaction mixture). The molar proportion of chloroacetic acid sodium salt is about 5 mol %. The NaCl content is about 5.1% by weight. The OH number of the reaction mixture is 10.2 mg KOH/g. The molar proportion of glycolic acid sodium salt is about 8 mol %. The carboxymethylation level is 87%.

Alkyl Ether Carboxylate/Alkyl Ether Alcohol Mixture 8: C16C18C20-Guerbet-10EO—$CH_2CO_2Na$/C16C18C20-Guerbet-10 EO—H by KOH Catalysis, Basic Corresponds to surfactant mixture of surfactant of the general formula (I) $R^1$—O—$(CH_2C(R^2)HO)_x$—$(CH_2C(CH_3)HO)_y$—$(CH_2CH_2O)_z$—$CH_2CO_2M$ and surfactant of the general formula (II) $R^1$—O—$(CH_2C(R^2)HO)_x$—$(CH_2C(CH_3)HO)_y$—$(CH_2CH_2O)_z$—H with $R^1$=$C_{16}H_{33}$/$C_{18}H_{37}$/$C_{20}H_{41}$, x=0, y=0 and z=10, M=Na.

A 250 mL flange reactor with a three-level beam stirrer was charged with 142.0 g (0.200 mol, 1.0 eq) of C16C18C20-Guerbet-10 EO—H (from Alkyl alkoxylate 8 preparation example) and 26.2 g (0.22 mol 1.1 eq) of chloroacetic acid sodium salt, and the mixture was stirred at 45° C. under standard pressure at 400 revolutions per minute for 15 min. Thereafter, the following procedure was conducted eight times: 1.1 g (0.0275 mol, 0.1375 eq) of NaOH microprills (diameter 0.5-1.5 mm) were introduced, a vacuum of 30 mbar was applied to remove the water of reaction, the mixture was stirred for 50 min, and then the vacuum was broken with $N_2$. A total of 8.8 g (0.22 mol, 1.1 eq) of NaOH microprills were added over a period of about 6.5 h. Over the first hour of this period, the speed of rotation was increased to about 1000 revolutions per minute. Thereafter, stirring was continued at 45° C. and 30 mbar for 4 h. The vacuum was broken with $N_2$ and the experiment was decanted out (yield >95%).

This gave a solid which was white-yellowish at 20° C. The pH (5% in water) was 7. The water content was 1.5%. Analysis was effected analogously to the previous example (taking account of the higher molecular weight, at 0% conversion, there would be an OH number of 64.9 mg KOH/g for the read mixture). The molar proportion of chloroacetic acid sodium salt is about 2 mol %. The NaCl content is about 7.3% by weight. The OH number of the reaction mixture is 10.8 mg KOH/g. The molar proportion of glycolic acid sodium salt is about 2 mol %. The carboxymethylation level is 85%.

Alkyl Ether Carboxylate/Alkyl Ether Alcohol Mixture 9: 2PH-14EO—$CH_2CO_2Na$/2PH-14 EO—H by KOH Catalysis, Basic Corresponds to surfactant mixture of surfactant of the general formula (I) $R^1$—O—$(CH_2C(R^2)HO)_x$—$(CH_2C(CH_3)HO)_y$—$(CH_2CH_2O)_z$—$CH_2CO_2M$ and surfactant of the general formula (II) $R^1$—O—$(CH_2C(R^2)HO)_x$—$(CH_2C(CH_3)HO)_y$—$(CH_2CH_2O)_z$—H with $R^1$=$C_{10}H_{21}$, x=0, y=0 and z=14, M=Na.

A 250 mL flange reactor with a three-level beam stirrer was charged with 160.9 g (0.208 mol, 1.0 eq) of 2PH-14 EO—H comprising 0.006 mol of 2PH-14 EO—K (analogous to Alkyl alkoxylate 9 preparation example, except that no desalination was undertaken and the alkoxylate remained basic) and 27.2 g (0.229 mol, 1.1 eq) of chloroacetic acid sodium salt, and the mixture was stirred at 60° C. under standard pressure at 400 revolutions per minute for 15 min. Thereafter, the following procedure was conducted eight times: 1.12 g (0.0279 mol, 0.1340 eq) of NaOH microprills (diameter 0.5-1.5 mm) were introduced, a vacuum of 30 mbar was applied to remove the water of reaction, the mixture was stirred for 50 min, and then the vacuum was broken with $N_2$. A total of 8.92 g (0.223 mol, 1.07 eq) of NaOH microprills were added over a period of about 6.5 h. Over the first hour of this period, the speed of rotation was increased to about 1000 revolutions per minute. Thereafter, stirring was continued at 60° C. and 30 mbar for 4 h. The vacuum was broken with $N_2$ and the experiment was decanted out (yield >95%).

This gave a liquid which was white-yellowish and viscous at 20° C. The pH (5% in water) was 7. The water content was 1.1%. Analysis was effected analogously to the previous example (taking account of the lower molecular weight, at 0% conversion, there would be an OH number of 60.5 mg KOH/g for the reaction mixture). The molar proportion of chloroacetic acid sodium salt is about 1 mol %. The NaCl content is about 6.8% by weight. The OH number of the reaction mixture is 19.2 mg KOH/g. The molar proportion of glycolic acid sodium salt is about 12 mol %. The carboxymethylation level is 79%.

Comparative Alkyl Ether Carboxylate/Alkyl Ether Alcohol Mixture C10 (noninventive, too Low a Molar Ratio of (A) to (B)):C16C18-3PO-10EO—$CH_2CO_2Na$/C16C18-3 PO-10 EO—H Comprising Potassium Acetate in a Ratio of 30 mol %:70 mol %

A 250 mL flange reactor with a three-level beam stirrer was charged with 130.2 g (0.15 mol, 1.0 eq) of C16C18-3 PO-10 EO—H mixed with 0.26 g of potassium acetate and 19.6 g (0.165 mol, 1.1 eq) of chloroacetic acid sodium salt, and the mixture was stirred at 60° C. under standard pressure at 400 revolutions per minute for 15 min. Thereafter, the following procedure was conducted eight times: 0.83 g (0.0206 mol, 0.1375 eq) of NaOH microprills (diameter 0.5-1.5 mm) was introduced, a vacuum of 30 mbar was applied to remove the water of reaction, the mixture was stirred for 50 min, and then the vacuum was broken with $N_2$. A total of 6.6 g (0.165 mol, 1.1 eq) of NaOH microprills were added over a period of about 6.5 h. Over the first hour of this period, the speed of rotation was increased to about 1000 revolutions per minute. Thereafter, stirring was continued at 60° C. and 30 mbar for 4 h. The vacuum was broken with $N_2$ and the experiment was decanted out (yield >95%).

This gave a liquid which was brownish and viscous at 20° C. The pH (5% in water) was 11. The water content was 0.9%. Analysis was effected analogously to the previous example. The molar proportion of chloroacetic acid sodium salt is about 38 mol %. The NaCl content is about 4.4% by weight. The OH number of the reaction mixture is 52.6 mg KOH/g. The molar proportion of glycolic acid sodium salt is about 2 mol %. The carboxymethylation level is 30%.

Comparative alkyl ether carboxylate/alkyl ether alcohol mixture C11 (noninventive, too high a molar ratio of (A) to (B)):C16C18-3PO-10EO—$CH_2CO_2Na$:C16C18-3 PO-10 EO—H in a ratio of 95 mol %:5 mol %

A 250 mL flange reactor with a three-level beam stirrer was charged with 173.6 g (0.20 mol, 1.0 eq) of C16C18-3 PO-10 EO—H (from Alkyl alkoxylate 1 preparation example, KOH-catalyzed, desalinated) and 47.5 g (0.40 mol, 2.0 eq) of chloroacetic acid sodium salt, and the mixture was stirred at 50° C. under standard pressure at 400 revolutions per minute for 15 min. Thereafter, the following procedure was conducted eight times: 2 g (0.05 mol, 0.25 eq) of NaOH microprills (diameter 0.5-1.5 mm) were introduced, a vacuum of 30 mbar was applied to remove the water of reaction, the mixture was stirred for 50 min, and then the vacuum was broken with $N_2$. A total of 16 g (0.40 mol, 2 eq) of NaOH microprills were added over a period of about 6.5 h. Over the first hour of this period, the speed of rotation was increased to about 1000 revolutions per minute. Thereafter, stirring was continued at 50° C. and 30 mbar for 10 h. The vacuum was broken with $N_2$ and the entire experiment was transferred into a 1000 ml round-neck flask.

At 70° C., 350 mL of water and 150 g of 1-pentanol were added while stirring. The pH was adjusted from pH=12 to pH=2 by means of 41.3 g of 32% aqueous HCl solution. The mixture was heated to 90° C. and stirred for another 1 h. Subsequently, the mixture was transferred immediately into a separating funnel and the hot phases were separated from one another. The aqueous phase comprising NaCl and other by-products was discarded. The organic phase (comprising alkyl ether carboxylic acid and alkyl alkoxylate) was removed and the 1-pentanol was removed at 100° C. and <10 mbar. In a 500 mL round-neck flask, the alkyl ether carboxylic acid/alkyl ether alcohol mixture was admixed at 75° C. with 50% aqueous NaOH solution while stirring, so as to result in a pH of pH=7.

According to $^1$H NMR in MeOD and $^1$H TAI NMR in CDCl$_3$, the carboxymethylation level is about 89%, and so 11 mol % of alkyl alkoxylate is present. This mixture was subjected to a further carboxymethylation.

In a 250 mL flange reactor with three-level beam stirrer, 75 g (comprising 0.1 mol of alkyl alkoxylate, 1.0 eq) of the alkyl ether carboxylate/alkyl ether alcohol mixture (comprising 11 mol % of alkyl ether alcohol) were stirred at 50° C. and 30 mbar for 30 min. After the vacuum had been broken with nitrogen, 2.33 g (0.02 mol, 2.0 eq) of chloroacetic acid sodium salt were added and the mixture was stirred at 50° C. under standard pressure at 400 revolutions per minute for 1.5 min. Thereafter, the following procedure was conducted eight times: 0.1 g (0.0025 mol, 0.25 eq) of NaOH microprills (diameter 0.5-1.5 mm) was introduced, a vacuum of 30 mbar was applied to remove the water of reaction, the mixture stirred for 50 min, and then the vacuum was broken with N$_2$. A total of 0.8 g (0.02 mol, 2 eq) of NaOH microprills was added over a period of about 6.5 h. Over the first hour of this period, the speed of rotation was increased to about 1000 revolutions per minute. Thereafter, stirring was continued at 50° C. and 30 mbar for 10 h. The vacuum was broken with N$_2$ and the entire experiment was transferred into a 500 ml round-neck flask.

At 60° C., 110 g of water and 110 g of 1-pentanol were added while stirring. The pH was adjusted from pH=11 to pH=3 by means of 32% aqueous HCl solution. The mixture was heated to 90° C. and stirred for another 1 h. Subsequently, the mixture was transferred immediately into a separating funnel and the hot phases were separated from one another. The aqueous phase comprising NaCl and other by-products was discarded. The organic phase (comprising alkyl ether carboxylic acid and alkyl ether alcohol) was removed and the 1-pentanol was removed at 100° C. and <10 mbar. In a 250 round-neck flask, the alkyl ether carboxylic acid/alkyl ether alcohol mixture was admixed at 60° C. with 50% aqueous NaOH solution while stirring, so as to result in a pH of pH=7.

According to $^1$H NMR in MeOD and $^1$H TAI NMR in CDCl$_3$, the carboxymethylation level was about 95%.

Alkyl Ether Carboxylate/Alkyl Ether Alcohol Mixture 12: C16C18-7PO-10EO—CH$_2$CO$_2$Na/C16C18-7 PO-10 EO—H by KOH Catalysis, Basic Corresponds to surfactant mixture of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$=C$_{16}$H$_{33}$/C$_{18}$H$_{37}$, x=0, y=7 and z=10, M=Na.

A 250 mL flange reactor with a three-level beam stirrer was charged with 165.3 g (0.150 mol, 1.0 eq) of C16C18-7 PO-10 EO—H comprising 0.005 mol of C16C18-7 PO-10 EO—K (from Alkyl alkoxylate 10 preparation example, KOH-catalyzed, basic) and 19.6 g (0.165 mol, 1.1 eq) of chloroacetic acid sodium salt (98% purity), and the mixture was stirred at 45° C. under standard pressure at 400 revolutions per minute for 15 min. Thereafter, the following procedure was conducted eight times: 0.83 g (0.0206 mol, 0.1375 eq) of NaOH microprills (diameter 0.5-1.5 mm) was introduced, a vacuum of 30 mbar was applied to remove the water of reaction, the mixture was stirred for 50 min, and then the vacuum was broken with N$_2$. A total of 6.6 g (0.165 mol, 1.1 eq) of NaOH microprills were added over a period of about 6.5 h. Over the first hour of this period, the speed of rotation was increased to about 1000 revolutions per minute. Thereafter, stirring was continued at 45° C. and 30 mbar for 4 h. The vacuum was broken with N$_2$ and the experiment was decanted out (yield >95%).

This gave a liquid which was white-yellowish and viscous at 20° C. The pH (5% in water) was 7.5. The water content was 1.3%. Analysis was effected analogously to the previous example (taking account of the higher molecular weight, at 0% conversion, there would be an OH number of 44.6 mg KOH/g for the reaction mixture). The molar proportion of chloroacetic acid sodium salt is about 2 mol %. The NaCl content is about 4.8% by weight. The OH number of the reaction mixture is 10.4 mg KOH/g. The molar proportion of glycolic acid sodium salt is about 5 mol %. The carboxymethylation level is 81%.

Alkyl ether carboxylate/alkyl ether alcohol mixture 13: C16C18-7PO-10EO—CH$_2$CO$_2$Na/C16C18-7 PO-10 EO—H by KOH Catalysis, Basic Corresponds to surfactant mixture of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$=C$_{16}$H$_{33}$/C$_{18}$H$_{37}$, x=0, y=7 and z=10, M=Na.

A 250 mL flange reactor with a three-level beam stirrer was charged with 165.3 g (0.150 mol, 1.0 eq) of C16C18-7 PO-10 EO—H comprising 0.005 mol of C16C18-7 PO-10 EO—K (from Alkyl alkoxylate 10 preparation example, KOH-catalyzed, basic) and 19.6 g (0.165 mol, 1.1 eq) of chloroacetic acid sodium salt (98% purity), and the mixture was stirred at 45° C. under standard pressure at 400 revolutions per minute for 15 min. Thereafter, the following procedure was conducted eight times: 0.83 g (0.0206 mol, 0.1375 eq) of NaOH microprills (diameter 0.5-1.5 mm) was introduced, a gentle N2 stream and vacuum of ~100 mbar was applied to remove the water of reaction, the mixture was stirred for 50 min, and then the vacuum was broken with N$_2$. A total of 6.6 g (0.165 mol, 1.1 eq) of NaOH microprills were added over a period of about 6.5 h. Over the first hour of this period, the speed of rotation was increased to about 1000 revolutions per minute. Thereafter, stirring was continued at 45° C. and at ~100 mbar with a gentle N2 stream for 3 h. The vacuum was broken with N$_2$ and the experiment was decanted out (yield >95%).

This gave a liquid which was white-yellowish and viscous at 20° C. The pH (5% in water) was 11.2. The water content was 1.3%. Analysis was effected analogously to the previous example (taking account of the higher molecular weight, at 0% conversion, there would be an OH number of 44.6 mg KOH/g for the reaction mixture). The molar proportion of chloroacetic acid sodium salt is about 3 mol %. The NaCl content is about 4.8% by weight. The OH number of the reaction mixture is 12.4 mg KOH/g. The molar proportion of glycolic acid sodium salt is about 2 mol %. The carboxymethylation level is 73%.

For the further use tests, the pH was adjusted to a range of 6-8 by addition of a little aqueous hydrochloric acid.

Alkyl Ether Carboxylate/Alkyl Ether Alcohol Mixture 14: C16C18-7PO-10EO—CH$_2$CO$_2$Na/C6C18-7 PO-10 EO—H by KOH Catalysis, Basic Corresponds to surfactant mixture of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and surfactant of the general formula (II) $R^1$—O—$(CH_2C(R^2)HO)_x$—$(CH_2C(CH_3)HO)_y$—$(CH_2CH_2O)_z$—H with $R^1=C_{16}H_{33}/C_{18}H_{37}$, x=0, y=7 and z=10, M=Na.

A 250 mL flange reactor with a three-level beam stirrer was charged with 165.3 g (0.150 mol, 1.0 eq) of C16C18-7 PO-10 EO—H comprising 0.005 mol of C16C18-7 PO-10 EO—K (from Alkyl alkoxylate 10 preparation example, KOH-catalyzed, basic) and 24.1 g (0.203 mol, 1.35 eq) of chloroacetic acid sodium salt (98% purity), and the mixture was stirred at 45° C. under standard pressure at 400 revolutions per minute for 15 min. Thereafter, the following procedure was conducted eight times: 1.02 g (0.0253 mol, 0.1688 eq) of NaOH microprills (diameter 0.5-1.5 mm) were introduced, a vacuum of 30 mbar was applied to remove the water of reaction, the mixture was stirred for 50 min, and then the vacuum was broken with $N_2$. A total of 8.1 g (0.203 mol, 1.35 eq) of NaOH microprills were added over a period of about 6.5 h. Over the first hour of this period, the speed of rotation was increased to about 1000 revolutions per minute. Thereafter, stirring was continued at 45° C. and at 30 mbar for 3 h. The vacuum was broken with $N_2$ and the experiment was decanted out (yield >95%).

This gave a liquid which was white-yellowish and viscous at 20° C. The pH (5% in water) was 7.5. The water content was 1.5%. Analysis was effected analogously to the previous example (taking account of the higher molecular weight, at 0% conversion, there would be an OH number of 43.4 mg KOH/g for the reaction mixture). The molar proportion of chloroacetic acid sodium salt is about 2 mol %. The NaCl content is about 6.0% by weight. The OH number of the reaction mixture is 8.0 mg KOH/g. The molar proportion of glycolic acid sodium salt is about 3 mol %. The carboxymethylation level is 85%.

Alkyl Ether Carboxylate/Alkyl Ether Alcohol Mixture 15: C16C18-7PO-10EO—$CH_2CO_2Na$/C16C18-7 PO-10 EO—H by KOH Catalysis, Basic Corresponds to surfactant mixture of surfactant of the general formula (I) $R^1$—O—$(CH_2C(R^2)HO)_x$—$(CH_2C(CH_3)HO)_y$—$(CH_2CH_2O)_z$—$CH_2CO_2M$ and surfactant of the general formula (II) $R^1$—O—$(CH_2C(R^2)HO)_x$—$(CH_2C(CH_3)HO)_y$—$(CH_2CH_2O)_z$—H with $R^1=C_{16}H_{33}/C_{18}H_{37}$, x=0, y=7 and z=10, M=Na.

A 250 mL flange reactor with a three-level beam stirrer was charged with 165.3 g (0.150 mol, 1.0 eq) of C16C18-7 PO-10 EO—H comprising 0.005 mol of C16C18-7 PO-10EO—K (from Alkyl alkoxylate 10 preparation example, KOH-catalyzed, basic) and 12 g (0.150 mol, 1.0 eq) of aqueous 50% NaOH, and the mixture was stirred under standard pressure at 400 revolutions per minute. The mixture was heated to 80° C. and the water of reaction was removed at 30 mbar and 1.5 L of $N_2$/h for 8 h. Over the first hour of this period, the speed of rotation was increased to about 1000 revolutions per minute. The water content was 0.35%.

Then 19.6 g (0.165 mol 1.1 eq) of chloroacetic acid sodium salt (98% purity) were added in portions at 80° C., 30 mbar and 1.5 L of $N_2$/h within 7 h. Thereafter, stirring, was continued at 80° C. and at 30 mbar and 1.5 L of $N_2$/h for 4 h. The vacuum was broken with $N_2$ and the experiment was decanted out (yield >95%).

This gave a liquid which was white-yellowish and viscous at 20° C. The pH (5% in water) was 9.6. The water content was 0.2%. Analysis was effected analogously to the previous example (taking account of the higher molecular weight, at 0% conversion, there would be an OH number of 44.6 mg KOH/g for the reaction mixture). The molar proportion of chloroacetic acid sodium salt is about 1 mol %. The NaCl content is about 4.8% by weight. The OH number of the reaction mixture is 13.3 mg KOH/g. The molar proportion of glycolic acid sodium salt is about 12 mol %. The carboxymethylation level is 83%.

If required, after dilution with butyl diethylene glycol and water, it was possible to adjust the pH to pH=7.75 with the aid of aqueous hydrochloric acid.

Commentary on the preparation of the alkyl ether carboxylate (A)/alkyl ether alcohol (B) mixtures:

As can be seen in the above examples of mixtures 1 to 15 (excluding C10 and C11) from the respective carboxymethylation level, given efficient use of carboxymethylation reagent (e.g. <1.3 eq of $ClCH_2CO_2Na$; otherwise, a large amount of secondary components which are not beneficial for the later use are produced), it is more difficult to achieve carboxymethylation levels of >84% with increasing number of propyleneoxy units present in the nonionic surfactant (B) of the general formula (II), given the same ethoxylation level: for example carboxymethylation level 85% in mixture 8 (based on C16C18C20-Guerbet-10EO) compared to carboxymethylation level 75% in mixture 4 (based on C16C18-3PO-10EO) compared to carboxymethylation level 70% in mixture 5 (based on C16C18-7PO-10EO). This was unexpected.

Very high carboxymethylation levels of 95%, for example, were possible only via a reaction conducted twice (which is thus costly and inconvenient) (see comparative mixture C11). In addition, it was necessary to use very high excesses of chloroacetic acid sodium salt (e.g. 2.0 eq). The surfactant here was based again on C16C18-3PO-10EO.

It was found that, surprisingly, the presence of neutralized alkoxylation catalyst, for example KOAc, disrupts the carboxymethylation (see comparative mixture C10). In spite of otherwise similar reaction conditions, the carboxymethylation level was only 30% (C10), whereas it was 77% in mixture 1a) (each surfactant based on C16C18-3PO-10EO).

An unexpected approach to a solution in the presence of KOAc (which can be removed only with difficulty) is demonstrated by mixture 2. In that case, a little water was added at the start of the carboxymethylation, and a better carboxymethylation level of 72% was achieved again as a result.

A much simpler and novel approach (because it avoids the neutralization step or a removal of salts at the end of each alkoxylation) is the use of basic alkoxylate in the carboxymethylation. Mixtures 3 and 4 show carboxymethylation levels of 74% and 75% respectively. The surfactant here was based again on C16C18-3PO-10EO. The amount of base introduced via the alkoxylate was included in the calculation and the amount of NaOH microprills was reduced correspondingly. When desalinated material was used, the carboxymethylation level was 77% (mixture 1a)).

Mixture 1b) shows the surprisingly positive influence of a toothed disk stirrer, in this way, it was possible to increase the carboxymethylation level from 77% to about 80% compared to mixture 1a). As is surprisingly observed for alkyl ether carboxylate/alkyl ether alcohol mixture 12 or 13 compared to alkyl ether carboxylate/alkyl ether alcohol mixture 5, a small excess of base (sum total of basic alkoxylate and NaOH microprills) compared to the chloroacetic acid sodium salt is advantageous, since a higher value for the carboxymethylation level at 81% (mixture 12) or 73% (mixture 13) can be achieved than for mixture 5 (carboxymethylation level 70%). The differences between mixtures 12 and 13 relating to the carboxymethylation level can be explained by the smaller reduction in pressure during the reaction. However, in an industrial scale process, very low pressures of <20 mbar can be achieved only with a very high level of cost and inconvenience (for example with a higher-performance and hence more energy-intensive or costly pump). Therefore, the carboxymethylation level of 73% compared to 70% constitutes an improvement because it is additionally easier to achieve in an industrial scale process. An increase in the carboxymethylation level to 85% by increasing the eq of chloroacetic acid sodium salt and NaOH is shown by mixture 14. Mixture 15 shows an alternative method for producing the desired surfactant mixture, wherein the water of reaction that forms is depleted before chloroacetic acid sodium salt is added in order to reduce the hydrolysis of the carboxymethylation reagent.

In tests which follow (e.g. table 1), a further advantage of the method is additionally demonstrated. No costly and inconvenient removal of NaCl from the above mixtures is required. Therefore, there is no need for the additional steps in the literature such as acidification, phase separation and re-neutralization of the alkyl ether carboxylic acid.

Testing of the alkyl ether carboxylate (A)/alkyl ether alcohol (B) mixtures:

Test methods:

Determination of Stability

The stability of the concentrates of the alkyl ether carboxylate (A)/alkyl ether alcohol (B) mixtures was determined by visual assessment after storage at appropriate temperatures for 2 weeks. The concentrates comprised water and butyl diethylene glycol, and also the alkyl ether carboxylate (A)/alkyl ether alcohol (B) mixtures described in the preparation examples (if required, the pH was adjusted to a range from 6.5 to 8 by addition of aqueous hydrochloric acid). Notice was taken as to whether the concentrates remain homogeneous or whether significant phase separations which prevent homogeneous sampling arise. In addition, the concentrates (where possible) were frozen at −18° C. and thawed again at 20° C., and an observation was made as to whether an irreversible phase separation arises.

Determination of Viscosity

The dynamic viscosities of the concentrates of the alkyl ether carboxylate (A)/alkyl ether alcohol (B) mixtures were determined with an Anton Parr RheolabQC viscometer. The concentrates comprised water and butyl diethylene glycol (BDG), and also the ether carboxylate (A)/alkyl ether alcohol (B) mixtures described in the preparation examples. The viscosities were conducted at shear rates of 10, 100, 250 and (optionally) 1000 $s^{-1}$ and temperatures of (optionally 5) 20 and 50° C.

Determination of Solubility

The surfactants in the concentration to be examined in each case in saline water with the particular salt composition were stirred at 20-30° C. for 30 min (alternatively, the surfactant was dissolved in water, the pH was adjusted if required to a range from 6.5 to 8 by addition of aqueous hydrochloric acid, and appropriate amounts of the particular salt were dissolved therein at 20° C.). Thereafter, the mixture was heated stepwise until turbidity or a phase separation set in. This was followed by cautious cooling, and the point at which the solution became clear or scattering became slight again was noted. This was recorded as the cloud point. At particular fixed temperatures, the appearance of the surfactant solution in saline water was noted. Clear solutions or solutions which have slight scatter and become somewhat lighter in color again through gentle shear (but do not foam with time) are regarded as acceptable. Said slightly scattering surfactant solutions were filtered through a filter having pore size 2 μm. No removal at all was found.

Determination of Interfacial Tension

Interfacial tensions of crude oil with respect to saline water were determined in the presence of the surfactant solution at a temperature by the spinning drop method on an SVT20 from DataPhysics. For this purpose, an oil droplet was injected into a capillary filled with saline surfactant solution at temperature and the expansion of the droplet at approximately 4500 revolutions per minute was observed and the evolution of the interfacial tension with time was noted. The interfacial tension IFT (or $s_{11}$) is calculated—as described by Hans-Dieter Dörfler in "Grenzflächen and kolloid-disperse Systeme" [Interfaces and Colloidally Disperse Systems], Springer Verlag Berlin Heidelberg 2002—by the following formula from the cylinder diameter $d_z$, the speed of rotation w, and the density differential:

$$(d_1-d_2):s_{11}=0.25 \cdot d_z^3 \cdot w2 \cdot (d_1-d_2).$$

The API gravity (American Petroleum Institute gravity) is a conventional unit of density commonly used in the USA for crude oils. It is used globally for characterization and as a quality standard for crude oil. The API gravity is calculated from the relative density $P_{rel}$ of the crude oil at 60° F. (15.56° C.), based on water, using API gravity=(141.5/$P_{rel}$)−131.5.

Test Results:

The following test results were achieved:

The test results for stability and viscosity of the concentrates are shown in table 1.

TABLE 1

Concentrates of alkyl ether carboxylate/alkyl ether alcohol surfactant mixture

| Example | Surfactant concentrate | Viscosity at 20° C. and different shear rates | Viscosity at 50° C. and different shear rates | Appearance after storage at 20° C. for two weeks | Appearance after freezing and later thawing at 20° C. |
|---|---|---|---|---|---|
| 1 | 40% by weight of alkyl ether carboxylate/alkyl ether alcohol mixture 1 b) [comprising surfactant mixture of C16C18-3PO-10EO-CH$_2$CO$_2$Na:C16C18-3PO-10EO-H (80 mol %:20 mol %)]$^{a)}$, 30% by weight of BDG, 30% by weight of water | 65 (JAIP = 100 Hz). | 25 (JAIP = 100 Hz). | Liquid with very small amount of homogeneously distributed crystals, which dissolve after heating to 50° C. (homogeneous metered addition of the concentrate in salt solution at | Liquid with small amount of homogeneously distributed crystals, which dissolve after heating to 50° C. (homogeneous metered addition of the concentrate in salt solution at 20° C. and |

TABLE 1-continued

Concentrates of alkyl ether carboxylate/alkyl ether alcohol surfactant mixture

| Example | Surfactant concentrate | Viscosity at 20° C. and different shear rates | Viscosity at 50° C. and different shear rates | Appearance after storage at 20° C. for two weeks | Appearance after freezing and later thawing at 20° C. |
|---|---|---|---|---|---|
| | | | | 20° C. and complete dissolution in salt solution with total salinity 30 000 ppm) | complete dissolution in salt solution with total salinity 30 000 ppm) |
| 2 | 60% by weight of alkyl ether carboxylate/alkyl ether alcohol mixture 5 [comprising surfactant mixture of C16C18-7PO-10EO-CH$_2$CO$_2$Na:C16C18-7PO-10EO-H (70 mol %:30 mol %)]$^{b)}$, 20% by weight of BDG, 20% by weight of water | ~340 mPas (10 Hz) 340 (JAIP = 100 Hz). 310 (JAIP = 1000 Hz). | ~110 mPas (10 Hz) ~100 mPas (100 Hz) ~100 mPas (1000 Hz) | Liquid with small amount of homogeneously distributed crystals, which dissolve after heating to 50° C. (homogeneous metered addition of the concentrate in salt solution at 20° C. and complete dissolution in salt solution with total salinity 30 000 ppm) | Liquid with small amount of homogeneously distributed crystals, which dissolve after heating to 50° C. (homogeneous metered addition of the concentrate in salt solution at 20° C. and complete dissolution in salt solution with total salinity 30 000 ppm) |
| 3 | 40% by weight of alkyl ether carboxylate/alkyl ether alcohol mixture 6 [comprising surfactant mixture of C16C18-7PO-4EO-CH$_2$CO$_2$Na:C16C18-4PO-10EO-H (61 mol %:39 mol %)]$^{c)}$, 30% by weight of BDG, 30% by weight of water | 55 (JAIP = 100 Hz). | 25 (JAIP = 100 Hz). | Liquid with small amount of homogeneously distributed crystals, which dissolve after heating to 50° C. (homogeneous metered addition of the concentrate in salt solution at 20° C. and complete dissolution in salt solution with total salinity 30 000 ppm) | Liquid with small amount of homogeneously distributed crystals, which dissolve after heating to 50° C. (homogeneous metered addition of the concentrate in salt solution at 20° C. and complete dissolution in salt solution with total salinity 30 000 ppm) |
| 4 | 60% by weight of alkyl ether carboxylate/alkyl ether alcohol mixture 7 [comprising surfactant mixture of C16C18C20-Guerbet-18EO-CH$_2$CO$_2$Na:C16C18C20-Guerbet-18EO-H (87 mol %:13 mol %)]$^{e)}$, 20% by weight of BDG, 20% by weight of water | ~260 mPas (10 Hz) ~260 mPas (100 Hz) ~240 mPas (1000 Hz) | ~60 mPas (10 hz) ~67 mPas (100 Hz) ~71 mPas (1000 Hz) | Clear liquid (homogeneous metered addition of the concentrate in salt solution at 20° C. and complete dissolution in salt solution with total salinity 30 000 ppm) | Clear liquid (homogeneous metered addition of the concentrate in salt solution at 20° C. and complete dissolution in salt solution with total salinity 30 000 ppm) |
| 5 | 40% by weight of alkyl ether carboxylate/alkyl ether alcohol mixture 7 [comprising surfactant mixture of C16C18C20-Guerbet-18EO-CH$_2$CO$_2$Na:C16C18C20-Guerbet-18EO-H (87 mol %:13 mol %)]$^{e)}$, 30% | 70 (JAIP = 100 Hz). | ~30 mPas (100 Hz) | Clear liquid (homogeneous metered addition of the concentrate in salt solution at 20° C. and complete dissolution in | Freezing not possible at −18° C.; still a clear liquid after storage at −18° C. for 2 weeks |

TABLE 1-continued

Concentrates of alkyl ether carboxylate/alkyl ether alcohol surfactant mixture

| Example | Surfactant concentrate | Viscosity at 20° C. and different shear rates | Viscosity at 50° C. and different shear rates | Appearance after storage at 20° C. for two weeks | Appearance after freezing and later thawing at 20° C. |
|---|---|---|---|---|---|
| | by weight of BDG, 30% by weight of water | | | salt solution with total salinity 30 000 ppm) | |

[a] alkyl ether carboxylate/alkyl ether alcohol mixture 1 b); corresponds to surfactant mixture of 80 mol % of surfactant of the general formula (I) $R^1$—O—$(CH_2C(R^2)HO)_x$—$(CH_2C(CH_3)HO)_y$—$(CH_2CH_2O)_z$—$CH_2CO_2M$ and 20 mol % of surfactant of the general formula (II) $R^1$—O—$(CH_2C(R^2)HO)_x$—$(CH_2C(CH_3)HO)_y$—$((CH_2CH_2O)_z$—H with $R^1 = C_{16}H_{33}/C_{18}H_{37}$, x = 0, y = 3 and z = 10, M = Na.

[b] alkyl ether carboxylate/alkyl ether alcohol mixture 5); corresponds to surfactant mixture of 70 mol % of surfactant of the general formula (I) $R^1$—O—$(CH_2C(R^2)HO)_x$—$(CH_2C(CH_3)HO)_y$—$(CH_2CH_2O)_z$—$CH_2CO_2M$ and 30 mol % of surfactant of the general formula (II) $R^1$—O—$(CH_2C(R^2)HO)_x$—$(CH_2C(CH_3)HO)_y$—$(CH_2CH_2O)_z$—H with $R^1 = C_{16}H_{33}/C_{18}H_{37}$, x = 0, y = 7 and z = 10, M = Na.

[c] alkyl ether carboxylate/alkyl ether alcohol mixture 6); corresponds to surfactant mixture of 61 mol % of surfactant of the general formula (I) $R^1$—O—$(CH_2C(R^2)HO)_x$—$(CH_2C(CH_3)HO)_y$—$(CH_2CH_2O)_z$—$CH_2CO_2M$ and 39 mol % of surfactant of the general formula (II) $R^1$—O—$(CH_2C(R^2)HO)_x$—$(CH_2C(CH_3)HO)_y$—$(CH_2CH_2O)_z$—H with $R^1 = C_{16}H_{33}/C_{18}H_{37}$, x = 0, y = 7 and z = 4, M = Na.

d) alkyl ether carboxylate/alkyl ether alcohol mixture 8); corresponds to surfactant mixture of 85 mol % of surfactant of the general formula (I) $R^1$—O—$(CH_2C(R^2)HO)_x$—$(CH_2C(CH_3)HO)_y$—$(CH_2CH_2O)_z$—$CH_2CO_2M$ and 15 mol % of surfactant of the general formula (II) $R^1$—O—$(CH_2C(R^2)HO)_x$—$(CH_2C(CH_3)HO)_y$—$(CH_2CH_2O)_z$—H with $R^1 = C_{16}H_{33}/C_{18}H_{37}/C_{20}H_{41}$, x = 0, y = 0 and z = 10, M = Na.

[e] alkyl ether carboxylate/alkyl ether alcohol mixture 7); corresponds to surfactant mixture of 87 mol % of surfactant of the general formula (I) $R^1$—O—$(CH_2C(R^2)HO)_x$—$(CH_2C(CH_3)HO)_y$—$(CH_2CH_2O)_z$—$CH_2CO_2M$ and 13 mol % of surfactant of the general formula (II) $R^1$—O—$(CH_2C(R^2)HO)_x$—$(CH_2C(CH_3)HO)_y$—$(CH_2CH_2O)_z$—H with $R^1 = C_{16}H_{33}/C_{18}H_{37}/C_{20}H_{41}$, x = 0, y = 0 and z = 18, M = Na.

As can be seen in table 1 from examples 1 to 4, it is possible to obtain concentrates with active content about 55% (surfactant mixture) which remain stable in spite of the presence of ≥3% by weight of NaCl (from alkyl ether carboxylate/akyl ether alcohol mixture): no phase separation occurs because of the presence of electrolytes. As a result, there is no need for the step for complex removal of NaCl by phase separation (for example acidification, heating to 90° C., phase separation optionally with solvent, neutralize organic phase again; see also alkyl ether carboxylate/alkyl alkoxylate mixture 11) in the alkyl ether carboxylate preparation. This means quicker production, lower consumption of chemicals, lower energy expenditure and lower costs. In addition, no waste water with a high salt content is sent to the surface water (via a water treatment plant). Instead, the NaCl from the preparation is pumped into the mineral oil deposit as well. In the deposit, it encounters salty formation water having an enormously large excess of NaCl relative to the volume pumped in.

The transport of these concentrates (from the manufacturing site to the deposit) causes less pollution of the environment, since the proportion of unnecessarily transported water is low (not 70% by weight of water as in many anionic surfactant solutions but merely, for example, 20-30% by weight) and hence less space and energy is consumed. Because of the large volumes (for example 10,000 to of surfactant per annum) for the development of a field over 10 years, expenditure on container insulation or moderate heating is also worthwhile in order to keep the concentrate at about 15-20° C., since a very large amount of energy is saved on the transport side (lower diesel consumption in ships and trucks).

As shown in example 5, the concentrate from example 4 can be diluted by addition of equal amounts of BDG and water to arrive at concentrates which have very good cold stability (at −18° C., the concentrate for example 5 is still liquid) and can be handled more easily in the deposit (less intensive heating measures; dilution measures on site are possible, since water and BDG can be provided separately or is available).

Said concentrates from examples 1 to 5 are easy to marine in the field, since their viscosities are below 1000 mPas at 50° C. (even at low shear rates of 10 Hz) and therefore do not present any difficulties in the pumps used.

Even the relatively small amounts of homogeneously distributed crystals observed in some concentrates are unproblematic, since they dissolve as a result of brief heating to 50° C. Alternatively, the concentrate can be pumped homogeneously into the injection water together with the crystals, the concentrate and the crystals dissolving immediately.

The test results for solubility and for interfacial tension after 3 h are shown in table 2.

TABLE 2

Interfacial tensions with alkyl ether carboxylate/alkyl ether alcohol surfactant mixture

| Example | Surfactant formulation | Salt solution | Crude oil [° API] | IFT at temperature | Surfactant solubility in the salt solution at temperature |
|---|---|---|---|---|---|
| 1 | 0.11% surfactant mixture of C16C18-3PO-10EO-$CH_2CO_2Na$:C16C18-3PO-10EO-H (80 mol %:20 mol %)[a] | Salt content ~148 200 ppm with 585 ppm of divalent cations (14.4% NaCl, 0.15% KCl, 0.15% $MgCl_2 \times 6\ H_2O$, 0.15% $CaCl_2 \times 2\ H_2O$, 0.15% ($Na_2SO_4$) | 25.9 | 0.079 mN/m at 60° C. | Slightly scattering at 60° C. |

TABLE 2-continued

Interfacial tensions with alkyl ether carboxylate/alkyl ether alcohol surfactant mixture

| Example | Surfactant formulation | Salt solution | Crude oil [° API] | IFT at temperature | Surfactant solubility in the salt solution at temperature |
|---|---|---|---|---|---|
| C2 | 0.1% dodecylbenzenesulfonate sodium salt[b] | Salt content ~103 130 ppm with 3513 ppm of divalent cations (8.98% NaCl, 0.11% KCl, 0.90% MgCl$_2$ × 6 H$_2$O, 0.90% CaCl$_2$ × 2 H$_2$O, 0.11% Na$_2$SO$_4$) | 25.9 | >1 mN/m at 60° C. | Insoluble at 60° C. |
| C3 | 0.1% dodecylbenzenesulfonate sodium salt[b] | Salt content ~103 130 ppm with 3513 ppm of divalent cations (8.98% NaCl, 0.11% KCl, 0.90% MgCl$_2$ × 6 H$_2$O, 0.90% CaCl$_2$ × 2 H$_2$O, 0.11% Na$_2$SO$_4$) | 25.9 | >1 mN/m at 80° C. | Insoluble at 80° C. |
| 4 | 0.22% surfactant mixture of C16C18-7PO-4EO-CH$_2$CO$_2$Na:C16C18-7PO-4EO-H (61 mol %:39 mol %)[c] | Salt content ~29 910 ppm with 117 ppm of divalent cations (2.88% NaCl, 0.03% KCl, 0.03% MgCl$_2$ × 6 H$_2$O, 0.03% CaCl$_2$ × 2 H$_2$O, 0.03% Na$_2$SO$_4$) | 25.9 | 0.089 mN/m at 60° C. | Clear at 60° C. |
| 5 | 0.22% surfactant mixture of C16C18C20-Guerbet-10EO-CH$_2$CO$_2$Na:C16C18C20-Guerbet-10EO-H (85 mol %:15 mol %)[d] | Salt content ~69 580 ppm with 273 ppm of divalent cations (6.72% NaCl, 0.07% KCl, 0.07% MgCl$_2$ × 6 H$_2$O, 0.07% CaCl$_2$ × 2 H$_2$O, 0.07% Na$_2$SO$_4$) | 25.9 | 0.072 mN/m at 100° C. | Slightly scattering at 100° C. |
| 6 | 0.22% surfactant mixture of C16C18C20-Guerbet-10EO-CH$_2$CO$_2$Na:C16C18C20-Guerbet-10EO-H (85 mol %:15 mol %)[d] | Salt content ~65 670 ppm with 2236 ppm of divalent cations (5.71% NaCl, 0.07% KCl, 0.57% MgCl$_2$ × 6 H$_2$O, 0.57% CaCl$_2$ × 2 H$_2$O, 0.07% Na$_2$SO$_4$) | 25.9 | 0.021 mN/m at 100° C. | Slightly scattering at 100° C. |
| C7 | 0.11% surfactant mixture of C16C18-3PO-10EO-CH$_2$CO$_2$Na:C16C18-3PO-10EO-H (25 mol %:75 mol %)[e] | Salt content ~69 580 ppm with 273 ppm of divalent cations (6.72% NaCl, 0.07% KCl, 0.07% MgCl$_2$ × 6 H$_2$O, 0.07% CaCl$_2$ × 2 H$_2$O, 0.07% Na$_2$SO$_4$) | 25.9 | 0.332 mN/m at 60° C. | Clear at 60° C. |
| C8 | 0.22% surfactant mixture of C16C18-7PO-4EO-CH$_2$CO$_2$Na:C16C18-7PO-4EO-H (40 mol %:60 mol %)[f] | Salt content ~29 910 ppm with 117 ppm of divalent cations (2.88% NaCl, 0.03% KCl, 0.03% MgCl$_2$ × 6 H$_2$O, 0.03% CaCl$_2$ × 2 H$_2$O, 0.03% Na$_2$SO$_4$) | 25.9 | 0.536 mN/m at 60° C. | Clear at 60° C. |
| 9 | 0.11% surfactant mixture of C16C18-3PO-10EO-CH$_2$CO$_2$Na:C16C18-3PO-10EO-H (80 mol %:20 mol %)[a] | Salt content ~140 700 ppm with 4957 ppm of divalent cations (12.2% NaCl, 0.15% KCl, 1.27% MgCl$_2$ × 6 H$_2$O, 1.27% CaCl$_2$ × 2 H$_2$O, 0.15% Na$_2$SO$_4$) | 25.9 | 0.007 mN/m at 60° C. | Slightly scattering at 60° C. |

TABLE 2-continued

Interfacial tensions with alkyl ether carboxylate/alkyl ether alcohol surfactant mixture

| Example | Surfactant formulation | Salt solution | Crude oil [° API] | IFT at temperature | Surfactant solubility in the salt solution at temperature |
|---|---|---|---|---|---|
| 10 | 0.22% surfactant mixture of C16C18-7PO-10EO-CH$_2$CO$_2$Na:C16C18-3PO-10EO-H (70 mol %:30 mol %)$^{g)}$ | Salt content ~30 780 ppm with 155 ppm of divalent cations | 38 | 0.003 mN/m at 92° C. | Slightly scattering at 92° C. |

$^{a)}$Derived from alkyl ether carboxylate/alkyl ether alcohol mixture 1 b); corresponds to surfactant mixture of 80 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 20 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 3 and z = 10, M = Na.
$^{b)}$Dodecylbenzenesulfonate sodium salt (Lutensit A-LBN, active content 50%).
$^{c)}$Derived from alkyl ether carboxylate/alkyl ether alcohol mixture 6; corresponds to surfactant mixture of 61 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 39 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 7 and z = 4, M = Na.
$^{d)}$Derived from alkyl ether carboxylate/alkyl ether alcohol mixture 8; corresponds to surfactant mixture of 85 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 15 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$/C$_{20}$H$_{41}$, x = 0, y = 0 and z = 10, M = Na.
$^{e)}$Produced from mixture of 0.0625% of alkyl ether alcohol 1, which corresponds to surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 3 and z = 10, and 0.0375% of alkyl ether carboxylate/alkyl ether alcohol mixture 1 b), which corresponds to surfactant mixture of 80 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 20 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 3 and z = 10, M = Na.
$^{f)}$Produced from mixture of 0.052% of alkyl ether alcohol 6, which corresponds to surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 7 and z = 4, and 0.148% of the alkyl ether carboxylate/alkyl ether alcohol mixture 6, which corresponds to surfactant mixture of 61 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 39 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 7 and z = 4, M = Na.
$^{g)}$Derived from alkyl ether carboxylate/alkyl ether alcohol mixture 5; corresponds to surfactant mixture of 70 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 30 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 7 and z = 10, M = Na.

As can be seen in table 2, the alkyl ether carboxylate/alkyl ether alcohol surfactant mixtures in the molar ratio claimed, based on the different alkyl radicals and with different alkoxylation levels, give interfacial tensions of <0.1 mN/m at >5.5° C. and a total surfactant concentration of <0.5% surfactant. This is surprisingly the case if, inter alia, a certain carboxymethylation level is present in the alkyl ether carboxylate/alkyl ether alcohol surfactant mixture. Comparative examples C7 and C8 show that a carboxymethylation level of 25% or 40% is inadequate to lower the interfacial tension to <0.1 mN/m. However, if example 4 is compared with comparative example C8, it is apparent that, under identical conditions, the interfacial tension has been lowered to 0.089 mN/m (ex. 4) by raising the carboxymethylation level from 40% to 61%. The alkyl ether carboxylate/alkyl ether alcohol surfactant mixture used is based on a linear primary C16C18 fatty alcohol reacted with 7 eq of propylene oxide and 4 eq of ethylene oxide and the corresponding carboxylate.

Examples 5 and 6 show an alkyl ether carboxylate/alkyl ether alcohol surfactant mixture based on a primary C16C18C20 Guerbet alcohol (and hence branched alcohol) reacted with 10 eq of ethylene oxide and the corresponding carboxylate. The carboxymethylation level is 85%. In spite of challenging test conditions (high temperature of 100° C. moderate oil with 25.9° API and moderate salinity with salt contents of about 6.5-6.9%), interfacial tensions of 0.072 mN/m (ex. 5) and 0.021 mN/m (ex. 6) were achieved. Astonishingly, in spite of the concentration of divalent cations being many times higher (2236 ppm vs. 273 ppm), the interfacial tension in example 6 is lower (0.021 mN/m) than in example 5 (0.072 mN/m). Likewise surprising is the good hardness tolerance, since no differences in solubility are apparent in spite of the presence of divalent cations. The organic sulfonates typically used in tertiary mineral oil production, for example dodecylbenzenesulfonate (comparative examples C2 and C3), are hydrolysis-stable but are insoluble on their own under the conditions chosen (salt content 10.3% with 3513 ppm of divalent cations at 60° C. and 80° C. in comparative examples C2 and C3 respectively).

Similarly surprising findings are shown by the comparison of example 1 and with example 9. The alkyl ether carboxylate/alkyl ether alcohol surfactant mixture used is based on a linear primary C16C18 fatty alcohol reacted with 3 eq of propylene oxide and 10 eq of ethylene oxide and the corresponding carboxylate. The carboxymethylation level was 80%. At salt contents of about 15% and about 14%, in the case of 4957 ppm of divalent cations, it was even possible to achieve ultralow interfacial tensions: 0.007 mN/m in example 9. In the case of lower water hardness (585 ppm of divalent cations in ex. 1) but otherwise analogous conditions, the interfacial tension in ex. 1 was higher but still <0.1 mN/m. Surprisingly ultralow interfacial tensions of 0.003 mN/m with a light crude oil (38° API) at high temperature (92° C.) were achieved in ex. 10 with the aid of an alkyl ether carboxylate/alkyl ether alcohol surfactant mixture. The alkyl ether carboxylate/alkyl ether alcohol surfactant mixture used is based on a linear primary C16C18 fatty alcohol reacted with 7 eq of propylene oxide and 4 eq of ethylene oxide and the corresponding carboxylate. The carboxymethylation level is 70%. The interfacial tension after 3 h, as described, was 0.003 mN/m. After 30 min, the interfacial tension was already 0.007 mN/m.

TABLE 3

Interfacial tensions with alkyl ether carboxylate/alkyl ether alcohol surfactant mixture and cosolvent

| Example | Surfactant formulation | Salt solution | Crude oil [° API] | IFT at temperature | Surfactant solubility in the salt solution at temperature |
|---|---|---|---|---|---|
| 1 | 0.11% surfactant mixture of C16C18-3PO-10EO-CH$_2$CO$_2$Na:C16C18-3PO-10EO-H (80 mol %:20 mol %)$^{a)}$ | Salt content ~148 200 ppm with 585 ppm of divalent cations (14.4% NaCl, 0.15% KCl, 0.15% MgCl$_2$ × 6 H$_2$O, 0.15% CaCl$_2$ × 2 H$_2$O, 0.15% Na$_2$SO$_4$) | 25.9 | 0.079 mN/m at 60° C. | Slightly scattering at 60° C. |
| 2 | 0.11% surfactant mixture (of C16C18-3PO-10EO-CH$_2$CO$_2$Na:C16C18-3PO-10EO-H (80 mol %:20 mol %)$^{a)}$) and 0.03% butyl diethylene glycol | Salt content ~148 200 ppm with 585 ppm of divalent cations (14.4% NaCl, 0.15% KCl, 0.15% MgCl$_2$ × 6 H$_2$O, 0.15% CaCl$_2$ × 2 H$_2$O, 0.15% Na$_2$SO$_4$) | 25.9 | 0.035 mN/m at 60° C. | Clear at 60° C. |
| 3 | 0.22% surfactant mixture (of C16C18-3PO-10EO-CH$_2$CO$_2$Na:C16C18-3PO-10EO-H (80 mol %:20 mol %)$^{a)}$) and 0.06% butyl diethylene glycol | Salt content ~140 770 ppm with 4957 ppm of divalent cations (12.2% NaCl, 0.15% KCl, 1.27% MgCl$_2$ × 6 H$_2$O, 1.27% CaCl$_2$ × 2 H$_2$O, 0.15% Na$_2$SO$_4$) | 25.9 | 0.019 mN/m at 60° C. | Slightly scattering at 60° C. |
| C4 | 0.22% surfactant mixture (of C16C18-3PO-10EO-CH$_2$CO$_2$Na:C16C18-3PO-10EO-H (95 mol %:5 mol %)$^{b)}$) and 0.06% butyl diethylene glycol | Salt content ~140 770 ppm with 4957 ppm of divalent cations (12.2% NaCl, 0.15% KCl, 1.27% MgCl$_2$ × 6 H$_2$O, 1.27% CaCl$_2$ × 2 H$_2$O, 0.15% Na$_2$SO$_4$) | 25.9 | 0.019 mN/m at 60° C. | Slightly scattering at 60° C. |
| 5 | 0.22% surfactant mixture (of C16C18-7EO-10EO-CH$_2$CO$_2$Na:C16C18-7PO-10EO-H (81 mol %:19 mol %)$^{c)}$) and 0.073% butyl diethylene glycol | Salt content ~30 780 ppm with 155 ppm of divalent cations | 38 | 0.002 mN/m at 92° C. | Slightly scattering at 92° C. |
| 6 | 0.22% surfactant mixture (of C16C18-7PO-10EO-CH$_2$CO$_2$Na:C16C18-7PO-10EO-H (73 mol %:27 mol %)$^{d)}$) and 0.073% butyl diethylene glycol | Salt content ~30 780 ppm with 155 ppm of divalent cations | 38 | 0.001 mN/m at 92° C. | Slightly scattering at 92° C. |
| 7 | 0.11% surfactant mixture (of C16C18C20-Guerbet-18EO-CH$_2$CO$_2$Na:C16C18C20-Guerbet-18EO-H (87 mol %:13 mol %)$^{e)}$) and 0.082% butyl diethylene glycol | salt content ~148 200 ppm with 585 ppm of divalent cations (14.4% NaCl, 0.15% KCl, 0.15% MgCl$_2$ × 6 H$_2$O, 0.15% CaCl$_2$ × 2 H$_2$O, 0.15% Na$_2$SO$_4$) | 25.9 | 0.041 mN/m at 100° C. | Slightly scattering at 100° C. |

$^{a)}$Derived from alkyl ether carboxylate/alkyl ether alcohol mixture 1 b); corresponds to surfactant mixture of 80 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 20 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 3 and z = 10, M = Na.

$^{b)}$Derived from comparative alkyl ether carboxylate/alkyl ether alcohol mixture C11; corresponds to surfactant mixture of 95 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 5 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 3 and z = 10, M = Na.

$^{c)}$Derived from alkyl ether carboxylate/alkyl ether alcohol mixture 12; corresponds to surfactant mixture of 81 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 19 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 7 and z = 10, M = Na.

$^{d)}$Derived from alkyl ether carboxylate/alkyl ether alcohol mixture 13; corresponds to surfactant mixture of 73 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 27 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 7 and z = 10, M = Na.

$^{e)}$Derived from alkyl ether carboxylate/alkyl ether alcohol mixture 7; corresponds to surfactant mixture of 87 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 13 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$/C$_{20}$H$_{41}$, x = 0, y = 0 and z = 18, M = Na.

As can be inferred from table 3, the claimed alkyl ether carboxylate/alkyl ether alcohol surfactant mixtures, even in the presence of cosolvent (butyl diethylene glycol BDG), give interfacial tensions of <0.1 mN/m at >55° C. and a total surfactant concentration of <0.5% surfactant. The comparison of examples 1 and 2 shows the contribution of butyl diethylene glycol as cosolvent (identical conditions: ex. 1 without BDG, ex. 2 with BDG). It was possible to lower the interfacial tension further from 0.079 to 0.035 mN/m. With reference to example 3 and comparative example C4, it was found that, surprisingly, a very high carboxymethylation level is not necessarily advantageous. Under the harsh saline conditions with salt content about 14.1% and nearly 5000 ppm divalent cations (water hardness), an alkyl ether carboxylate/alkyl ether alcohol surfactant mixture based on a linear primary C16C18 fatty alcohol reacted with 3 eq of propylene oxide and 10 eq of ethylene oxide, having a carboxymethylation level of 80% (ex. 3), in the presence of BDG, gives an interfacial tension of 0.019 mN/m with a moderate crude oil (25.9° API) at 60° C. (ex. 3), whereas, under analogous conditions, a corresponding surfactant mixture having a carboxymethylation level of 95%, which is not in accordance with the invention, only gives an interfacial tension of 0.109 mN/m.

Ultralow interfacial tensions can be achieved by claimed surfactant formulations as shown in examples 5 and 6. Alkyl ether carboxylate/alkyl ether alcohol surfactant mixtures based on a linear primary C16C18 fatty alcohol reacted with 7 eq of propylene oxide and 10 eq of ethylene oxide and the corresponding carboxylate, blended with butyl diethylene glycol, lead to 0.001 mN/m (ex. 5) and 0.002 mN/m (ex. 6)—i.e. to ultralow interfacial tensions. These are astonishingly low values considering that the carboxymethylation level of the alkyl ether carboxylate/alkyl ether alcohol mixture is only 81% (ex. 5) or even only 73% (ex. 6). In addition, harsh conditions are present, since temperatures are high (92° C.—because of the elevated fluctuation of the oil-water interface at this temperature, it is difficult to achieve low interfacial tensions with just one surfactant or two very similar surfactants) and the use of alkali is inadvisable because of the water hardness (precipitation would lead to blockage of the formation).

Example 7 shows an alkyl ether carboxylate/alkyl ether alcohol surfactant mixture based on a primary C16C18C20 Guerbet alcohol (and hence branched alcohol) reacted with 18 eq of ethylene oxide and the corresponding carboxylate. The carboxymethylation level is 87%. In spite of challenging test conditions (high temperature of 100° C., moderate oil with 25.9° API and high salinity with salt contents of about 14.8%), in the presence of butyl diethylene glycol, an interfacial tension of 0.041 mN/m was achieved.

TABLE 4

Interfacial tensions with alkyl ether carboxylate/alkyl ether alcohol surfactant mixture and cosurfactant (and optionally with cosolvent)

| Example | Surfactant formulation | Salt solution | Crude oil [° API] | IFT at temperature | Surfactant solubility in the salt solution at temperature |
|---|---|---|---|---|---|
| 1 | 0.11% surfactant mixture (of C16C18-7PO-10EO-CH$_2$CO$_2$Na:C16C18-7PO-10EO-H (73 mol %:27 mol %)$^{a)}$) and 0.037% butyl diethylene glycol and 0.146% Glucopon 225DK$^{b)}$ | Salt content ~129 000 ppm with 10 820 ppm of divalent cations | 29.6 | 0.009 mN/m at 67° C. | Clear at 67° C. |
| 2 | 0.11% surfactant mixture (of C16C18-7PO-10EO-CH$_2$CO$_2$Na:C16C18-7PO-10EO-H (81 mol %:19 mol %)$^{c)}$) and 0.037% butyl diethylene glycol and 0.146% Glucopon 225DK$^{b)}$ | Salt content ~30 780 ppm with 155 ppm of divalent cations | 38 | 0.007 mN/m at 92° C. | Clear at 92° C. |
| 3 | 0.11% surfactant mixture (of C16C18-3PO-10EO-CH$_2$CO$_2$Na:C16C18- | Salt content ~103 130 ppm with 3513 ppm of divalent cations (8.98% NaCl, 0.11% KCl, 0.90% | 29.6 | 0.045 mN/m at 80° C. | Clear at 80° C. |

TABLE 4-continued

Interfacial tensions with alkyl ether carboxylate/alkyl ether alcohol
surfactant mixture and cosurfactant (and optionally with cosolvent)

| Example | Surfactant formulation | Salt solution | Crude oil [° API] | IFT at temperature | Surfactant solubility in the salt solution at temperature |
|---|---|---|---|---|---|
| | 3PO-10EO-H (80 mol %:20 mol %)$^{d)}$ and 0.146% Hostapur SAS 30$^{e)}$ | $MgCl_2 \times 6\ H_2O$, 0.90% $CaCl_2 \times 2\ H_2O$, 0.11% ($Na_2SO_4$) | | | |

$^{a)}$Derived from alkyl ether carboxylate/alkyl ether alcohol mixture 13; corresponds to surfactant mixture of 73 mol % of surfactant of the general formula (I) $R^1$—O—$(CH_2C(R^2)HO)_x$—$(CH_2C(CH_3)HO)_y$—$(CH_2CH_2O)_z$—$CH_2CO_2M$ and 27 mol % of surfactant of the general formula (II) $R^1$—O—$(CH_2C(R^2)HO)_x$—$(CH_2C(CH_3)HO)_y$—$(CH_2CH_2O)_z$—H with $R^1$ = $C_{16}H_{33}/C_{18}H_{37}$, x = 0, y = 7 and z = 10, M = Na.
$^{b)}$Alkyl polyglucoside (based on alkyl radical having 8 to 10 carbon atoms) with active ingredient content 68.3%.
$^{c)}$Derived from alkyl ether carboxylate/alkyl ether alcohol mixture 12; corresponds to surfactant mixture of 81 mol % of surfactant of the general formula (I) $R^1$—O—$(CH_2C(R^2)HO)_x$—$(CH_2C(CH_3)HO)_y$—$(CH_2CH_2O)_z$—$CH_2CO_2M$ and 19 mol % of surfactant of the general formula (II) $R^1$—O—$(CH_2C(R^2)HO)_x$—$(CH_2C(CH_3)HO)_y$—$(CH_2CH_2O)_z$—H with $R^1$ = $C_{16}H_{33}/C_{18}H_{37}$, x = 0, y = 7 and z = 10, M = Na.
$^{d)}$Derived from alkyl ether carboxylate/alkyl ether alcohol mixture 1 b); corresponds to surfactant mixture of 80 mol % of surfactant of the general formula (I) $R^1$—O—$(CH_2C(R^2)HO)_x$—$(CH_2C(CH_3)HO)_y$—$(CH_2CH_2O)_z$—$CH_2CO_2M$ and 20 mol % of surfactant of the general formula (II) $R^1$—O—$(CH_2C(R^2)HO)_x$—$(CH_2C(CH_3)HO)_y$—$(CH_2CH_2O)_z$—H with $R^1$ = $C_{16}H_{33}/C_{18}H_{37}$, x = 0, y = 3 and z = 10, M = Na.
$^{e)}$Secondary alkanesulfonate sodium salt having 14 to 17 carbon atoms and having active ingredient content 32.3%

As can be seen in table 4, the claimed alkyl ether carboxylate/alkyl ether alcohol surfactant mixtures, even in the presence of cosurfactants (optionally also in the additional presence of cosolvent), give interfacial tensions of <0.1 mN/m at >55° C. and a total surfactant concentration of <0.5% surfactant. As shown by examples 1 and 2, the claimed alkyl ether carboxylate/alkyl ether alcohol surfactant mixtures based on a linear primary C16C18 fatty alcohol reacted with 7 eq of propylene oxide and 10 eq of ethylene oxide and the corresponding carboxylate, in the presence of butyl diethylene glycol and a C8C10-based alkyl polyglucoside (Glucopon DK. 225), even lead to ultralow interfacial tensions of 0.009 and 0.007 mN/m respectively. As can be seen, there are distinct differences in the conditions. In example 1, there is a high salinity (salt content about 12.9%) with very high hardness (>10,000 ppm of divalent cations), a moderate crude oil (29.6° API) and elevated temperature (67° C.). In example 2, in contrast, the salinity and water hardness is moderate for EOR applications (30 780 ppm of TDS and 155 ppm of divalent cations), the crude oil is light (30° API), but the temperature is high (92° C.) Moreover, the ratio of alkyl ether carboxylate to alkyl ether alcohol varies (73:27 and 81:19 mol %). If example 2 in table 4 is compared with example 5 in table 3, it can be seen that the conditions are very similar but the presence of Glucopon 225 DK leads to clear aqueous surfactant solutions. On the other hand, the interfacial tension is somewhat higher but still in the ultralow range.

Example 3 in table 4 indicates that it is also possible to use organic sulfonates, for example the secondary C14C17 paraffinsulfonate (Hostapur SAS 30) as cosurfactant. However, as compared with examples 1 and 2, an alkyl ether carboxylate/alkyl ether alcohol surfactant mixture having a lower propoxylation level (3 rather than 7 propoxy units) and no cosolvent was used. The interfacial tension, at 0.045 mN/m, is below 0.1 mN/m.

TABLE 5

Interfacial tensions with alkyl ether carboxylate/alkyl ether alcohol
surfactant mixture and cosolvent over a broad temperature range

| Example | Surfactant formulation | Salt solution | Crude oil [° API] | IFT at temperature | Surfactant solubility in the salt solution at temperature |
|---|---|---|---|---|---|
| 1 | 0.15% surfactant mixture (of C16C18-7PO-10EO-$CH_2CO_2Na$:C16C18-7PO-10EO-H (73 mol %:27 mol %)$^{a)}$) and 0.05% butyl diethylene glycol | Salt content ~79 450 ppm with ~310 ppm of divalent cations | 38 | 0.004 mN/m at 60° C. | Clear at 60° C. |
| 2 | 0.15% surfactant mixture (of C16C18-7PO-10EO-$CH_2CO_2Na$:C16C18-7PO-10EO-H (73 mol %:27 mol %)$^{a)}$) and 0.05% butyl diethylene glycol | Salt content ~79 450 ppm with ~310 ppm of divalent cations | 38 | 0.006 mN/m at 90° C. | Slightly scattering at 90° C. |
| 3 | 0.15% surfactant mixture (of C16C18- | Salt content ~49 670 ppm with ~195 ppm of | 29 | 0.005 mN/m at 90° C. | Slightly scattering at |

TABLE 5-continued

Interfacial tensions with alkyl ether carboxylate/alkyl ether alcohol
surfactant mixture and cosolvent over a broad temperature range

| Example | Surfactant formulation | Salt solution | Crude oil [° API] | IFT at temperature | Surfactant solubility in the salt solution at temperature |
|---|---|---|---|---|---|
|  | 7PO-10EO-CH$_2$CO$_2$Na:C16C18-7PO-10EO-H (73 mol %:27 mol %)$^{a)}$ and 0.05% butyl diethylene glycol | divalent cations |  |  | 90° C. |
| 4 | 0.15% surfactant mixture (of C16C18-7PO-10EO-CH$_2$CO$_2$Na:C16C18-7PO-10EO-H (73 mol %:27 mol %)$^{a)}$ and 0.05% butyl diethylene glycol | Salt content ~49 670 ppm with ~195 ppm of divalent cations | 29 | 0.006 mN/m at 110° C. | Slightly scattering at 110° C. |

$^{a)}$Derived from alkyl ether carboxylate/alkyl ether alcohol mixture 13; corresponds to surfactant mixture of 73 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 27 mol % of surfactant of the general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 7 and z = 10, M = Na.

As can be seen in table 5, the claimed alkyl ether carboxylate/alkyl ether alcohol surfactant mixtures blended with butyl diethylene glycol give ultralow interfacial tensions of <0.01 mN/m over a broad temperature range. For instance, the same surfactant mixture in the same saltwater at 60° C. gives an interfacial tension of 0.004 mN/m (example 1) and at 90° C. an interfacial tension of 0.006 mN/m (example 2). In a different saltwater and against a different crude oil, the same surfactant mixture at 90° C. gives an interfacial tension of 0.005 mN/m (example 3) and at 110° C. an interfacial tension of 0.006 mN/m (example 4).

Continuative test results for solubility and for interfacial tension after 3-8 h are shown in table 6.

TABLE 6

Interfacial tensions with alkyl ether carboxylate - alkyl ether alcohol
surfactant mixture and cosolvent over a broad range of oil and salinity

| Example | Surfactant formulation | Salt solution | Crude oil [° API] | IFT at temperature | Surfactant solubility in the salt solution at temperature |
|---|---|---|---|---|---|
| 1 | 0.15% surfactant mixture (of C16C18-7PO-10EO-CH$_2$CO$_2$Na:C16C18-7PO-10EO-H (73 mol %:27 mol %)$^{a)}$ and 0.05% butyl diethylene glycol | ~49670 ppm salt content with ~195 ppm divalent cations | 38 | 0.007 mN/m at 110° C. | Slightly scattering at 110° C. |
| 2 | 0.15% surfactant mixture (of C16C18-7PO-10EO-CH$_2$CO$_2$Na:C16C18-7PO-10EO-H (73 mol %:27 mol %)$^{a)}$ and 0.05% butyl diethylene glycol | ~46830 ppm salt content with ~1600 ppm divalent cations | 38 | 0.009 mN/m at 110° C. | Slightly scattering at 110° C. |
| 3 | 0.15% surfactant mixture (of C16C18-7PO-10EO-CH$_2$CO$_2$Na:C16C18-7PO-10EO-H (73 mol %:27 mol %)$^{a)}$ and 0.05% butyl diethylene glycol | ~49670 ppm salt content with ~195 ppm divalent cations | 29 | 0.003 mN/m at 100° C. | Slightly scattering at 100° C. |
| 4 | 0.15% surfactant mixture (of C16C18-7PO-10EO-CH$_2$CO$_2$Na:C16C18-7PO-10EO-H (73 mol %:27 mol %)$^{a)}$ | ~79450 ppm salt content with ~310 ppm divalent cations | 38 | 0.001 mN/m at 80° C. | Clear at 80° C. |

TABLE 6-continued

Interfacial tensions with alkyl ether carboxylate - alkyl ether alcohol
surfactant mixture and cosolvent over a broad range of oil and salinity

| Example | Surfactant formulation | Salt solution | Crude oil [° API] | IFT at temperature | Surfactant solubility in the salt solution at temperature |
|---|---|---|---|---|---|
| | and 0.05% butyl diethylene glycol | | | | |
| 5 | 0.15% surfactant mixture (of C16C18-7PO-10EO-CH$_2$CO$_2$Na:C16C18-7PO-10EO-H (73 mol %:27 mol %)$^{a)}$) and 0.05% butyl diethylene glycol | ~64560 ppm salt content with ~250 ppm divalent cations | 38 | 0.008 mN/m at 80° C. | Clear at 80° C. |
| 6 | 0.20% surfactant mixture (of C16C18-7PO-10EO-CH$_2$CO$_2$Na:C16C18-7PO-10EO-H (73 mol %:27 mol %)$^{a)}$) and 0.07% butyl diethylene glycol | ~29780 ppm salt content with ~1500 ppm divalent cations | 38 | 0.002 mN/m at 90° C. | Clear at 90° C. |

$^{a)}$derived from alkyl ether carboxylate/alkyl ether alkocol-mixture 13; corresponds to surfactant mixture of 73 mol % of surfactant of the general formula (I) R$^1$—O—(CH$_2$C(R$^2$)HO)$_x$—(CH$_2$C(CH$_3$)HO)$_y$—(CH$_2$CH$_2$O)$_z$—CH$_2$CO$_2$M and 27 mol % of surfactant of general formula (II) R$^1$—O—(CH$_2$C(R$^2$)HO)$_x$—(CH$_2$C(CH$_3$)HO)$_y$—(CH$_2$CH$_2$O)$_z$—H with R$^1$ = C$_{16}$H$_{33}$/C$_{18}$H$_{37}$, x = 0, y = 7 and z = 10, M = Na.

As can be seen in table 6, the claimed alkyl ether carboxylate-alkyl ether alcohol surfactant mixtures blended with butyl diethylene glycol give ultralow interfacial tensions of <0.01 mN/m over a broad range of oil and salinity. For instance, the same surfactant mixture in each case at 110° C. and with the same oil gives a interfacial tension of 0.007 mN/m (example 1), a interfacial tension of 0.009 mN/m (example 2) respectively, in two saltwaters. The salinities of both saltwaters are comparable (~49670 ppm vs. 46830 ppm salt contenz) but the proportion of divalent cations in example 2 is eight-fold higher tha in example 1 (~195 ppm vs. 1600 ppm). Example 6 shows that the same surfactant mixture also with low salt contents (~29780 ppm salt content) with high proportion of divalent cations (~1500 ppm) results in a low interfacial tension of 0.002 mN/m. This is very surprising, as anionic surfactants are typically very sensitive to multivalent cations. Example 3 compared to example 1 shows that the same surfactant mixture in the same saltwater at comparable temperatures also results with different oils (29° API in example 3, all other examples 38° API) in lower interfacial tensions: 0.003 mN/m (example 3).

The same surfactant mixture results in another saltwater and with another crude oil at 90° C. in an interfacial tension of 0.005 mN/m (example 3) and at 110° C. in a interfacial tension of 0.006 mN/m (example 4).

Examples 4 and 5 show that the same surfactant mixture result at the same temperature of 80° C. with the same oil in lower interfacial tensions of <0.01 mN/m, also with different salinities (~79450 ppm vs. 64560 ppm salt content).

The invention claimed is:
1. A method for producing a surfactant mixture by carboxymethylation comprising at least one anionic surfactant (A) of the general formula (I)

$$R^1\text{—O—}(CH_2C(R^2)HO)_x\text{—}(CH_2C(CH_3)HO)_y\text{—}(CH_2CH_2O)_z\text{—}CH_2CO_2M \quad (I)$$

and at least one nonionic surfactant (B) of the general formula (II)

$$R^1\text{—O—}(CH_2C(R^2)HO)_x\text{—}(CH_2C(CH_3)HO)_y\text{—}(CH_2CH_2O)_z\text{—}H \quad (II),$$

where a molar ratio of anionic surfactant (A) to nonionic surfactant (B) of 51:49 to 92:8 is present in the surfactant mixture and the nonionic surfactant (B) serves as starting material for the anionic surfactant (A), where R$^1$ is a primary linear or branched, saturated or unsaturated, aliphatic hydrocarbyl radical having 10 to 36 carbon atoms; and R$^2$ is a linear saturated aliphatic hydrocarbyl radical having 2 to 14 carbon atoms;

and M is H, Na, K or NH$_4$; and x is a number from 0 to 10; and

Y is a number from 0 to 50; and z is a number from 1 to 35;

where the sum total of x+y+z is a number from 3 to 80 and the x+y+z alkoxylate groups may be arranged in random distribution, in alternation or in blocks; and where the sum total of x+y is a number >0 if R$^1$ is a primary linear, saturated or unsaturated, aliphatic hydrocarbyl radical having 10 to 36 carbon atoms, wherein at least one of the following reaction conditions is used:

I) preparing the anionic surfactant (A) of the general formula (I) in a reactor by reacting the nonionic surfactant (B) of the general formula (II), while stirring, with chloroacetic acid or chloroacetic acid sodium salt in the presence of alkali metal hydroxide or aqueous alkali metal hydroxide, with removal of water of reaction such that the water content in the reactor is kept at a value of 0.2% to 1.7% during the carboxymethylation by applying reduced pressure and/or by passing nitrogen through;

II) using aqueous NaOH as alkali metal hydroxide and aqueous chloroacetic acid in a carboxymethylation, using NaOH in relation to the chloroacetic acid in a ratio of 2 eq:1 eq to 2.2 eq:1 eq;

and preparing the nonionic surfactant (B) either via a base-catalyzed alkoxylation using KOH or NaOH or CsOH or via an alkoxylation using a double metal cyanide catalyst, and the alkoxylation catalyst is not neutralized and is not removed after the alkoxylation has ended;

and initially charging the nonionic surfactant (B) of the general formula (II) in the reactor in the carboxymethylation and the sodium hydroxide and chloroacetic acid are metered in in parallel at a temperature of 60-110° C. over a period of 1-7 h, the metered addition over the entire period being effected continuously or in equal portions every hour, and the stoichiometric ratio of nonionic surfactant (B) of the general formula (II) to the chloroacetic acid being 1 eq:1 eq to 1 eq:1.9 eq;

and the water content in the reactor is kept predominantly at an average value of 0.2% to 1.7% during the carboxymethylation by applying reduced pressure and/or by passing nitrogen through;

III) using NaOH as alkali metal hydroxide and chloroacetic acid sodium salt are used in the carboxymethylation, using NaOH in relation to the chloroacetic acid sodium salt in a ratio of 1 eq:1 eq to 1 eq:1.9 eq;

and preparing the nonionic surfactant (B) via a base-catalyzed alkoxylation using KOH or NaOH or CsOH and is used in unneutralized form in the carboxymethylation;

and initially charging the nonionic surfactant (B) of the general formula (II) in a reactor in the carboxymethylation together with NaOH or aqueous NaOH, where the stoichiometric ratio of nonionic surfactant (B) of the general formula (II) to NaOH is 1 eq:1 eq to 1 eq:1.5 eq, a temperature of 60-110° C. is set, and the nonionic surfactant (B) of the general formula (II) is converted to the corresponding sodium salt $R^1$—O—$(CH_2C(R^2)HO)_x$—$(CH_2C(CH_3)HO)_y$—$(CH_2CH_2O)_z$—Na by applying reduced pressure and/or passing nitrogen through and, at a temperature of 60-110° C., the chloroacetic acid sodium salt is metered in completely or over a period of 4-12 h, where the stoichiometric ratio of nonionic surfactant (B) of the general formula (II) to the chloroacetic acid sodium salt is 1 eq:1 eq to 1 eq:1.9 eq and where the metered addition over the entire period is effected continuously or in equal portions every hour;

and the water content in the reactor is kept at a value of 0.2% to 1.7% during the carboxymethylation by applying reduced pressure and/or by passing nitrogen through;

IV) using solid NaOH as alkali metal hydroxide and chloroacetic acid sodium salt in the carboxymethylation, using NaOH in relation to the chloroacetic acid sodium salt in a ratio of 1 eq:1 eq to 1.1 eq:1 eq;

and preparing the nonionic surfactant (B) via a base-catalyzed alkoxylation using KOH or NaOH or CsOH and then neutralized with acetic acid and is used in the carboxymethylation together with initially 0.5-1.5% water;

and initially charging chloroacetic acid sodium salt and the nonionic surfactant (B) of the general formula (II) together in a reactor in the carboxymethylation, where the stoichiometric ratio of nonionic surfactant (B) of the general formula (II) to the chloroacetic acid sodium salt is 1 eq:1 eq to 1 eq:1.9 eq, and the sodium hydroxide is metered in at a temperature of 20-70° C. over a period of 4-12 h, the metered addition being effected continuously over the entire period or in equal portions every hour;

and the water content in the reactor is kept at a value of 0.2% to 1.7% during the carboxymethylation by applying reduced pressure and/or by passing nitrogen through;

V) using Solid NaOH as alkali metal hydroxide and chloroacetic acid sodium salt in the carboxymethylation, using NaOH or, in the case of a basic alkoxylate, the sum total of NaOH and $R^1$—O—$(CH_2C(R^2)HO)_x$—$(CH_2C(CH_3)HO)_y$—$(CH_2CH_2O)_z$—K or the sum total in the case of a basic alkoxylate of NaOH and $R^1$—O—$(CH_2C(R^2)HO)_x$—$(CH_2C(CH_3)HO)_y$—$(CH_2CH_2O)_z$—Na or, in the case of a basic alkoxylate, the sum total of NaOH and $R^1$—O—$(CH_2C(R_2)HO)_x$—$(CH_2C(CH3)HO)_y$—$(CH_2CH_2O)_z$—Cs in relation to the chloroacetic acid sodium salt in a ratio of 1.1 eq:1 eq to 1 eq:1.5 eq, where the ratio of nonionic surfactant (B) of the general formula (II):NaOH is from 1 eq:1 eq to 1 eq:1.5 eq;

and preparing the nonionic surfactant (B) via a base-catalyzed alkoxylation using KOH or NaOH or CsOH or a mixture of NaOH and KOH, and is used in the carboxymethylation either in neutralized and filtered (i.e. salt-free) form or in the form of an unneutralized basic alkoxylate;

and initially charging chloroacetic acid sodium salt and the nonionic surfactant (B) of the general formula (II) together in the reactor in the carboxymethylation, where the stoichiometric ratio of nonionic surfactant (B) of the general formula (II) to the chloroacetic acid sodium salt is 1 eq:1 eq to 1 eq 1.9 eq, and the sodium hydroxide is metered in at a temperature of 20-70° C. over a period of 4-12 h, the metered addition being effected continuously over the entire period or in equal portions every hour;

and the water content in the reactor is kept at a value of 0.2% to 1.7% during the carboxymethylation by applying reduced pressure and/or by passing nitrogen through;

VI) using solid NaOH as alkali metal hydroxide and chloroacetic acid sodium salt in the carboxymethylation, using NaOH in relation to the chloroacetic acid sodium salt in a ratio of 1 eq:1 eq to 1.1 eq:1 eq;

and preparing the nonionic surfactant (B) via an alkoxylation using double metal cyanide catalysis;

and initially charging chloroacetic acid sodium salt and the nonionic surfactant (B) of the general formula (II)

together in the reactor in the carboxymethylation, where the stoichiometric ratio of nonionic surfactant (B) of the general formula (II) to the chloroacetic acid sodium salt is 1 eq:1 eq to 1 eq:1.9 eq, and the sodium hydroxide is metered in at a temperature of 20-70° C. over a period of 4-12 h, the metered addition being effected continuously over the entire period or in equal portions every hour;

and the water content in the reactor is kept at a value of 0.2% to 1.7% during the carboxymethylation by applying reduced pressure and/or by passing nitrogen through.

2. The method according to claim 1, wherein
$R^1$ is a primary linear or branched, saturated or unsaturated, aliphatic hydrocarbyl radical having 10 to 36 carbon atoms; and
$R^2$ is a linear saturated aliphatic hydrocarbyl radical having 2 to 14 carbon atoms;
and M is H, Na, K or $NH_4$; and
x is a number from 1 to 10; and
Y is a number from 0 to 50; and
z is a number from 3 to 35;
where the sum total of x+y+z is a number from 4 to 80.

3. The method according to claim 1, wherein
$R^1$ is a primary branched saturated aliphatic hydrocarbyl radical having 10 to 36 carbon atoms; and
$R^2$ is a linear saturated aliphatic hydrocarbyl radical having 2 to 14 carbon atoms;
and M is H, Na, K or $NH_4$; and
x is a number from 0 to 10; and
Y is the number 0; and
z is a number from 3 to 35;
where the sum total of x+y+z is a number from 3 to 45.

4. The method according to claim 1, wherein
$R^1$ is a primary branched saturated aliphatic hydrocarbyl radical having 16 to 20 carbon atoms; and
x is the number 0.

5. The method according to claim 1, wherein
$R^1$ is a primary branched saturated aliphatic hydrocarbyl radical having 16 to 20 carbon atoms selected from 2-hexyldecyl, 2-octyldecyl, 2-hexyldodecyl, 2-octyldodecyl or a mixture of the hydrocarbyl radicals mentioned; and
x is the number 0.

6. The method according to claim 1, wherein
$R^1$ is a primary branched saturated aliphatic hydrocarbyl radical having 24 to 28 carbon atoms, being selected from the group consisting of 2-decyltetradecyl, 2-dodecylhexadecyl, 2-decylhexadecyl, 2-dodecyltetradecyl and a mixture of the hydrocarbyl radicals mentioned; and
x is the number 0.

7. The method according to claim 1, wherein
$R^1$ is a primary linear or branched, saturated or unsaturated, aliphatic hydrocarbyl radical having 10 to 36 carbon atoms; and
x is the number 0; and
Y is a number from 3 to 25; and
z is a number from 3 to 30;
and the sum total of x+y+z is a number from 6 to 55.

8. The method of claim 1, wherein
x is the number 0; and
Y is a number from 3 to 10; and
z is a number from 4 to 15;
and the sum total of x+y+z is a number from 7 to 25.

9. The method of claim 1, wherein
$R^1$ is a primary linear or branched, saturated or unsaturated, aliphatic hydrocarbyl radical having 13 to 20 carbon atoms.

10. The method according to claim 1, wherein
$R^1$ is a primary linear saturated aliphatic hydrocarbyl radical having 16 to 18 carbon atoms.

11. The method according to claim 1, wherein the sum total of x+y+z is a number from 7 to 24.

12. A concentrate with a surfactant mixture comprising at least one anionic surfactant (A) of the general formula (I)

and at least one nonionic surfactant (B) of the general formula (II)

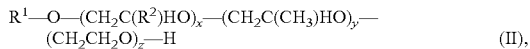

where a molar ratio of anionic surfactant (A) to nonionic surfactant (B) of 51:49 to 92:8 is present in the surfactant mixture on injection and the nonionic surfactant (B) serves as starting material for the anionic surfactant (A), where $R^1$ is a primary linear or branched, saturated or unsaturated, aliphatic hydrocarbyl radical having 10 to 36 carbon atoms; and
$R^2$ is a linear saturated aliphatic hydrocarbyl radical having 2 to 14 carbon atoms;
and M is H, Na, K or $NH_4$; and
x is a number from 0 to 10; and
Y is a number from 0 to 50; and
z is a number from 1 to 35;
where the sum total of x+y+z is a number from 3 to 80 and the x+y+z alkoxylate groups may be arranged in random distribution, in alternation or in blocks; and
where said starting material means that nonionic surfactant (B) has the same definitions of the variables R', $R^2$, x, y, z as anionic surfactant (A) and that nonionic surfactant (B) serves as a reactant for the preparation of anionic surfactant (A), and
where the sum total of x+y is a number >0 if $R^1$ is a primary linear, saturated or unsaturated, aliphatic hydrocarbyl radical having 10 to 36 carbon atoms, wherein the concentrate comprises 20% by weight to 70% by weight of the surfactant mixture, 10% by weight to 40% by weight of water and 10% by weight to 40% by weight of a cosolvent, based on the total amount of the concentrate, where a) the cosolvent is selected from the group of the aliphatic alcohols having 3 to 8 carbon atoms or from the group of the alkyl monoethylene glycols, the alkyl diethylene glycols or the alkyl triethylene glycols, where the alkyl radical is an aliphatic hydrocarbyl radical having 3 to 6 carbon atoms;

and/or b) the concentrate is free-flowing at 20° C. and has a viscosity at 40° C. of <1500 mPas at 200 Hz.

13. The concentrate of claim 12, wherein the concentrate comprises 0.5% to 15% by weight of a mixture comprising NaCl and diglycolic acid disodium salt, where NaCl is present in excess relative to diglycolic acid disodium salt.

14. The concentrate of claim 12, wherein the concentrate comprises butyl diethylene glycol as cosolvent.

15. The concentrate of claim 14, wherein
$R^1$ is a primary linear or branched, saturated or unsaturated, aliphatic hydrocarbyl radical having 10 to 36 carbon atoms; and $R^2$ is a linear saturated aliphatic hydrocarbyl radical having 2 to 14 carbon atoms;
and M is H, Na, K or $NH_4$; and
x is a number from 1 to 10; and
Y is a number from 0 to 50; and
z is a number from 3 to 35;
where the sum total of x+y+z is a number from 4 to 80.

16. The concentrate according to claim 12, wherein
$R^1$ is a primary branched saturated aliphatic hydrocarbyl radical having 10 to 36 carbon atoms; and
$R^2$ is a linear saturated aliphatic hydrocarbyl radical having 2 to 14 carbon atoms;
and M is H, Na, K or $NH_4$; and
x is a number from 0 to 10; and
Y is the number 0; and
z is a number from 3 to 35;
where the sum total of x+y+z is a number from 3 to 45.

17. The concentrate according to claim 12, wherein
$R^1$ is a primary branched saturated aliphatic hydrocarbyl radical having 16 to 20 carbon atoms, and is selected from the group consisting of 2-hexyldecyl, 2-octyldecyl, 2-hexyldodecyl, 2-octyldodecyl and a mixture of the hydrocarbyl radicals mentioned; and
x is the number 0.

18. The concentrate according to claim 12, wherein
$R^1$ is a primary branched saturated aliphatic hydrocarbyl radical having 24 to 28 carbon atoms, being 2-decyltetradecyl, 2-dodecylhexadecyl, 2-decylhexadecyl or 2-dodecyltetradecyl or a mixture of the hydrocarbyl radicals mentioned; and
x is the number 0.

19. The concentrate according to claim 12, wherein
$R^1$ is a primary linear or branched, saturated or unsaturated, aliphatic hydrocarbyl radical having 10 to 36 carbon atoms; and
x is the number 0; and
Y is a number from 3 to 25; and
z is a number from 3 to 30;
and the sum total of x+y+z is a number from 6 to 55.

20. The concentrate as claimed in claim 12, wherein
x is the number 0; and
Y is a number from 3 to 10; and
z is a number from 4 to 15;
and the sum total of x+y+z is a number from 7 to 25.

21. The concentrate according to claim 12, wherein
$R^1$ is a primary linear or branched, saturated or unsaturated, aliphatic hydrocarbyl radical having 13 to 20 carbon atoms.

22. The concentrate according to claim 12, wherein
$R^1$ is a primary linear saturated aliphatic hydrocarbyl radical having 16 to 18 carbon atoms.

23. The concentrate according to claim 12, wherein the sum total of x+y+z is a number from 7 to 24.

24. The concentrate according to claim 12, wherein the molar ratio of anionic surfactant (A) to nonionic surfactant (B) of 60:40 to 92:8 is present in the surfactant mixture.

25. The concentrate according to claim 12, wherein the molar ratio of anionic surfactant (A) to nonionic surfactant (B) of 70:30 to 92:8 is present in the surfactant mixture.

26. The concentrate according to claim 12, wherein the molar ratio of anionic surfactant (A) to nonionic surfactant (B) of 70:30 to 89:11 is present in the surfactant mixture.

* * * * *